US012697909B2

(12) United States Patent
Kojima et al.

(10) Patent No.: US 12,697,909 B2
(45) Date of Patent: Aug. 4, 2026

(54) VEHICLE CABIN TEMPERATURE CONTROL DEVICE AND ELECTRIC VEHICLE

(71) Applicant: TS TECH CO., LTD., Asaka (JP)

(72) Inventors: Ryosuke Kojima, Tochigi (JP); Tomokazu Kuma, Tochigi (JP); Takuma Konno, Tochigi (JP); Soichiro Tanaka, Tochigi (JP); Yuto Aoki, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 278 days.

(21) Appl. No.: 18/546,651

(22) PCT Filed: Feb. 21, 2022

(86) PCT No.: PCT/JP2022/006872
§ 371 (c)(1),
(2) Date: Aug. 16, 2023

(87) PCT Pub. No.: WO2022/181523
PCT Pub. Date: Sep. 1, 2022

(65) Prior Publication Data
US 2024/0131972 A1     Apr. 25, 2024
US 2024/0227643 A9     Jul. 11, 2024

Related U.S. Application Data

(60) Provisional application No. 63/212,162, filed on Jun. 18, 2021, provisional application No. 63/209,518,
(Continued)

(30) Foreign Application Priority Data

Mar. 25, 2021     (JP) ................................. 2021-051386
Sep. 29, 2021     (JP) ................................. 2021-159511
(Continued)

(51) Int. Cl.
A61H 1/00     (2006.01)
A61H 23/02     (2006.01)
(Continued)

(52) U.S. Cl.
CPC ....... *B60N 2/5642* (2013.01); *B60H 1/00807* (2013.01); *B60N 2/879* (2018.02); *B60N 2210/30* (2023.08)

(58) Field of Classification Search
CPC .... B60R 16/03; B60N 2/5657; B60N 2/5628; B60N 2/5621; B60N 2/5685;
(Continued)

(56) References Cited

U.S. PATENT DOCUMENTS 6,230,501 B1 *   5/2001   Bailey, Sr. ........... B60N 2/5685
                                                        62/51.1
6,676,615 B2 *   1/2004   Flick ..................... B60N 2/976
                                                        601/57
(Continued)

FOREIGN PATENT DOCUMENTS

JP          S5730609 A       2/1982
JP          2005132307       5/2005
(Continued)

OTHER PUBLICATIONS

Japanese Office Action (with English translation) for corresponding JP Application No. 2021-159568, drafted Aug. 2, 2023, 10 pages.
(Continued)

*Primary Examiner* — Shin H Kim
(74) *Attorney, Agent, or Firm* — Dority & Manning, P.A.

(57)          ABSTRACT
The vehicle cabin temperature control device comprises an air conditioning device based on a refrigeration cycle including a compressor driven by an electric motor, and including an air blowing port for blowing conditioned air into a cabin of a vehicle, and an air blowing device configured to blow
(Continued)

conditioned air to an occupant seated on a seat and consuming less electric power than the air conditioning device, and a control unit that activates the air blowing device for a predetermined time period upon startup of the air conditioning device.

11 Claims, 38 Drawing Sheets

Related U.S. Application Data filed on Jun. 11, 2021, provisional application No. 63/201,787, filed on May 13, 2021, provisional application No. 63/153,531, filed on Feb. 25, 2021.

(30) Foreign Application Priority Data

| | | | |
|---|---|---|---|
| Sep. 29, 2021 | (JP) | ................................ | 2021-159568 |
| Sep. 29, 2021 | (JP) | ................................ | 2021-159625 |

(51) Int. Cl.
  *B60H 1/00* (2006.01)
  *B60N 2/56* (2006.01)
  *B60N 2/879* (2018.01)

(58) Field of Classification Search
  CPC .......... B60N 2/5692; B60N 2/00; B60N 2/56;
           B60N 2/5635; B60N 2/5642; B60N
           2/879; B60N 2210/30; B60N 2/565
  See application file for complete search history.

(56) References Cited

U.S. PATENT DOCUMENTS

| | | | | |
|---|---|---|---|---|
| 6,719,534 | B2 * | 4/2004 | Aoki | .................... B60N 2/5635 |
| | | | | 417/44.1 |
| 6,865,825 | B2 * | 3/2005 | Bailey, Sr. | ............... A43B 7/14 |
| | | | | 36/88 |
| 7,314,455 | B1 * | 1/2008 | Hill | .......................... A61H 1/00 |
| | | | | 297/391 |
| 9,371,024 | B2 | 6/2016 | Ichishi et al. | |
| 10,589,647 | B2 * | 3/2020 | Wolas | ................ B60H 1/00285 |
| 10,694,858 | B2 | 6/2020 | Toda et al. | |
| 11,015,566 | B2 * | 5/2021 | Berkson | ................ H02J 7/0068 |
| 11,225,176 | B2 | 1/2022 | Hayashi | |
| 11,485,231 | B2 * | 11/2022 | Winton | .................... H04R 3/00 |

| | | | | |
|---|---|---|---|---|
| 2001/0045104 | A1 * | 11/2001 | Bailey, Sr. | ............... A43B 7/06 |
| | | | | 62/510 |
| 2002/0150478 | A1 * | 10/2002 | Aoki | ....................... F04D 17/10 |
| | | | | 417/44.1 |
| 2008/0001422 | A1 * | 1/2008 | Kwolek | .............. B60R 13/0262 |
| | | | | 296/24.34 |
| 2011/0101741 | A1 | 5/2011 | Kolich | |
| 2016/0304013 | A1 * | 10/2016 | Wolas | ................... B60N 2/5657 |
| 2017/0043712 | A1 * | 2/2017 | Paszkowicz | ............. B60Q 3/76 |
| 2019/0092143 | A1 * | 3/2019 | Kakizaki | ................. B60H 3/024 |
| 2020/0070806 | A1 * | 3/2020 | Berkson | ................ B60R 16/033 |
| 2020/0072178 | A1 * | 3/2020 | Berkson | ................ B60W 10/26 |
| 2020/0122614 | A1 * | 4/2020 | Kawano | ............. B60H 1/00285 |
| 2021/0197667 | A1 * | 7/2021 | Winton | ................... B60K 35/80 |
| 2021/0276463 | A1 | 9/2021 | Wolas et al. | |
| 2022/0105802 | A1 * | 4/2022 | Jeong | ...................... B60K 35/28 |
| 2023/0302871 | A1 * | 9/2023 | Makita | ................ B60N 2/5657 |
| 2023/0322129 | A1 * | 10/2023 | Mizoi | .................... G01B 17/00 |
| | | | | 297/217.2 |
| 2024/0131972 | A1 * | 4/2024 | Kojima | ................ B60N 2/5642 |
| 2024/0416715 | A1 * | 12/2024 | Maeda | .............. B60H 1/00457 |

FOREIGN PATENT DOCUMENTS

| | | | |
|---|---|---|---|
| JP | 2006076503 | A | 3/2006 |
| JP | 2010064660 | | 3/2010 |
| JP | 2011073657 | | 4/2011 |
| JP | 2011218970 | A | 11/2011 |
| JP | 2013133079 | | 7/2013 |
| JP | 2013189182 | | 9/2013 |
| JP | 2015042508 | | 3/2015 |
| JP | 2017178276 | A | 10/2017 |
| JP | 2019084295 | | 6/2019 |
| JP | 2020131786 | | 8/2020 |
| JP | 2020199990 | | 12/2020 |
| JP | 2020203512 | A | 12/2020 |
| KR | 101684140 | B1 | 12/2016 |
| WO | WO2019065773 | | 4/2019 |

OTHER PUBLICATIONS

PCT International Search Report (with English translation) and Written Opinion for corresponding PCT Application No. PCT/JP2022/006872, mailed May 17, 2022, 10 pages.

Japanese Office Action (w/English translation) for corresponding Application No. 2021-051386, dated Aug. 5, 2025, 12 pages.

Japanese Office Action (w/English translation) for corresponding Application No. 2021-159511, dated Nov. 4, 2025, 10 pages.

* cited by examiner

Fig.29 rear ◄————► front

VEHICLE CABIN TEMPERATURE CONTROL DEVICE AND ELECTRIC VEHICLE

CROSS REFERENCE TO RELATED APPLICATIONS

This application is the U.S. National Stage entry of International Application No. PCT/JP2022/006872, filed on Feb. 21, 2022, which, in turn, claims priority to U.S. Provisional Patent Application No. 63/153,531, filed on Feb. 25, 2021; Japanese Patent Application No. 2021-051386, filed on Mar. 25, 2021; U.S. Provisional Patent Application No. 63/201,787, filed on May 13, 2021; U.S. Provisional Patent Application No. 63/209,518, filed on Jun. 11, 2021; U.S. Provisional Patent Application No. 63/212,162, filed on Jun. 18, 2021; Japanese Patent Application No. 2021-159511, filed on Sep. 29, 2021; Japanese Patent Application No. 2021-159568, filed on Sep. 29, 2021; and Japanese Patent Application No. 2021-159625, filed on Sep. 29, 2021, all of which are hereby incorporated herein by reference in their entireties for all purposes.

TECHNICAL FIELD

The present invention relates to a vehicle cabin temperature control device and an electric vehicle, and more particularly to a vehicle cabin temperature control device including an air conditioning device and a seat temperature control device, and an electric vehicle equipped with the vehicle cabin temperature control device.

BACKGROUND ART

Vehicles are known which are equipped with an air conditioning device (main air conditioning device) based on a refrigeration cycle that blows air into the cabin and a seat temperature control device (auxiliary air conditioning device) based on a seat hot air device that blows air warmed by an electric heater from the seat to the seat occupant, an electrothermal seat heater, etc. (See Patent Documents 1 and 2).

PRIOR ART DOCUMENT(S)

Patent Document(s)

Patent Document 1: JP2010-64660A
Patent Document 2: JP2011-73657A

SUMMARY OF THE INVENTION

Task to be Accomplished by the Invention

In the case of an electric air conditioning device in which a compressor for a refrigerating cycle is driven by an electric motor, since the power consumption of the electric motor is significant as compared to a seat heater, the power consumption of the battery is undesirable great.

In particular, in an electric vehicle, if the battery for powering the electric motor that drives the driven wheels of the vehicle is shared by the electric motor that drives the compressor of the refrigerating cycle, the cruising range of the electric vehicle for each charging of the battery is reduced due to the consumption of the electric power of the battery by the electric motor for the compressor.

In particular, if rapid heating or rapid cooling of the cabin is performed at the startup of the air conditioning device with the aim of quickly obtaining a comfortable temperature environment, the power consumption of the battery will increase significantly owing to the increase in the drive load of the compressor, and the cruising range of the electric vehicle is particularly significantly reduced. This is a serious problem for electric vehicles.

In view of such a problem of the prior art, a primary object of the present invention is to provide a vehicle cabin temperature control device which allows a favorable temperature environment to be quickly achieved and power consumption to be minimized at the same time.

Means to Accomplish the Task

A vehicle cabin temperature control device according to an embodiment of the present invention, comprises: an air conditioning device including an air blowing port (52) for blowing air-conditioned air into a cabin of a vehicle; and a seat temperature control device (60, 62, 76) including at least one of an air blowing device for blowing air-conditioned air by at least one of a heater and a semiconductor device toward an occupant of a seat and a seat heater, the seat temperature control device consuming less power than the air conditioning device; and a control unit (100) that activates the seat temperature control device for a predetermined time period upon startup of the air conditioning device.

Thereby, a comfortable temperature environment can be quickly achieved and power consumption can be reduced at the same time.

In the vehicle cabin temperature control device defined above, preferably, the air conditioning device is based on a refrigeration cycle including a compressor (42) driven by an electric motor (54).

According to this configuration, an appropriate air conditioning capacity can be easily obtained.

In the vehicle cabin temperature control device defined above, preferably, the predetermined time period is a time period lasting for a predetermined time from a start of the air conditioning device.

According to this configuration, the seat temperature control device operates for the predetermined time period from the start of the air conditioning device so that a comfortable temperature environment can be quickly obtained, and power consumption can be reduced.

In the vehicle cabin temperature control device defined above, preferably, the predetermined time period is a time period that starts from a start of the air conditioning device and lasts for so long as a difference between a set temperature of the air conditioning device and the cabin temperature is equal to or greater than a predetermined value.

According to this configuration, the seat temperature control device operates during the time period in which the difference between the set temperature of the air conditioning device and the cabin temperature is equal to or greater than the predetermined value following the start of the air conditioning device so that a comfortable environment regarding temperature is quickly obtained, and power consumption can be minimized at the same time.

In the vehicle cabin temperature control device defined above, preferably, the control unit sets a set temperature of the seat temperature control device so as to be lower in an earlier part of an operating period thereof as compared to a latter part thereof.

According to this configuration, hot air is prevented from hitting the neck of the seat occupant from the beginning of the blowing operation so that the comfort of the occupant is improved.

In the vehicle cabin temperature control device defined above, preferably, the control unit sets an amount of air blown from the air blower to be smaller in an earlier part of the operating period as compared to a latter part thereof.

According to this configuration, warm air is prevented from hitting the neck of the seat occupant with a large air volume from the beginning of the blowing operation so that the comfort of the occupant is improved.

In the vehicle cabin temperature control device defined above, preferably, the control unit intermittently operates the air blower.

According to this configuration, the average power consumption of the air blower is reduced compared to a continuous operation so that the power consumption of the air blower is reduced.

In the vehicle cabin temperature control device defined above, preferably, the control unit operates the air conditioning device with a power value lower than a power value for steady operation while the seat temperature control device is in operation.

According to this configuration, the load on the power supply of the air conditioning device is reduced.

In the vehicle cabin temperature control device defined above, preferably, the air blower is provided in a seat back or headrest of the seat and includes an air blowing port for blowing air toward a neck of a seat occupant.

According to this configuration, temperature-controlled air can be appropriately blown from the seat back or the headrest toward the neck of the seat occupant.

An electric vehicle according to an embodiment of the present invention is an electric vehicle which is provided with driven wheels driven by an electric motor, and includes the vehicle cabin temperature control device according to any one of the foregoing embodiments, wherein the electric motor driving the driven wheels, the electric motor driving the compressor, and the seat temperature control device share a common battery as a power source.

According to this configuration, power consumption of the battery is reduced, and reduction in the cruising range of the electric vehicle is minimized.

An air conditioning seat having an air blow passage for blowing out air from the seat surface is known (for example, JP2019-84295A). The air-conditioned seat described in this publication includes a seat back that serves as a backrest for a seat occupant, and a seat cushion that provides a seating surface. An air conditioning device with a blower function is provided under the seat cushion. A pair of panel members in the form of upright plates project from either side of the seat cushion. The upper edge of each panel member is bent inward in the lateral direction of the seat.

Each panel member is configured such that air flow issuing from the air conditioning device is guided along the inner surface thereof onto an upper side of the seat (seating surface), and owing to the laterally inwardly curved shape thereof, the air flow is directed to the thigh of the seat occupant.

The vehicle seat is provided with a buckle that is configured to be engaged with and disengaged from a tongue of a seat belt. If the buckle is provided on the side part of the seat cushion in a movable manner, the panel member may interfere with the movement of the buckle.

Thus, in view of the above background, a primary task of the present invention is to provide a vehicle seat including an air conditioning device provided in a seat cushion, and a buckle configured to engage and disengage a tongue of a seat belt, wherein the air conditioning device is prevented from interfering with a movement of the buckle, and a vehicle provided with this vehicle seat.

To accomplish this task, a certain aspect of the present invention provides a vehicle seat (103, 303, 403, 503), comprising: a seat body (105) including a seat cushion (111) and a seat back (113); a buckle (151B) that is pivotally supported by the seat body about an axis (Q) extending in a lateral direction and configured to engage and disengage a tongue of a seat belt; and an air conditioning device (163, 171, 173, 175, 371A, 663) for adjusting an ambient temperature for an occupant of the seat, wherein the air conditioning device is connected to the seat cushion at a part thereof outside of a movable range of the buckle.

According to this configuration, since the air conditioning device is connected to a part of the seat cushion outside the movable range of the buckle, the air conditioning device is prevented from interfering with the movement of the buckle.

In the above configuration, preferably, the air conditioning device is positioned so as to overlap with the movable range of the buckle in front view.

According to this configuration, the lateral width of the vehicle seat can be made smaller as compared to the case where the air conditioning device does not overlap with the range of motion in front view.

In the above configuration, preferably, the air conditioning device is positioned so as to overlap with the movable range in side view.

According to this configuration, the air conditioning device is less likely to protrude forward from the seat body as compared to the case where the air conditioning device does not overlap with the range of motion in side view so that the fore and aft dimension of the vehicle seat can be minimized.

Further, in the above configuration, preferably, the air conditioning device is positioned outside of a movable range (E) of the tongue engaged by the buckle.

According to this configuration, the movement of the tongue is prevented from being obstructed by the air conditioning device.

In the above configuration, preferably, the seat cushion is provided with a frame (121), a pad member (123) supported by the frame, and a skin member (125) covering the surface of the pad member, and the pad member is provided with a cutout (183) configured to receive the air conditioning device therein.

According to this aspect, the size of the vehicle seat can be minimized by placing the air conditioning device in the cutout provided in the pad member.

Further, in the above configuration, preferably, a laterally side part of the seat body is provided with an operation input portion (149) for changing one of a shape, a posture, and a position of the seat body, and the air conditioning device is positioned ahead of a rear end of the operation input portion.

According to this configuration, the operation input by the seat occupant is less likely to be obstructed by the air conditioning device.

In the above configuration, preferably, the air conditioning device is positioned ahead of a front end of the operation input portion.

According to this configuration, the operation input by the seat occupant is less likely to be obstructed by the air conditioning device.

Further, in the above configuration, preferably, the operation input portion (449) for changing one of a shape, a posture, and a position of the seat body is positioned on a lateral side part of the seat body, and the air conditioning device is positioned between a front end and a rear end of the operation input portion.

According to this configuration, the size of the vehicle seat in the fore and aft direction can be minimized.

Further, in the above configuration, preferably, an operation input portion for changing one of a shape, a posture, and a position of the seat body is provided, and a laterally outer end of the air conditioning device is located on an inner side of a laterally outer end of the operation input portion.

According to this configuration, the operation input by the seat occupant is less likely to be obstructed by the air conditioning device.

In the above configuration, preferably, the seat back is provided with a side airbag (137) that deploys on a side of the occupant, and the air conditioning device is positioned outside of a deployment range (C) of the side airbag.

According to this configuration, the deployment of the side airbag is prevented from being hindered by the air conditioning device.

In the above configuration, preferably, the air conditioning device is positioned ahead of the deployment range.

According to this configuration, the deployment of the side airbag is prevented from being hindered by the air conditioning device.

In the above configuration, preferably, the seat back is provided with a side airbag (137) that deploys on a side of the seat occupant, a front end of a deployment range (C) of the side airbag being located at a lower end of the deployment range of the side air bag, and an upper end of the air conditioning device is substantially horizontal, a rear end of the air conditioning device being located below the front end of the deployment range.

According to this configuration, deployment of the side airbag is less likely to be hindered by the air conditioning device.

In the above configuration, preferably, the seat body further includes a headrest provided with a pillar (115A) which is inserted into a tubular pillar guide (131D) provided in an upper end of the seat back, and a temperature control device (207) provided with a heat source (207A) positioned at an upper end of the seat back behind the pillar guide.

According to this configuration, since the heat source is positioned behind the pillar guide, the pillar guide and the pillar restrict the rearward movement of the neck of the seat occupant when a rearward load is applied to the seat occupant so that the neck of the seat occupant is prevented from coming close to the heat source.

To accomplish the aforementioned task, a certain aspect of the present invention provides a vehicle (100) equipped with the vehicle seat defined above, wherein a door (107) is provided with a door airbag (108) configured to deploy into the cabin (102), and the air conditioning device is located outside of a deployment range (A) of the door airbag.

According to this configuration, deployment of the door airbag is prevented from being obstructed by the air conditioning device.

To accomplish the aforementioned task, a center console box (109) is provided on a side of the vehicle seat, and the center console box is provided with a storage recess (109A) that can be opened to store an article therein, and a lid (1019B) hinged to an opening edge (109C) of the storage recess to open and close the storage recess, wherein the air conditioning device is located outside of a movable range (B) of the lid.

According to this configuration, opening and closing of the lid is prevented from being obstructed by the air conditioning device.

Further, to accomplish the aforementioned task, a certain aspect of the present invention provides a vehicle seat, comprising: a seat body including a seat cushion and a seat back; a buckle supported by the seat body pivotably around a lateral axis, and configured to releasably engage a tongue of a seat belt; and an air conditioning device for controlling an ambient temperature of a seat occupant, wherein the air conditioning device is connected to the seat cushion so as to be outside of a movable range of the buckle. Since the air conditioning device is connected to the seat cushion so as to be outside of a movable range of the buckle, the air conditioning device is prevented from obstructing the movement of the buckle.

In the above configuration, preferably, the air conditioning device is positioned so as to overlap with the movable range in front view. According to this aspect, as compared to the case where the air conditioning device does not overlap with the movable range in front view, the width of the vehicle seat in the lateral direction can be reduced.

In the above configuration, preferably, the air conditioning device is positioned so as to overlap with the movable range in side view. According to this aspect, as compared to the case where the air conditioning device does not overlap with the movable range in side view, the air conditioning device is prevented from undesirably protruding forward, and the size of the vehicle seat in the fore and aft direction can be reduced.

Further, in the above configuration, preferably, the air conditioning device is positioned outside of a movable range of a tongue engaged by a buckle. According to this configuration, the movement of the tongue is prevented from being hindered by the air conditioning device.

In the above configuration, preferably, the seat cushion includes a frame, a pad member supported by the frame, and a skin member covering a surface of the pad member, and the pad member is provided with a cutout configured to receive the air conditioning device therein. According to this configuration, the size of the vehicle seat can be reduced by placing the air conditioning device in the cutout provided in the pad member.

Further, in the above configuration, preferably, a laterally side part of the seat body is provided with an operation input portion for changing one of a shape, a posture, and a position of the seat body, and the air conditioning device is positioned ahead of a rear end of the operation input portion. According to this configuration, the operation input of the seat occupant is prevented from being obstructed by the air conditioning device.

In the above configuration, preferably, the air conditioning device is positioned ahead of a front end of the operation input portion. According to this configuration, the operation input by the seat occupant is prevented from being obstructed by the air conditioning device.

Further, in the above configuration, preferably, a laterally side part of the seat body is provided with an operation input portion for changing one of a shape, a posture, and a position of the seat body, and the air conditioning device is positioned between a front end and a rear end of the operation input portion. According to this configuration, the fore and aft size of the vehicle seat can be minimized.

Further, in the above configuration, preferably, an operation input portion for changing one of the shape, posture, and position of the seat body is provided, and the outer end of the air conditioning device in the lateral direction is located on a laterally inner side of the operation input portion. According to this configuration, the operation input of the seat occupant is less likely to be obstructed by the air conditioning device.

In the above configuration, preferably, the seat back is provided with a side airbag that deploys on a side of the seat occupant, and the air conditioning device is positioned outside of a deployment range of the side airbag. According to this configuration, the deployment of the side airbag is prevented from being hindered by the air conditioning device.

In the above configuration, preferably, the air conditioning device is positioned ahead of the deployment range. According to this configuration, the deployment of the side airbag is prevented from being hindered by the air conditioning device.

In the above configuration, preferably, the seat back is provided with a side airbag that deploys on a side of the seat occupant, a front end of a deployment range of the side airbag being positioned at a lower end of the deployment range, and an upper end of the air-conditioning device extends substantially horizontally, a rear end of the air conditioning device being located below the front end of the deployment range. According to this configuration, deployment of the side airbag is prevented from being hindered by the air conditioning device.

In the above configuration, preferably, the seat body further includes a headrest, an upper end of the seat back being provided with a tubular pillar guide that receives a pillar extending from the headrest, and a temperature control device having a heat source and positioned at an upper end of the seat back, the heat source being positioned behind the pillar guide. According to this configuration, since the heat source is positioned behind the pillar guide, the pillar guide and the pillar restrict the rearward movement of the neck of the seat occupant when a rearward load is applied to the seat occupant so that the neck of the seat occupant is prevented from coming close to the heat source.

To accomplish the aforementioned task, a certain aspect of the present invention provides a vehicle fitted with the above-described vehicle seat, wherein a door of the vehicle is provided with a door airbag that deploys into a cabin, and the air conditioning device is positioned outside of a deployment range of the door airbag. According to this configuration, deployment of the door airbag is prevented from being obstructed by the air conditioning device.

To accomplish the aforementioned task, preferably, a center console box is provided on a side of the vehicle seat, the center console box having a storage recess that can be opened to store an article therein, and a lid hinged to an opening edge of the storage recess for opening and closing the storage recess, and the air conditioning device is positioned outside of a movable range of the lid. According to this configuration, opening and closing of the lid is prevented from being obstructed by the air conditioning device.

A vehicle seat having an air blowing passage for blowing out air from the seat surface is known (for example, JP2019-84295A). The seat disclosed in this publication includes a seat back that serves as a backrest for a seat occupant, and a seat cushion that provides a seating surface. An air conditioning device with a blower function is provided under the seat cushion. A pair of panel members in the form of upright plates project from either side of the seat cushion. The upper edge of each panel member is bent inward in the lateral direction of the seat.

Each panel member is configured such that air flow issuing from the air conditioning device is guided along the inner surface thereof onto an upper side of the seat (seating surface), and owing to the laterally inwardly curved shape thereof, the air flow is directed to the thigh of the seat occupant.

The vehicle is provided with doors and windows, and regions of the cabin near the doors and the windows are susceptible to the influence of ambient air. When the seat described in JP2019-84295A is placed near a door or a window, a temperature difference may be created between the flows of air blown to the occupant from the opposite sides.

Therefore, in view of the background mentioned above, it is a task of the present invention to provide an air conditioning system that is less susceptible to the influence of the external air temperature.

To accomplish such a task, a certain aspect of the present invention provides an air conditioning system (161), comprising a seat air conditioning device (163) provided in a vehicle seat (103) for air conditioning a region surrounding a seat occupant, wherein the seat air conditioning device includes an inboard side air conditioning device (171B) that conditions air from an inboard side, and an outboard side air conditioning device (171A) that conditions air from an outboard side, the outboard side air conditioning device having a greater output than the inboard side air conditioning device.

According to this configuration, since the outboard side air conditioning device which conditions air on a side which is more susceptible from the influence of the external air has a greater output than the inboard side air conditioning device, the influence of the external temperature can be minimized.

In the above configuration, preferably, the outboard side air conditioning device and the inboard side air conditioning device each include a blower (193) that blows air toward the seated occupant, and a heat source (197A) that adjusts a temperature of the air blown by the blower, wherein the outputs of the outboard side air conditioning device and the inboard side air conditioning device are each determined by a temperature change caused by the corresponding heat source.

According to this configuration, the influence of the external air can be reduced by making the temperature change on the outboard side which is more susceptible to the influence of the external air greater than that on the inboard side.

In the above configuration, preferably, the outboard side air conditioning device and the inboard side air conditioning device are provided on the seat cushion (111) of the vehicle seat so as to control a temperature surrounding legs of the seat occupant.

According to this configuration, the influence of the external air on the legs of the seat occupant can be minimized.

In the above configuration, preferably, the outboard side air conditioning device and the inboard side air conditioning device are each provided with a duct (195) extending forward from the blower beyond a front end part of the seat cushion.

According to this configuration, the air blown out from the blower can be guided to the feet of the seat occupant.

In the above configuration, preferably, the seat cushion includes a base portion (111B) forming a laterally central part thereof, and a pair of side bolsters (111C) connected to either lateral edge of the base portion and protruding upward higher than an upper surface of the base portion, and the ducts have front ends that are open at a point lower than an upper surfaces of the side bolsters.

According to this configuration, when the thighs of the seat occupant are placed on the side bolsters, the ducts are prevented from coming into contact with the thighs.

In the above configuration, preferably, the seat cushion has a pair of side frames (121A) extending in a fore and aft direction on either side, and a pair of side covers (127) provided on an outer side of the respective side frames, and the ducts are located more inwardly of the seat than laterally outer ends of the side covers.

According to this configuration, the ducts are protected from an external object colliding with the laterally outer sides of the seat cushion.

In the above configuration, preferably, the seat air conditioning device includes a back-side air conditioning device (173) provided in the seat back of the vehicle seat to perform a temperature control by blowing air toward a neck of the seat occupant, and the outboard side air conditioning device has a greater output than the back-side air conditioning device.

According to this configuration, the influence of the external air is particularly favorably reduced on an outboard side of the legs of the occupant which is more likely to be affected by the external air than the neck.

In the above configuration, preferably, the back-side air conditioning device includes a blower (203) for forwarding air to a neck of a seat occupant, and a heat source (207A) for changing a temperature of the air to be forwarded to the neck, the output of the outboard side air conditioning device being determined by a temperature change in a temperature of the air caused by the heat source (197A) of the outboard side air conditioning device, the output of the back-side air conditioning device being determined by a temperature change in a temperature of the air caused by the heat source (207A) of the back-side air conditioning device.

According to this configuration, since the temperature change of the air forwarded to the outboard side of the legs is greater than that of the air forwarded to the neck, the influence of the external air can be effectively reduced on the outboard side of the legs which is more susceptible to the influence from the external air.

In the above configuration, preferably, the seat air conditioning device includes a head-side air conditioning device (175) which is provided in the headrest (115), and performs temperature adjustment by blowing air to a head of the seat occupant, and the outboard side air conditioning device has a greater output than the head-side air conditioning device.

According to this configuration, the influence of the external air on the outboard side of the legs which is more susceptible to the influence of the external air is effectively reduced.

In the above configuration, preferably, the head-side air conditioning device includes a blower (213) for forwarding air to a head of the seat occupant, and a heat source (117A) for changing a temperature of the air forwarded to the head, wherein the output of the outboard side air conditioning device is determined by a temperature change of the air caused by the heat source (197A) of the outboard side air conditioning device, and the output of the head-side air conditioning device is determined by a temperature change of the air caused by the heat source (217A) of the head-side air conditioning device.

According to this configuration, since the temperature change of the air blown to the outboard side of legs of the seat occupant is greater than that of the air blown to the head of the seat occupant, the influence of the external air on the outboard side of the legs which is more susceptible to the influence of the external air is effectively reduced.

In the above configuration, preferably, the air conditioning system includes a temperature sensor (167) that acquires a temperature of a vehicle cabin in which the vehicle seat is placed, and a control unit (181) for controlling the seat air conditioning device based on the temperature acquired by the temperature sensor, wherein the control unit is configured to drive the seat air conditioning device to cool the seated occupant when the temperature acquired by the temperature sensor is equal to or higher than an upper threshold value, and to warm the seat occupant when the temperature acquired by the temperature sensor is equal to or lower than a lower threshold value.

According to this configuration, air conditioning can be performed based on the temperature in the vehicle cabin where the seat occupant is located.

In the above configuration, preferably, the air conditioning system includes a temperature sensor (167) that acquires a surface temperature of the vehicle seat, and a control unit (181) that controls the seat air conditioning device based on the temperature acquired by the temperature sensor, wherein the control unit is configured to drive the seat air conditioning device to cool the seated occupant when the temperature acquired by the temperature sensor is equal to or higher than an upper threshold value, and to warm the seat occupant when the temperature acquired by the temperature sensor is equal to or lower than a lower threshold value.

According to this configuration, air conditioning can be performed based on the surface temperature of the vehicle seat with which the seat occupant is in contact.

In the above configuration, preferably, the seat air conditioning device includes a back-side air conditioning device (173) provided in the seat back (113) of the vehicle seat to perform a temperature control by blowing air toward a neck of the seat occupant, a temperature sensor (167) for acquiring a surface temperature of the vehicle seat or a temperature in the vehicle cabin, and a control unit (181) for controlling the seat air conditioning device based on the temperature acquired by the temperature sensor, wherein the control unit causes an output of the back-side air conditioning device to be greater than that of the outboard side air conditioning device when the temperature acquired by the temperature sensor is equal to or higher than an upper threshold value, and an output of the outboard side air conditioning device to be greater than that of the back-side air conditioning device when the temperature acquired by the temperature sensor is equal to or lower than a lower threshold value.

According to this configuration, when the temperature is high enough for the seated occupant to feel hot, the output of the back-side air conditioning device that air-conditions the area around the neck of the seat occupant is increased. When the temperature is low enough for the seated occupant to feel cold, the output of the outboard side air conditioning device that air-conditions the area around the legs of the seat occupant is increased. Thus, the neck is cooled more than the legs when the seat occupant feels hot, and the legs are warmed more than the neck when the seat occupant feels cold so that the comfort of the vehicle seat can be improved.

Further, in the above configuration, preferably, the air conditioning system further includes a vehicle cabin air conditioning device (664) that air-conditions a vehicle cabin in which the vehicle seat is placed, wherein the vehicle cabin air conditioning device is configured to be activated when the seat air conditioning device is activated, and the temperature acquired by the temperature sensor has become equal to or greater than a predetermined value following an activation of the seat air conditioning device.

According to this configuration, when the occupant is seated, the cabin air conditioning device starts operating following the seat air conditioning device. Since the air conditioning devices start operating in the order of closeness to the seat occupant, the region around the seat occupant is more promptly air-conditioned as compared to the case where the seat air conditioning device starts operating later than the vehicle cabin air conditioning device.

Moreover, in the above configuration, preferably, the air conditioning system further includes a vehicle cabin air conditioning device (664) that air-conditions a vehicle cabin in which the vehicle seat is placed, and the vehicle cabin air conditioning device starts operating when the seat air conditioning device is activated, and a surface temperature of the vehicle seat acquired by the temperature sensor has continued to be equal to or higher than a predetermined value for a predetermined time period following an activation of the seat air conditioning device.

According to this configuration, when the occupant is seated, the seat air conditioning device is activated, and after the surface temperature of the vehicle seat acquired by the temperature sensor has continued to be maintained at a level equal to or higher than the threshold value, the vehicle cabin air conditioning device is activated. As a result, an erroneous operation of the cabin air conditioning device due to an erroneous temperature detection by the temperature sensor can be avoided.

A conventionally known headrest for a vehicle seat includes a tubular headrest pillar and a wire harness extending inside the headrest pillar (for example, JP2020-131786A). The headrest pillar is provided with a communication hole communicating the interior of the headrest pillar with the exterior. The wire harness is connected to an electric device positioned inside the headrest via the communication hole. Further, the communication hole is provided with a closure member that closes the communication hole. A pad member is integrally attached to the headrest pillar, the wire harness, and the electric device, and the pad member is covered by a skin member.

The headrest disclosed in JP2020-131786A is manufactured by placing the skin member, an upper part of the headrest pillar including the communication hole, and a wire harness connected to the electric device via the communication hole in a die mold for forming the pad member, and foaming a foaming agent in the die mold.

However, in the headrest disclosed in JP2020-131786A, the foaming agent interferes with the wire harness during the process of molding the pad member. As a result, for example, when a load is applied to the pad member by an occupant or the like, the wire harness may be deformed jointly with the pad member with the result that durability of the wire harness may be impaired.

In view of the above background, the present invention provides a headrest for a vehicle seat in which a pad member can be foam-molded without interfering with a wire harness extending inside a headrest pillar of the headrest.

To accomplish the aforementioned task, a certain aspect of the present invention provides a headrest (1) for a vehicle seat (2), comprising: a pair of headrest pillars (10) extending upward from an upper part of a seat back (4) laterally one next to another and each having a tubular configuration internally defining a pillar hole (16) therein; a plate (12) connected to the headrest pillars so as to face in a fore and aft direction; a temperature control unit (14) positioned under the plate; a protective cover (71) positioned behind the plate and defining a hollow interior (70) jointly with the plate and the temperature control unit: a pad member (80) supported by the headrest pillars, the plate and the temperature control unit: and a skin member (81) covering the pad member, wherein the temperature control unit includes a casing (28) fixed to the plate and having an air passage (67) extending from an air inlet (64) to an air blowing port (65), and a wire harness hole (47) communicating the air passage with the hollow interior; a temperature control portion (29) fixed inside the casing and configured to control a temperature of air introduced from the air inlet into the casing; a blower (30) fixed inside the casing and configured to blow temperature-controlled air out of the casing via the air blowing port; and a wire harness (32) for supplying electric power to the temperature control portion and the blower, and wherein a tip end of the headrest pillar is positioned inside the hollow interior, and the wire harness extends from the temperature control portion and the blower, passes through the wire harness hole, the hollow interior and the pillar hole, and projects from a lower end of the headrest pillar.

According to this configuration, since the tip end of the headrest pillar is positioned inside the hollow interior, the wire harness connected to the temperature control portion and the blower can extend through the wire harness hole, the hollow interior, and the pillar hole, and project from the lower end of the headrest pillar. Since these inner space parts are separated from the pad member by the plate, the protective cover and the casing, the pad member can be foam-molded without causing the pad member to interfere with the wire harness extending through the headrest pillar in the headrest of the vehicle seat.

In the above configuration, preferably, the protective cover includes a plate-shaped cover central part (72) extending downward toward a rear part thereof, and a pair of cover side parts (73) extending forward and downward from either side edge of the cover central part, and front edges of the cover central part and the cover side parts abuts against the plate.

According to this configuration, the plate and the protective cover can be firmly connected to each other.

In the above configuration, preferably, a connecting piece (24) extending rearwardly is provided on a lower part of the plate, and the casing is connected to the connecting piece.

According to this configuration, the casing can be connected to the plate with ease.

In the above configuration, preferably, side edges of the connecting piece are each provided with a slanted piece (23) slanted downward toward a laterally outer side, and the headrest pillars are connected to the corresponding slanted pieces.

According to this configuration, the headrest pillars can be connected to the plate with ease.

In the above configuration, preferably, a front end of the temperature control unit is positioned behind a front end of the plate.

According to this configuration, when an impact is applied to the headrest from the front, the impact is prevented from being transmitted to the temperature control unit.

In the above configuration, preferably, the air inlet is provided on one side part of the casing.

According to this configuration, by providing the headrest on an appropriate vehicle seat, the air inlet can be positioned on the side of a side window of the vehicle so that the introduction of air into the air inlet is facilitated.

In the above configuration, preferably, a plurality of louver plates (1016) extending downward and outward are provided in the air inlet.

According to this configuration, even if rainwater or the like enters the interior of the vehicle through the side window of the vehicle, the rainwater or the like is less likely to enter the casing through the air inlet.

In the above configuration, preferably, the air blowing port is provided in a front part of the casing, and the louver plates extend forward and outward.

According to this configuration, the introduction of the air which is temperature-controlled by the temperature control unit into the casing through the air inlet is facilitated. Thereby, the temperature control unit can efficiently adjust the temperature of the air surrounding the air inlet.

In the above configuration, preferably, a rear end of the air inlet is positioned ahead of the headrest pillars in side view.

According to this configuration, the introduction of the air which is temperature-controlled by the temperature control unit into the casing through the air inlet is facilitated. Thereby, the temperature control unit can efficiently control the temperature of the air around the air inlet.

To accomplish the aforementioned task, another aspect of the present invention provides a method for manufacturing the headrest (1) for the vehicle seat (2), comprising: a first step of fixing the plate (12) facing in a fore and aft direction to the headrest pillars (10) extending upward on either side and each having a tubular configuration defining the pillar hole (16) therein; a second step of fixing the upper casing part (34) having the wire harness hole (47) passed vertically therethrough to the lower part of the plate; a third step of fixing the protective cover (71) defining the hollow interior (70) jointly with the plate and the upper casing part to the lower part of the plate so as to position the tip ends of the headrest pillars inside the hollow interior; a fourth step of attaching the pad member (80) to the headrest pillars, the plate, and the upper casing part; a fifth step of connecting the wire harness (32) that extends from the lower end of the headrest pillar through the pillar hole, the hollow interior and the wire harness hole to the temperature control portion (29) for controlling the temperature of the air introduced from outside the headrest and the blower (30) that blows the air which is temperature-controlled to outside the headrest; a sixth step of attaching the temperature control portion and the blower to the upper casing part; a seventh step of fixing the lower casing part (56) to the lower part of the upper casing part such that the upper casing part and the lower casing part jointly define the air passage (67) extending from the air inlet (64) to the air blowing port (65) and the temperature control portion and the blower are positioned inside the air passage; and an eighth step of covering an assembly formed in the seventh step with the skin member (81).

According to this configuration, since the tip ends of the headrest pillars are positioned in the hollow interior, the wire harness connected to the temperature control portion and the blower can extend through the wire harness hole, the hollow interior, and the pillar hole, and protrude from the lower end of the headrest pillar. Since these space parts are separated from the pad member by the plate, the protective cover and the casing, the headrest can be manufactured by foam-molding the pad member without causing the wire harness extending through the headrest pillars to interfere with the pad member.

In the above configuration, preferably, the headrest pillars and the plate are made of metal, and the headrest pillars and the plate are welded together in the first step.

According to this configuration, the headrest pillars and the plate can be fixed with a simple means.

In the above configuration, preferably, the upper casing part is provided with an engaging portion (45), and the plate is provided with an engaged portion (25) that is configured to engage with the engaging portion, the engaging portion and the engaged portion being engaged with each other in the second step.

According to this configuration, the plate and the upper casing part can be fixed to each other with a simple means.

In the above configuration, preferably, in the fifth step, the headrest pillar, the plate, and the upper part of the casing are placed in a mold, and a molding material is supplied into the mold to perform foam-molding.

According to this configuration, the pad member can be fixed to the headrest pillar, the plate, and the upper casing part with a simple means.

In the above configuration, preferably, in the seventh step, the upper casing part and the lower casing part are fastened to each other.

According to this configuration, the upper casing part and the lower casing part can be joined to each other with a simple means.

A vehicle cabin temperature control device according to an embodiment of the present invention consists of a cabin temperature control device for controlling a temperature of a vehicle cabin, comprising: an electric air conditioning device (40) provided with an air blowing port (52) for blowing out temperature-controlled air; and a seat temperature control device (60, 62, 76) including at least one of a seat heater and an air blower for blowing temperature-controlled air to a seat occupant, and consuming less power than the electric air conditioning device; and a control unit that is configured to operate the seat temperature control device for a predetermined time period when the air conditioning device is activated (100).

According to this configuration, a comfortable temperature environment can be quickly achieved, and power consumption can be reduced.

In the cabin temperature control system defined above, preferably, the air conditioning device is based on a refrigeration cycle including a compressor (42) driven by an electric motor (54).

According to this configuration, an appropriate air conditioning capacity can be easily obtained.

In the vehicle cabin temperature control device defined above, preferably, the predetermined time period is a period lasting for a predetermined time from a time point when the air conditioning device is activated.

According to this configuration, the seat temperature control device operates until the predetermined time has elapsed from the start of the air conditioning device, so that a comfortable temperature environment can be quickly achieved, and power consumption can be reduced at the same time.

In the vehicle cabin temperature control device defined above, preferably, the predetermined time period is a period that lasts from a time point when the air conditioning device is activated for so long as a difference between a set temperature of the air conditioning device and a cabin temperature is equal to or greater than a predetermined value.

According to this configuration, since the seat temperature control device operates for a time period during which the difference between the set temperature of the air conditioning device and the cabin temperature is equal to or greater than the predetermined value after the start of the air conditioning device, a comfortable environment regarding temperature can be quickly obtained, and power consumption can be reduced at the same time.

In the vehicle cabin temperature control device defined above, preferably, the control unit lowers the set temperature of the seat temperature control device in an earlier part of an operating period as compared to a latter part of the operating period.

According to this configuration, warm air is prevented from hitting the neck of the seat occupant from the beginning of the blowing operation, and comfort is improved.

In the vehicle cabin temperature control device defined above, preferably, the control unit reduces an amount of air blown from the air blower during an earlier part of an operating period as compared to a latter part of the operating period.

According to this configuration, the warm air is prevented from hitting the neck of the seat occupant with a large air volume from the beginning of the blowing operation, and comfort is improved.

In the vehicle cabin temperature control device defined above, preferably, the control unit intermittently operates the air blower.

According to this configuration, the average power consumption of the air blower is reduced compared to a continuous operation, and the power consumption of the air blower is reduced.

In the vehicle cabin temperature control device defined above, preferably, the control unit operates the air conditioning device with a power value lower than a power value for steady operation while the seat temperature control device is in operation.

According to this configuration, the load on the power supply of the air conditioning device is reduced.

In the vehicle cabin temperature control device defined above, preferably, the air blower is provided in the seat back or headrest of the seat and includes an air blowing port for blowing air toward a neck of the seat occupant.

According to this configuration, temperature-controlled air can be appropriately blown from the seat back or the headrest toward the neck of the seat occupant.

An electric vehicle according to an embodiment of the present invention consists of an electric vehicle including driven wheels driven by an electric motor, and the vehicle cabin temperature control device according to the above embodiment, wherein the electric motor that drives the driven wheels, the electric motor that drives the compression, the seat temperature control device share a common battery as a power source.

According to this configuration, power consumption of the battery is reduced, and reduction in the cruising range of the electric vehicle is minimized.

To achieve the aforementioned task, a certain aspect of the present invention provides a vehicle seat, comprising: a seat body including a seat cushion and a seat back; a buckle pivotally supported by the seat body around a lateral axis, and configured to engage a tongue of a seat belt; and an air conditioning device for adjusting an ambient temperature of a seat occupant, wherein the air conditioning device is connected to the seat cushion so as to be outside of a movable range of the buckle. According to this configuration, since the air conditioning device is connected to the seat cushion so as to be outside of the movable range of the buckle, the movement of the buckle is prevented from being hindered by the air conditioning device.

In the above configuration, preferably, the air conditioning device is positioned so as to overlap with the movable range in front view. According to this configuration, the width of the vehicle seat in the lateral direction can be made smaller than when the air conditioning device does not overlap with the movable range in front view.

In the above configuration, preferably, the air conditioning device is positioned so as to overlap with the movable range in side view. According to this configuration, compared to the case where the air conditioning device does not overlap with the movable range in side view, the forward protrusion of the air conditioning device from the seat body can be minimized.

Further, in the above configuration, preferably, the air conditioning device is positioned outside of the movable range of the tongue engaged by the buckle. According to this configuration, the movement of the tongue is prevented from being hindered by the air conditioning device.

In the above configuration, preferably, the seat cushion includes a frame, a pad member supported by the frame, and a skin member covering a surface of the pad member, and the pad member is provided with a cutout configured to receive the air conditioning device therein. According to this configuration, the size of the vehicle seat can be minimized by placing the air conditioning device in the cutout provided in the pad member.

Further, in the above configuration, preferably, a laterally side part of the seat body is provided with an operation input portion for changing one of a shape, a posture, and a position of the seat body, and the air conditioning device is positioned ahead of a rear end of the operation input portion. According to this configuration, the operation input by the seat occupant is less likely to be obstructed by the air conditioning device.

In the above configuration, preferably, the air conditioning device is positioned ahead of a front end of the operation input portion. According to this configuration, the operation input by the seat occupant is less likely to be obstructed by the air conditioning device.

Further, in the above configuration, preferably, the operation input portion (449) for changing one of a shape, a posture, and a position of the seat body is positioned on a lateral side part of the seat body, and the air conditioning device is positioned between a front end and a rear end of the operation input portion. According to this configuration, the size of the vehicle seat in the fore and aft direction can be minimized.

Further, in the above configuration, preferably, the vehicle seat further comprises an operation input portion for changing one of a shape, a posture, and a position of the seat body, and a laterally outer end of the air conditioning device is located on an inner side of a laterally outer end of the operation input portion. According to this configuration, the operation input by the seat occupant is less likely to be obstructed by the air conditioning device.

In the above configuration, preferably, the seat back is provided with a side airbag that deploys on a side of the occupant, and the air conditioning device is positioned outside of a deployment range of the side airbag. According to this configuration, the deployment of the side airbag is prevented from being hindered by the air conditioning device.

In the above configuration, preferably, the air conditioning device is positioned ahead of the deployment range. According to this configuration, the deployment of the side airbag is prevented from being hindered by the air conditioning device.

In the above configuration, preferably, the seat back is provided with a side airbag that deploys on a side of the seat occupant, a front end of a deployment range of the side airbag being located at a lower end of the deployment range of the side air bag, and an upper end of the air conditioning device is substantially horizontal, a rear end of the air conditioning device being located below the front end of the deployment range. According to this configuration, deployment of the side airbag is less likely to be hindered by the air conditioning device.

In the above configuration, preferably, the seat body further includes a headrest provided with a pillar which is inserted into a tubular pillar guide provided in an upper end of the seat back, and a temperature control device provided with a heat source positioned at an upper end of the seat back behind the pillar guide. According to this configuration, since the heat source is positioned behind the pillar guide, the pillar guide and the pillar restrict the rearward movement of the neck of the seat occupant when a rearward load is applied to the seat occupant so that the neck of the seat occupant is prevented from coming close to the heat source.

In order to accomplish the aforementioned task, a certain aspect of the present invention provides a vehicle having the above-described vehicle seat, wherein a door is provided with a door airbag configured to deploy into the cabin, and the air conditioning device is located outside of a deployment range of the door airbag. According to this configuration, deployment of the door airbag is prevented from being obstructed by the air conditioning device.

To accomplish the aforementioned task, a center console box is provided on a side of the vehicle seat, and the center console box is provided with a storage recess that can be opened to store an article therein, and a lid hinged to an opening edge of the storage recess to open and close the storage recess, wherein the air conditioning device is located outside of a movable range of the lid. According to this configuration, opening and closing of the lid is prevented from being obstructed by the air conditioning device.

To accomplish such a task, a certain aspect of the present invention provides a seat air conditioning device provided in a vehicle seat for air conditioning a region surrounding a seat occupant, wherein the seat air conditioning device includes an inboard side air conditioning device that conditions air from an inboard side, and an outboard side air conditioning device that conditions air from an outboard side, and the outboard side air conditioning device has a greater output than the inboard side air conditioning device. According to this configuration, since the outboard side air conditioning device which conditions air on a side which is more susceptible from the influence of the external air has a greater output than the inboard side air conditioning device, the influence of the external temperature can be minimized.

In the above configuration, preferably, the outboard side air conditioning device and the inboard side air conditioning device each include a blower that blows air toward the seat occupant, and a heat source that adjusts a temperature of the air blown by the blower, wherein the outputs of the outboard side air conditioning device and the inboard side air conditioning device are each determined by a temperature change caused by the corresponding heat source. According to this configuration, the influence of the external air can be reduced by making the temperature change on the outboard side which is more susceptible to the influence of the external air greater than that on the inboard side.

In the above configuration, preferably, the outboard side air conditioning device and the inboard side air conditioning device are provided on the seat cushion of the vehicle seat so as to control a temperature surrounding legs of the seat occupant. According to this configuration, the influence of the external air on the legs of the seat occupant can be minimized.

In the above configuration, preferably, the outboard side air conditioning device and the inboard side air conditioning device are each provided with a duct extending forward from the blower to a front end part of the seat cushion. According to this configuration, the air blown out from the blower can be guided to the feet of the seat occupant.

In the above configuration, preferably, the seat cushion includes a base portion forming a laterally central part thereof, and a pair of side bolsters connected to either lateral edge of the base portion and protruding upward higher than an upper surface of the base portion, and the ducts have front ends that are open at a point lower than an upper surfaces of the side bolsters. According to this configuration, when the thighs of the seat occupant are placed on the side bolsters, the ducts are prevented from coming into contact with the thighs.

In the above configuration, preferably, the seat cushion has a pair of side frames (121A) extending in a fore and aft direction on either side, and a pair of side covers (127) provided on an outer side of the respective side frames, and the ducts are located more inward of the seat than laterally outer ends of the side covers. According to this configuration, the ducts are protected from an external object colliding with the laterally outer sides of the seat cushion.

In the above configuration, preferably, the seat air conditioning device includes a back-side air conditioning device provided in the seat back of the vehicle seat to perform a temperature control by blowing air toward a neck of the seat occupant, and the outboard side air conditioning device has a greater output than the back-side air conditioning device. According to this configuration, the influence of the external air is particularly favorably reduced on the outboard side of the legs of the occupant which is more likely to be affected by the external air than the neck.

In the above configuration, preferably, the back-side air conditioning device includes a blower for forwarding air to a neck of a seat occupant, and a heat source for changing a temperature of the air to be forwarded to the neck, the output of the outboard side air conditioning device being determined by a temperature change of the air caused by the heat source of the outboard side air conditioning device, the output of the back-side air conditioning device being determined by a temperature change of the air caused by the heat source of the back-side air conditioning device. According to this configuration, since the temperature change of the air forwarded to the outboard side of the legs is greater than that of the air forwarded to the neck, the influence of the external air can be effectively reduced on the outboard side of the legs which is more susceptible to the influence from the external air.

In the above configuration, preferably, the seat air conditioning device includes a head-side air conditioning device which is provided in the headrest, and performs temperature adjustment by blowing air to a head of the seat occupant, and the outboard side air conditioning device has a greater output than the head-side air conditioning device. According to this configuration, the influence of the external air on the outboard side of the legs which is more susceptible to the influence of the external air is effectively reduced.

In the above configuration, preferably, the head-side air conditioning device includes a blower for forwarding air to a head of the seat occupant, and a heat source for changing a temperature of the air forwarded to the head, wherein the output of the outboard side air conditioning device is determined by a temperature change of the air caused by the heat source of the outboard side air conditioning device, and the output of the head-side air conditioning device is determined by a temperature change of the air caused by the heat source of the head-side air conditioning device. According to this configuration, since the temperature change of the air blown to the outboard side of legs of the seat occupant is greater than that of the air blown to a head of the seat occupant, the influence of the external air on the outboard side of the legs which is more susceptible to the influence of the external air is effectively reduced.

In the above configuration, preferably, the air conditioning system includes a temperature sensor that acquires a temperature of the vehicle cabin in which the vehicle seat is placed, and a control unit for controlling the seat air conditioning device based on the temperature acquired by the temperature sensor, wherein the control unit is configured to drive the seat air conditioning device to cool the seated occupant when the temperature acquired by the temperature sensor is equal to or higher than an upper threshold value, and to warm the seat occupant when the temperature acquired by the temperature sensor is equal to or lower than a lower threshold value. According to this configuration, air conditioning can be performed based on the temperature in the vehicle cabin where the seat occupant is located.

In the above configuration, preferably, the air conditioning system includes a temperature sensor that acquires a surface temperature of the vehicle seat, and a control unit that controls the seat air conditioning device based on the temperature acquired by the temperature sensor, wherein the control unit is configured to drive the seat air conditioning device to cool the seated occupant when the temperature acquired by the temperature sensor is equal to or higher than an upper threshold value, and to warm the seat occupant when the temperature acquired by the temperature sensor is equal to or lower than a lower threshold value. According to this configuration, air conditioning can be performed based on the surface temperature of the vehicle seat with which the seat occupant is in contact.

In the above configuration, preferably, the seat air conditioning device includes a back-side air conditioning device provided in the seat back of the vehicle seat to perform a temperature control by blowing air toward a neck of the seat occupant, a temperature sensor for acquiring a surface temperature of the vehicle seat or a temperature in the vehicle cabin, and a control unit for controlling the seat air conditioning device based on the temperature acquired by the temperature sensor, wherein the control unit causes an output of the back-side air conditioning device to be greater than that of the outboard side air conditioning device when the temperature acquired by the temperature sensor is equal to or higher than an upper threshold value, and the output of the outboard side air conditioning device to be greater than that of the back-side air conditioning device when the temperature acquired by the temperature sensor is equal to or lower than a lower threshold value. According to this configuration, when the temperature is high enough for the seated occupant to feel hot, the output of the back-side air conditioning device that air-conditions the area around the neck of the seat occupant is increased. When the temperature is low enough for the seated occupant to feel cold, the output of the outboard side air conditioning device that air-conditions the area around the legs of the seat occupant is increased. Thus, the neck is cooled more than the legs when the seat occupant feels hot, and the legs are warmed more than the neck when the seat occupant feels cold so that the comfort of the vehicle seat can be improved.

Further, in the above configuration, preferably, the air conditioning system further includes a vehicle cabin air conditioning device that air-conditions a vehicle cabin in which the vehicle seat is placed, wherein the vehicle cabin air conditioning device is configured to be activated when the temperature acquired by the temperature sensor is equal to or higher than a predetermined value following an activation of the seat air conditioning device. According to this configuration, when the occupant is seated, the cabin air conditioning device starts operating following the seat air conditioning device. Since the air conditioning devices start operating in the order of closeness to the seat occupant, the region around the seat occupant is more promptly air-conditioned as compared to the case where the seat air conditioning device starts operating later than the vehicle cabin air conditioning device.

Further, in the above configuration, preferably, the air conditioning system further includes a vehicle cabin air conditioning device that air-conditions a vehicle cabin in which the vehicle seat is placed, wherein the vehicle cabin air conditioning device is configured to be activated when the temperature acquired by the temperature sensor continues to be equal to or higher than a predetermined value following an activation of the seat air conditioning device. According to this configuration, when the occupant is seated, the cabin air conditioning device starts operating only after the temperature acquired by the temperature sensor continues to be equal to or higher than the predetermined value. As a result, an erroneous operation of the cabin air conditioning device due to an erroneous temperature detection by the temperature sensor can be avoided.

To accomplish the aforementioned task, a certain aspect of the present invention provides a headrest for a vehicle seat, comprising: a pair of headrest pillars extending upward from an upper part of a seat back and arranged laterally one next to another and each having a tubular configuration internally defining a pillar hole therein; a plate connected to the headrest pillars so as to face in a fore and aft direction; a temperature control unit positioned under the plate; a protective cover positioned behind the plate and defining a hollow interior jointly with the plate and the temperature control unit: a pad member supported by the headrest pillars, the plate and the temperature control unit: and a skin member covering the pad member, wherein the temperature control unit includes a casing fixed to the plate and having an air passage extending from an air inlet to an air blowing port, and a wire harness hole communicating the air passage with the hollow interior; a temperature control portion fixed inside the casing and configured to control a temperature of air introduced from the air inlet into the casing; a blower fixed inside the casing and configured to blow temperature-controlled air out of the casing via the air blowing port; and a wire harness for supplying electric power to the temperature control portion and the blower, and wherein a tip end of the headrest pillar is positioned inside the hollow interior, and the wire harness extends from the temperature control portion and the blower to a lower end of the headrest pillar via the wire harness hole, the hollow interior and the pillar hole.

According to this configuration, since the tip end of the headrest pillar is positioned inside the hollow interior, the wire harness connected to the temperature control unit and the blower can extend through the wire harness hole, the hollow interior, and the pillar hole, and project from the lower end of the headrest pillar. Since these inner space parts are separated from the pad member by the plate, the protective cover and the casing, the pad member can be foam-molded without causing the pad member to interfere with the wire harness extending through the headrest pillar in the headrest for a vehicle seat.

In the above configuration, preferably, the protective cover includes a plate-shaped cover central part extending downward toward a rear part thereof, and a pair of cover side parts extending forward and downward from either side edge of the cover central part, and front edges of the cover central part and the cover side parts abuts against the plate.

According to this configuration, the plate and the protective cover can be firmly connected to each other.

In the above configuration, preferably, side edges of the connecting piece are each provided with a slanted piece slanted downward toward a laterally outer side, and the headrest pillars are connected to the corresponding slanted pieces.

According to this configuration, the headrest pillars can be connected to the plate with ease.

In the above configuration, preferably, side edges of the connecting piece are each provided with a slanted piece slanted downward toward a laterally outer side, and the headrest pillars are connected to the corresponding slanted pieces.

According to this configuration, the headrest pillars can be connected to the plate with ease.

In the above configuration, preferably, a front end of the temperature control device is positioned behind a front end of the plate.

According to this configuration, when an impact is applied to the headrest from the front, the impact is prevented from being transmitted to the temperature control unit.

In the above configuration, preferably, the air inlet is provided on one side part of the casing.

According to this configuration, by providing the headrest on an appropriate vehicle seat, the air inlet can be positioned on the side of a side window of the vehicle so that the introduction of air into the air inlet is facilitated.

In the above configuration, preferably, a plurality of louver plates each extending downward toward an outer end thereof are provided in the air inlet.

According to this configuration, even if rainwater or the like enters the interior of the vehicle through the side window of the vehicle, the rainwater or the like is less likely to enter the casing through the air inlet.

In the above configuration, preferably, the air blowing port is provided in a front part of the casing, and the louver plates extend forward toward an outer end thereof.

According to this configuration, the introduction of the air which is temperature-controlled by the temperature control portion into the casing through the air inlet is facilitated. Thereby, the temperature control unit can efficiently adjust the temperature of the air surrounding the air inlet.

In the above configuration, preferably, a rear end of the air inlet is positioned ahead of the headrest pillars in side view.

According to this configuration, the introduction of the air which is temperature-controlled by the temperature control portion into the casing through the air inlet is facilitated. Thereby, the temperature control unit can efficiently control the temperature of the air around the air inlet.

To accomplish the aforementioned task, another aspect of the present invention provides a method for manufacturing a headrest for a vehicle seat, comprising: a first step of fixing a plate facing in a fore and aft direction to a pair of headrest pillars extending upward on either side and each having a tubular configuration defining a pillar hole therein; a second step of fixing an upper casing part having a wire harness hole passed vertically therethrough to a lower part of the plate; a third step of fixing a protective cover defining a hollow interior jointly with the plate and the upper casing part to a lower part of the plate so as to position tip ends of the headrest pillars in the hollow interior; a fourth step of attaching a pad member to the headrest pillars, the plate, and the upper casing part; a fifth step of connecting a wire harness that extends from a lower end of the headrest pillar through the pillar hole, the hollow interior and the wire harness hole to a temperature control portion for controlling a temperature of air introduced from outside the headrest and a blower that blows the air which is temperature-controlled to outside the headrest; a sixth step of attaching the temperature control portion and the blower to the upper casing part; a seventh step of fixing a lower casing part (56) to a lower part of the upper casing part such that the upper casing part and the lower casing part jointly define an air passage (67) extending from an air inlet (64) to an air blowing port (65), and the temperature control portion and the blower are positioned inside the air passage; and an eighth step of covering an assembly formed in the seventh step with a skin member (81).

According to this configuration, since the tip ends of the headrest pillars are positioned in the hollow interior, the wire harness connected to the temperature control portion and the blower can extend through the wire harness hole, the hollow interior, and the pillar hole, and protrude from the lower end of the headrest pillar. Since these space parts are separated from the pad member by the plate, the protective cover and the casing, the headrest can be manufactured by foam-molding the pad member without causing the wire harness extending through the headrest pillar to interfere with the pad member.

In the above configuration, preferably, the headrest pillars and the plate are made of metal, and the headrest pillars and the plate are welded together in the first step.

According to this configuration, the headrest pillars and the plate can be fixed to each other with a simple means.

In the above configuration, preferably, the upper casing part is provided with an engaging portion, and the plate is provided with an engaged portion that is configured to engage with the engaging portion, the engaging portion and the engaged portion being engaged with each other in the second step.

According to this configuration, the plate and the upper casing part can be fixed to each other with a simple means.

In the above configuration, in the fifth step, preferably, the headrest pillar, the plate, and the upper part of the casing are placed in a mold, and a molding material is supplied into the mold to perform foam molding.

According to this configuration, the pad member can be fixed to the headrest pillar, the plate, and the upper casing part with a simple means.

In the above configuration, preferably, in the seventh step, the upper casing part and the lower casing part are fastened to each other.

According to this configuration, the upper casing part and the lower casing part can be joined to each other with a simple means.

BRIEF DESCRIPTION OF THE DRAWING(S)

FIG. 1 is a simplified side view of an electric vehicle fitted with a vehicle cabin temperature control device according to a first embodiment of the present invention;

FIG. 3 is a block diagram of a refrigeration cycle of an air conditioning device used in the vehicle cabin temperature control device of the first embodiment;

FIG. 21 is a block diagram of the air conditioning system of the seventh embodiment;

FIG. 29 is an explanatory view showing the relationship between the deployment range of a side air bag and a seat cushion air conditioning device fitted to a vehicle seat in an air conditioning system according to a tenth embodiment of the present invention;

FIG. 33 is an enlarged front perspective view of the headrest of the sixteenth embodiment;

FIG. 34 is a front view of the headrest of the sixteenth embodiment;

FIG. 36 is a longitudinal sectional view of the headrest of the sixteenth embodiment taken along line XXXVI-XXXVI in FIG. 34;

DESCRIPTION OF THE PREFERRED EMBODIMENT(S)

Figure 2:
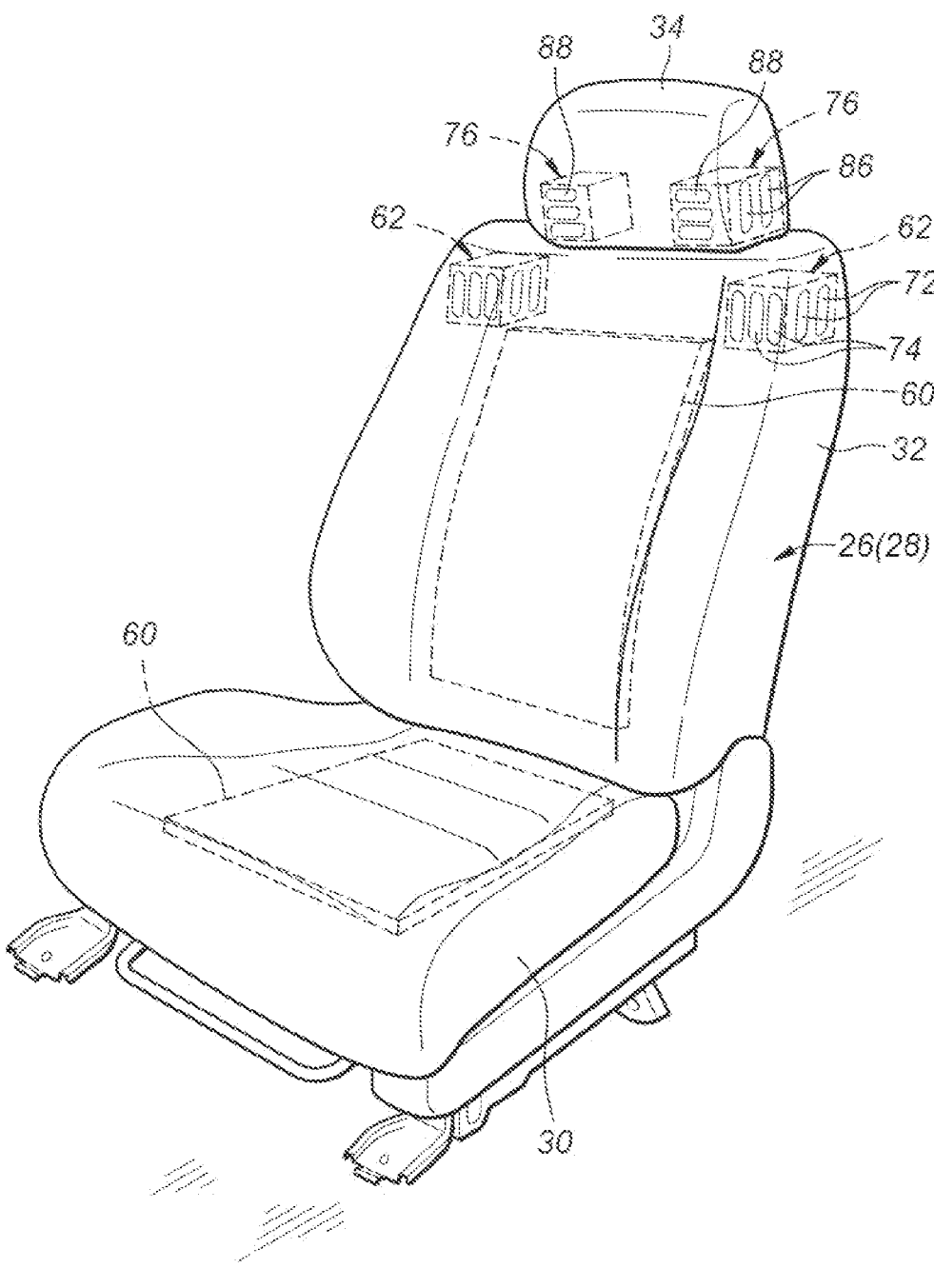
FIG. 2 is a perspective view of a seat used for the vehicle cabin temperature control device of the first embodiment.

A vehicle temperature control device, and an electric vehicle fitted with the vehicle temperature control device will be described in the following with reference to the appended drawings.

Figure 1:
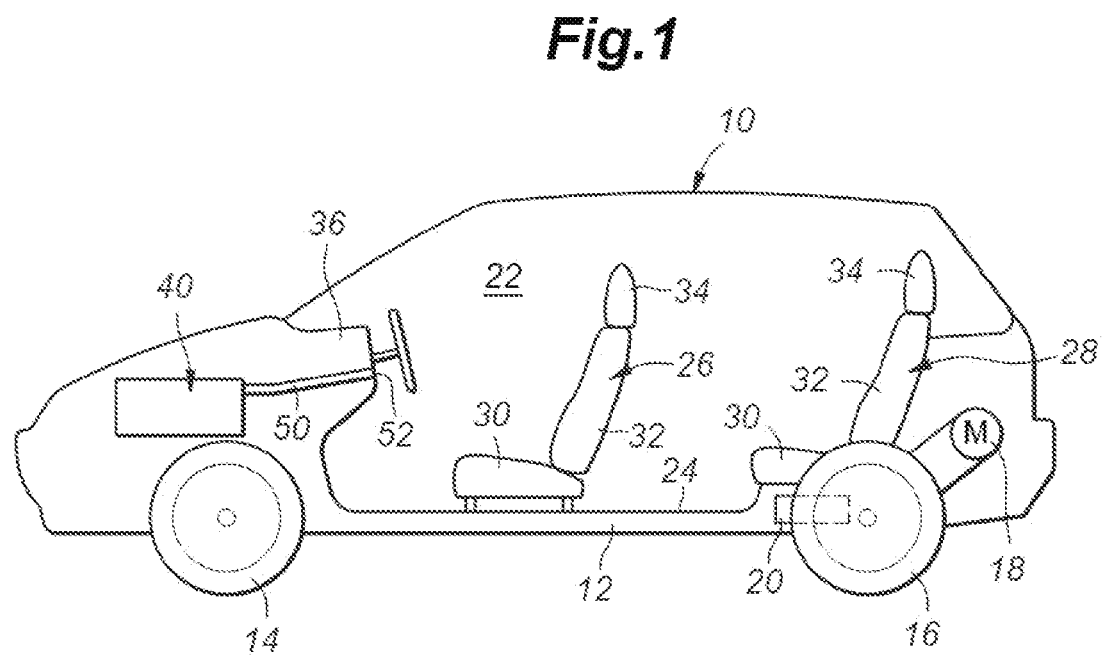

FIG. 1 shows an electric vehicle 10. The electric vehicle 10 includes a vehicle body 12, a pair of front wheels 14 fitted to either side of the vehicle body 12, a pair of rear wheels 16 fitted to either side of the vehicle body 12, a travel electric motor 18 for driving the rear wheels 16, a rechargeable battery 20 provided in the vehicle body 12 to serve as a power source for the travel electric motor 18, a cabin 22 defined within the vehicle body 12, and front and rear seats 26, 28 mounted on a floor panel 24 of the cabin 22.

As shown in FIG. 2, the front seats 26 and the rear seats 28 are each provided with a seat cushion 30, a seat back 32 provided in a rear part of the seat cushion 30, and a headrest 34 provided in an upper part of the seat back 32.

Figure 3:
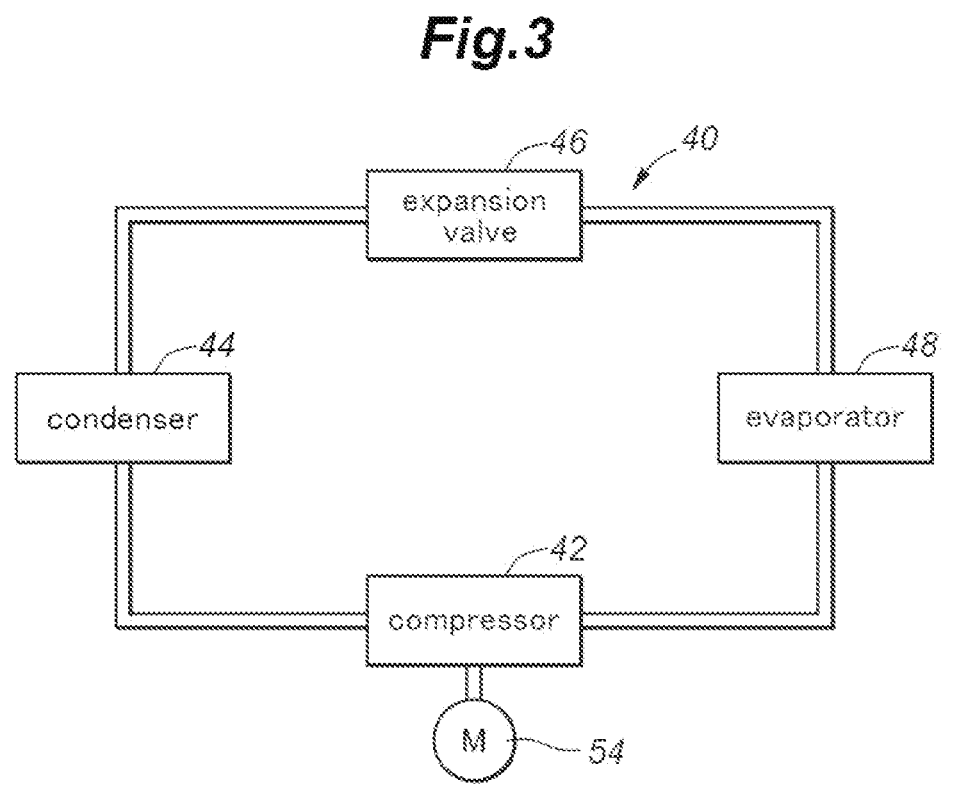

The electric vehicle 10 is fitted with an air conditioning device 40 serving as a cabin temperature control device. The air conditioning device 40 is based on a refrigeration cycle system utilizing a refrigerant circuit including a compressor 42, a condenser 44, an expansion valve 46 and an evaporator 48, as shown in FIG. 3. The air conditioning device 40 is switched between a cooling mode and a heating mode by switching the circulation direction of the refrigerant in the refrigerant circuit, and the temperature of the air that is to be forwarded to the duct is adjusted by heat exchange with the fan air in the condenser 44 or the evaporator 48. The air is blown into the cabin 22 from an air blowing port 52 provided in an instrument panel 36 via a duct 50 (see FIG. 1). The refrigerating cycle air conditioning device 40 can easily provide an appropriate air conditioning capacity.

The compressor 42 is driven by an air conditioning device electric motor 54. The battery 20 is shared by the air conditioning device electric motor 54 and the travel electric motor 18 as the common power source.

As shown in FIG. 2, the seat cushions 30 and the seat backs 32 of the front seats 26 and the rear seats 28 are each incorporated with a flexible electric seat heater 60.

The seat heater 60 is able to warm up upon energization thereof more rapidly than the air conditioning device 40 raises the cabin temperature.

Figure 4:
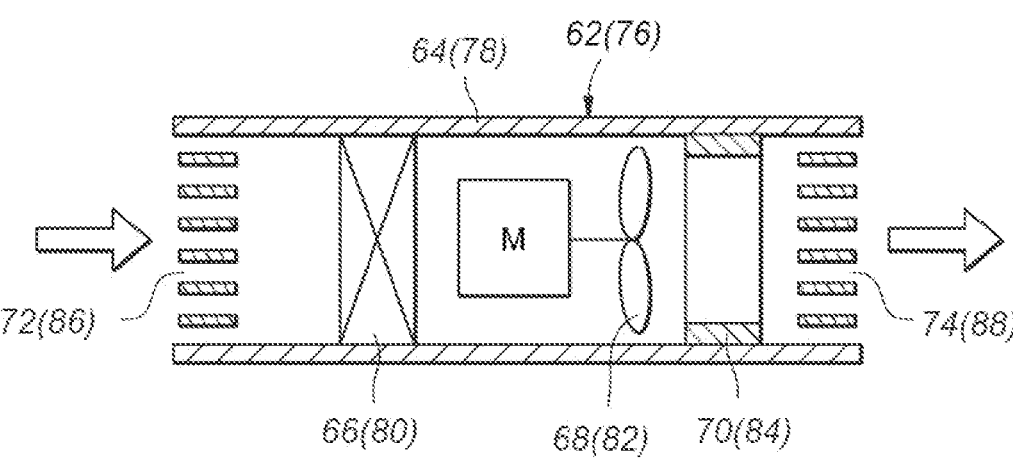
FIG. 4 is a sectional view of an air blower used in the vehicle cabin temperature control device of the first embodiment.

A pair of first air blowers 62 are provided on either side of an upper part of the seat back 32. Each first air blower 62 includes an air duct 64 which is fitted with an electric heater 66, an electric fan 68, and a Peltier device 70 in an intermediate part of the air duct 64, as shown in FIG. 4. In each first air blower 62, air is drawn into the air duct 64 from an air inlet 72 opening on the corresponding side of the seat back 32, and expelled from an air blowing port 74 opening at a front side part of the seat back 32 on the corresponding side. Thereby, warm air or cool air may be blown toward the neck of the seat occupant from the air blowing ports 74 opening at the front side parts of the seat back 32.

Since the first air blowers 62 are incorporated in the seat back 32, the air ducts 64 can be so short that the pressure loss of the air flowing through the air ducts 64 is minimized, and the air-conditioned air can be properly blown from the air blowing ports 74 toward the neck of the seat occupant.

A pair of second air blowers 76 are provided on either side of an upper part of the headrest 34. Each second air blower 76 has a substantially the same structure as the first air blowers 62, and as shown in FIG. 4, includes an air duct 78 which is fitted with an electric fan 82 and a Peltier device 84 in an intermediate part thereof. Each second air blower 76 draws air into the air duct 78 from an air inlet 86 opening on the corresponding side of the headrest 34, and expels the air from an air blowing port 88 opening at a front side part of the headrest 34 on the corresponding side. Thereby, warm air or cool air may be blown toward the neck of the seat occupant from the air blowing ports 88 opening at the front side parts of the headrest 34 as shown in FIG. 2.

Since the second air blowers 76 are incorporated in the headrest 34, the air ducts 78 can be so short that the pressure loss of the air flowing through the air ducts 78 can be minimized, and the air-conditioned air can be properly blown from the air blowing ports 88 toward the neck of the seat occupant.

The first air blowers 62 and the second air blowers 76 have a rapid heating capability upon activation thereof as compared to the capability of the air conditioning device 40 to raise the cabin temperature. The first air blowers 62 and the second air blowers 76 may be operated in a selective manner depending on the build and preference of the seat occupant.

The seat heater 60, the first air blowers 62, and the second air blowers 76 are temperature control devices for the seat, and share the battery 20 as the power source with the travel electric motor 18. The individual power consumptions of the seat heater 60, the first air blowers 62 and the second air blowers 76 are less than the power consumption of the air conditioning device 40. Preferably, the individual power consumptions of the seat heater 60, the first air blowers 62, and the second air blowers 76 are smaller than the difference (increase in power consumption) between the power consumption of the air conditioning device 40 during the rapid heating operation and the power consumption of the air conditioning device 40 during normal operation. More preferably, the total power consumption of the seat heater 60, the first air blowers 62 and the second air blowers 76 is less than the increase in the power consumption of the air conditioning device 40 during the rapid heating operation from that during the normal operation.

Figure 5:
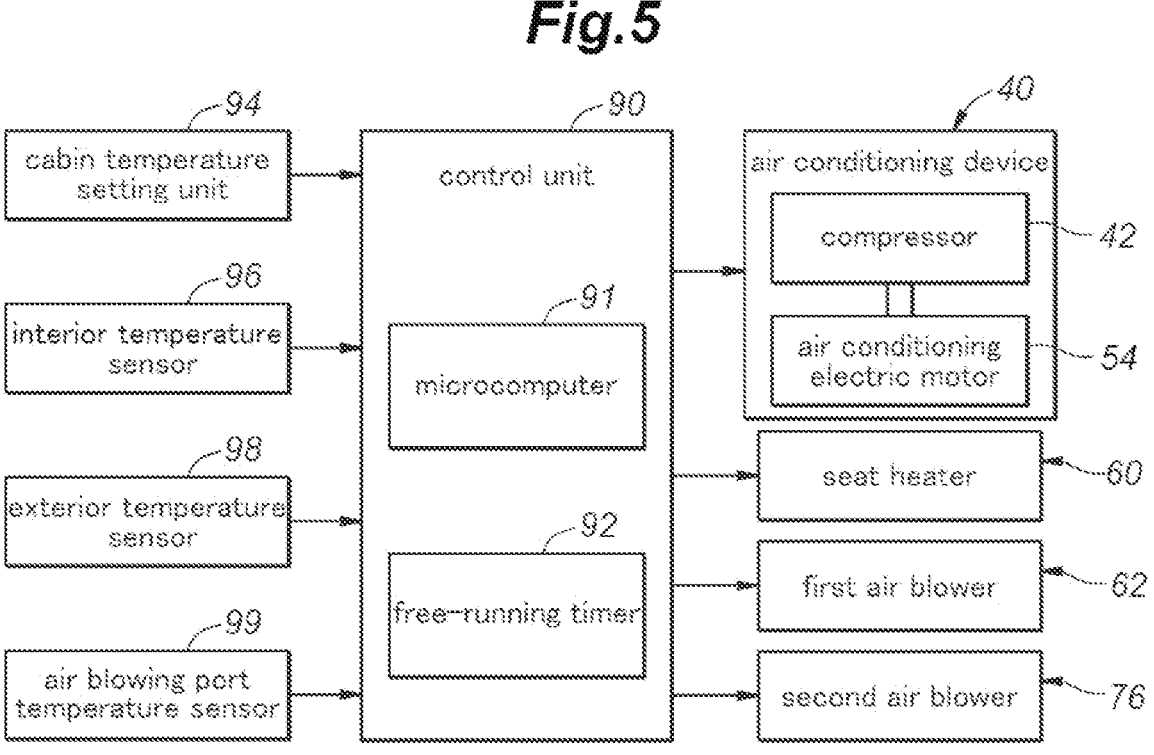
FIG. 5 is a block diagram of a control system for the vehicle cabin temperature control device of the first embodiment.

The control system of the temperature control device of the first embodiment will be described in the following with reference to FIG. 5.

The control unit 90 of the temperature control device is an electronic control unit that controls all of the air conditioning device 40, the seat heater 60, the first air blowers 62 and the second air blowers 76. The control unit 90 includes a microcomputer 91 and a free-running timer 92, receives various pieces of information from a cabin temperature setting unit 94, a cabin temperature sensor 96, a vehicle exterior temperature sensor 98, and an air blowing port temperature sensor 99, and forwards control commands to an air conditioning device electric motor 54, the seat heater 60, the first air blowers 62 and the second air blowers 76 to control them.

When a start switch (not shown in the drawings) of the air conditioning device 40 is turned on by an occupant, the control unit 90 controls the air conditioning device 40 so as to bring the cabin temperature to a target temperature according to the target temperature which is set by the cabin temperature setting unit 94, the cabin temperature detected by the cabin temperature sensor 96, the vehicle exterior temperature detected by the vehicle exterior temperature sensor 98, and the outlet temperature of the air blown from the air blowing ports 52 detected by the air blowing port temperature sensor 99.

When the detected cabin temperature is lower than the set temperature set by the cabin temperature setting unit 94, the air conditioning device 40 operates in a heating mode in which warm air is blown out. When the cabin temperature is higher than the set temperature, the air conditioning device 40 operates in a cooling mode in which cold air is blown out.

When the start switch (not shown in the drawings) of the air conditioning device 40 is turned on, or when the air conditioning device 40 is started, the control unit 90 performs a control action whereby the seat heater 60 and the first air blower 62 or the second air blower 76 which are seat temperature control devices for a prescribed period of time. The prescribed period of time during which the seat heater 60 and the first air blower 62 or the second air blower 76 operate is given as a time period determined by the free-running timer 92. The prescribed period of time may be based on the heat capacity of the air conditioning device 40 or the difference between the cabin temperature and the set temperature of the air conditioning device 40.

Figure 6:
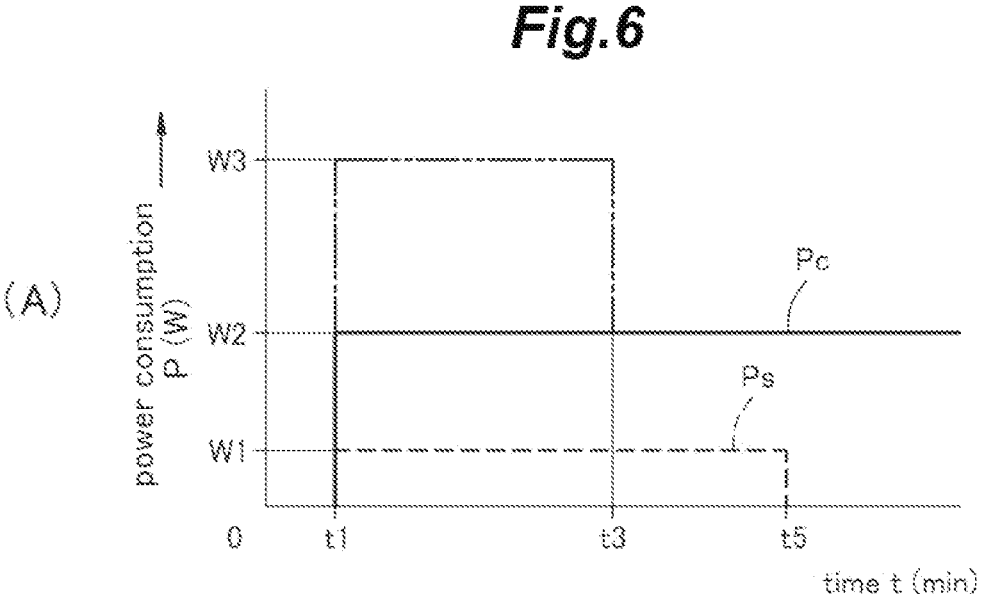
FIG. 6 shows (A) a time chart of the power consumption and (B) a time chart of the temperature in the vehicle cabin temperature control device of the first embodiment.
Figure 6:
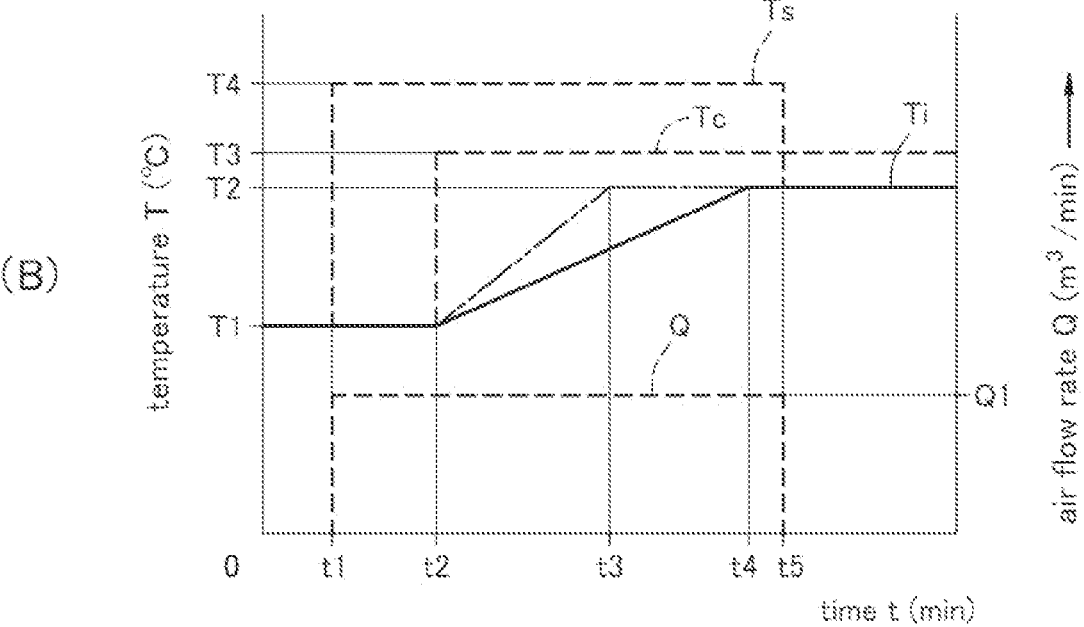
Figure 7:
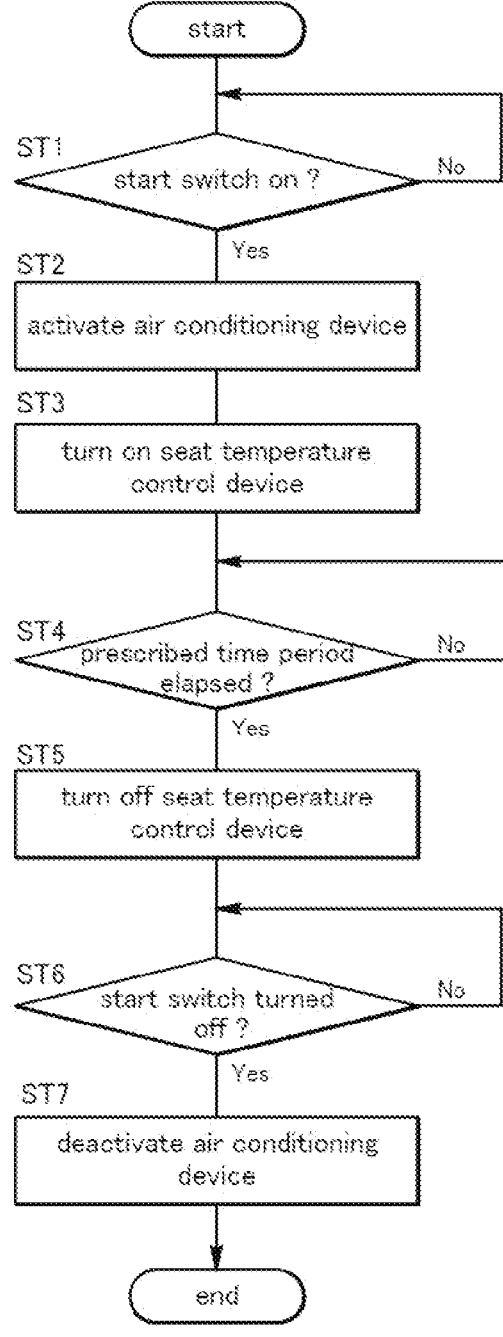
FIG. 7 is a flowchart showing the control flow of the vehicle cabin temperature control device of the first embodiment.

Next, the mode of operation (heating mode) of the first embodiment will be described in the following with reference to the time chart shown in FIG. 6 and the flow chart shown in FIG. 7.

When the start switch of the air conditioning device 40 is turned on at time t1 (step ST1: yes), the air conditioning device 40 is started (step ST2). At the same time, the seat heater 60 and the first air blowers 62 or the second air blowers 76 are turned on (step ST3).

The air conditioning device 40 at this time is operating under a normal operation mode, and as shown in FIG. 6(A), the power consumption Pc of the air conditioning device 40 under the normal operation is a power value W2. The total power consumption Ps of the seat heater 60 and the first air blowers 62 or the second air blowers 76, which are considered as the seat temperature control device (which may be referred to as the power consumption Ps of the seat temperature control device) is a power value W1. The power value W1 is smaller than the power value W2.

The seat heater 60 is able to heat up more quickly than the air conditioning device 40, and starts warming the buttocks and back of the seat occupant by thermal conduction at time t1. As a result, substantially at the same time as the air conditioning device 40 is activated, the seated occupant feels the warmth at the buttocks and the back substantially instantaneously.

The first air blowers 62 or the second air blowers 76 also have a rapid heating capability as compared to the air conditioning device 40, and as shown in FIG. 6(B), starts blowing air with a blowing air temperature Ts equal to temperature T4 at a prescribed air flow rate Q1 from the air blowing ports 74 or 88 toward the neck of the seat occupant. As a result, the neck of the seat occupant is warmed substantially without any time delay from the activation of the air conditioning device 40. A carotid artery extends in the neck, and it is known that the human body can be efficiently warmed by warming the area near the carotid artery. Therefore, even though the air flow rate Q1 and the blowing air temperature Ts may be relatively low, the seat occupant can experience a sufficient warmth. As a result, the seated occupant can quickly obtain a comfortable temperature environment substantially at the same time as the start switch of the air conditioning device 40 is turned on.

At time t2 or upon elapsing of a prescribed time period from time t1, the air conditioning device 40 reaches a condition to be able to blow out air which is adequately warmed for warming the cabin, or starts blowing air with a blowing air temperature Tc which is equal to temperature T3 from the air blowing ports 52. As a result, the cabin temperature Ti starts rising. At time t4 or upon elapsing of a certain period of time, the cabin temperature Ti reaches the air conditioning set temperature T2. Thereafter, the air conditioning device 40 operates so that the cabin temperature Ti is maintained at the air conditioning set temperature T2.

At time t5 following a short period from time t4 or upon elapsing of a prescribed period of time from the activation of the air conditioning device 40 (step ST4: Yes), the seat heater 60 and the first air blowers 62 or the second air blowers 76 are turned off (step ST5).

Thereafter, when the start switch is turned off (step ST6: yes), the operation of the air conditioning device 40 is stopped (step ST7).

The integrated value of the total power consumption of the air conditioning device 40 and the seat temperature control device during the normal operation from time t1 to time t4 is given by (W1+W2)×(t4−t1). When the air conditioning device 40 is in the rapid heating operation, the power consumption Pc of the air conditioning device 40 becomes equal to a power value W3 larger than the power value W2, as indicated by the imaginary line in FIG. 6(A) so that the cabin temperature Ti reaches the air conditioning set temperature T2 at time t3, which is earlier than time t4. The integrated value of the power consumption of the air conditioning device 40 from time t1 when the rapid heating operation is started to time t3 is W3×(t3−t1). Since the increase in power consumption (W3−W2) due to the rapid heating operation is much smaller than the power value W1 of the power consumption Ps of the seat temperature control device, or (W3−W2)>>W1, {(W1+W2)×(t4−t1)}<{W3× (t3−t1)}, so that the power consumption of the battery 20 is reduced in a corresponding manner.

In this manner, according to the first embodiment, it is possible to quickly achieve a comfortable temperature environment for the seat occupant and to reduce the power consumption of the battery 20. This reduction in power consumption of the battery 20 contributes to an increase in the traveling range of the electric vehicle 10.

Second Embodiment

A cabin temperature control device according to a second embodiment of the present invention will be described in the following with reference to FIGS. 8 to 12. In FIGS. 8 to 12, parts corresponding to those in FIG. 6 are denoted by the same reference numerals as those in FIG. 6, and description of such parts may be omitted in the following disclosure.

Figure 8:
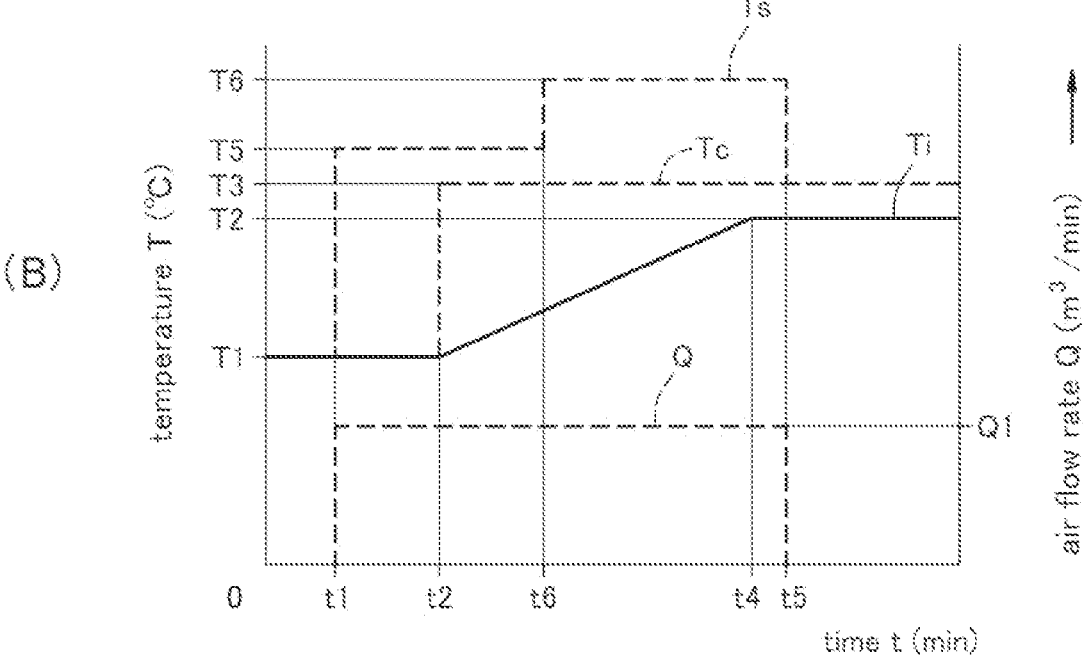
FIG. 8 is (A) a time chart of the power consumption and (B) a time chart of the temperature in the vehicle cabin temperature control device according to a second embodiment of the present invention.

In the second embodiment shown in FIG. 8, the control unit 90 controls the blowing air temperature Ts to be at temperature T5 which is lower than temperature T4 in the previous embodiment during an operation period of the first air blowers 62 or the second air blowers 76 lasting from time t1 to time t6, which is an earlier part of the time period from time t1 to time t5, and at temperature T6 which is higher than temperature T4 in the previous embodiment during an operation period of the first air blowers 62 or the second air blowers 76 lasting from time t6 to time t5, which is a latter part of the time period from time t1 to time t5.

In this case, the power consumption Ps of the seat temperature control device during the period lasting from time t1 to time t6 is equal to a power value W4 which is lower than the power value W1, and the power consumption Ps during the period lasting from time t6 to time t5 is equal to power value W5 which is higher than the power value W1.

In the second embodiment, similarly to the first embodiment defined above, a comfortable temperature environment for the occupant can be quickly achieved, and the power consumption of the battery 20 can be reduced.

In this embodiment, since the blowing air temperature Ts of the warm air blown out from the air blowing port 74 or 88 is lower in the earlier part of the blowing operation than in the latter part of the blowing operation so that relatively warm air is prevented from being blown against the neck of the seat occupant at the beginning of the blowing operation so that the comfort for the seat occupant can be improved.

The blowing air temperature Ts of the warm air blown out from the air blowing ports 74 or 88 may increase either in a stepwise manner or continuously over time.

Third Embodiment

Figure 9:
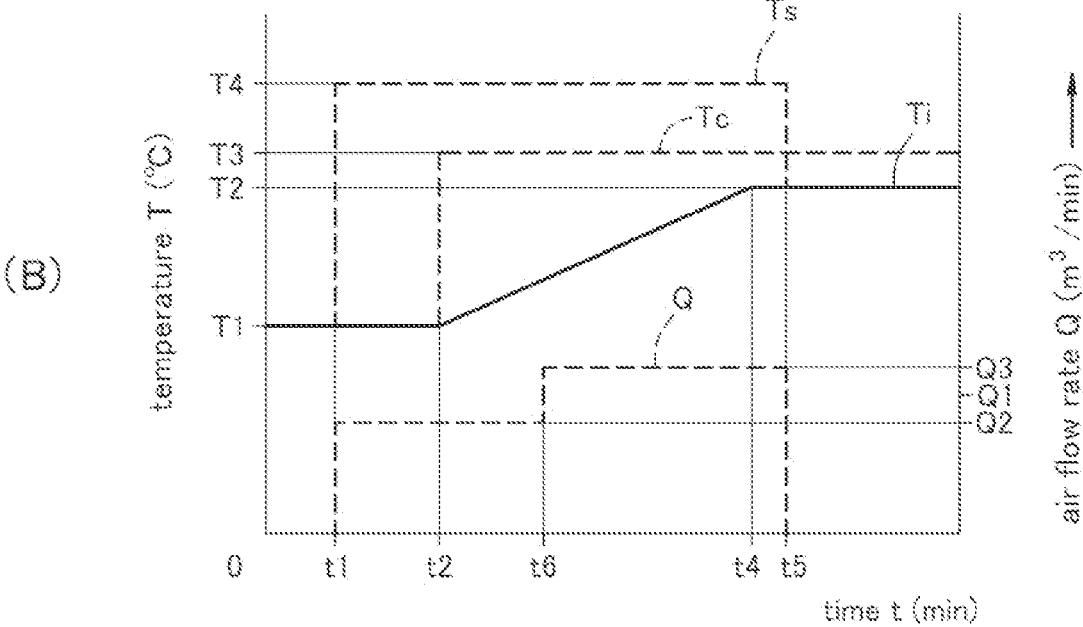
FIG. 9 is (A) a time chart of the power consumption and (B) a time chart of the temperature in the vehicle cabin temperature control device according to a third embodiment of the present invention.

In the third embodiment shown in FIG. 9, the control unit 90 controls the air flow rate Q to be at flow rate Q2 which is less than flow rate Q1 in the previous embodiment during an operation period of the first air blowers 62 or the second air blowers 76 lasting from time t1 to time t6, which is an earlier part of the time period from time t1 to time t5, and at flow rate Q3 which is greater than flow rate Q1 in the previous embodiment during an operation period of the first air blowers 62 or the second air blowers 76 lasting from time t6 to time t5, which is a latter part of the time period from time t1 to time t5.

In this case, the power consumption Ps of the seat temperature control device during the time period from time t1 to time t6 is equal to a power value W6 which is less than the power value W1, and the power consumption Ps during the period from time t6 to time t5 is power value W7 which is greater than the power value W1.

In the third embodiment, similarly to the first embodiment defined above, a comfortable temperature environment for the seat occupant can be quickly achieved, and the power consumption of the battery 20 can be reduced.

In the third embodiment, since the flow rate Q of the warm air blown out from the air blowing ports 74 or 88 is smaller in the earlier part of the blowing operation than in the latter part, the warm air is prevented from hitting the neck of the seat occupant with a large air volume from the beginning of the blowing operation so that the comfort of the seat occupant is improved.

The flow rate Q of the warm air blown out from the air blowing ports 74 or 88 may increase either in a stepwise manner or continuously over time.

Fourth Embodiment

Figure 10:
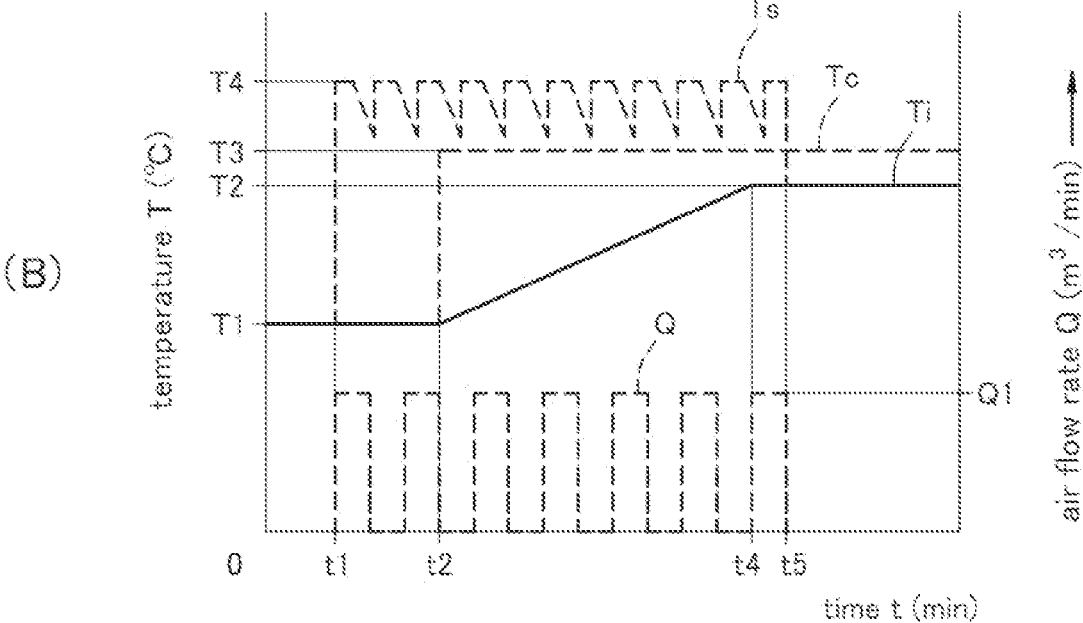
FIG. 10 is (A) a time chart of the power consumption and (B) a time chart of the temperature in the vehicle cabin temperature control device according to a fourth embodiment of the present invention.

In the fourth embodiment shown in FIG. 10, the control unit 90 turns on/off the first air blowers 62 or the second air blowers 76 in an intermittent manner from time t1 to time t5.

In this case, the average value of the power consumption Ps of the seat temperature control device including the first air blowers 62 or the second air blowers 76 during the time period lasting from time t1 to time t6 is reduced compared to the case of continuous operation.

Thus, in the fourth embodiment, the power consumption of the battery 20 is further reduced, a comfortable temperature environment for the seat occupant can be quickly achieved, and the power consumption of the battery 20 can be reduced.

Fifth Embodiment

Figure 11:
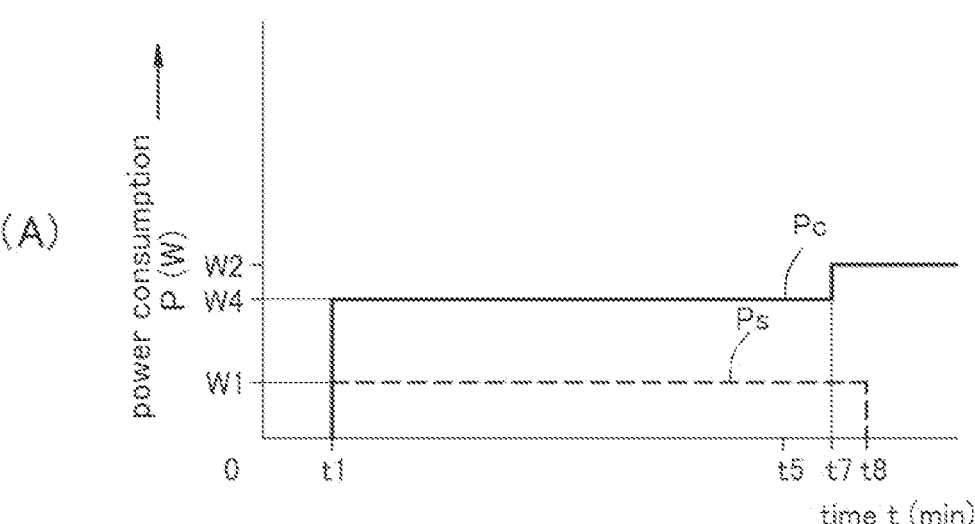
FIG. 11 is (A) a time chart of the power consumption and (B) a time chart of the temperature in the vehicle cabin temperature control device according to a fifth embodiment of the present invention.
Figure 11:
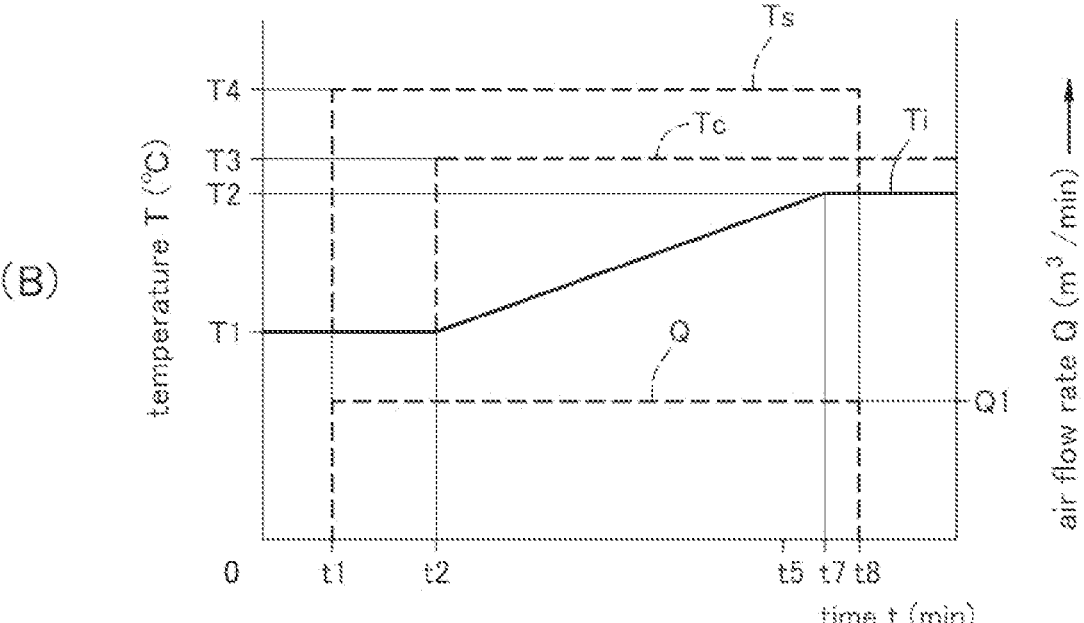

In the fifth embodiment shown in FIG. 11, the control unit 90 controls the air conditioning device 40 such that the power consumption Pc of the air conditioning device 40 is equal to a power value W4 which is smaller than the power value W2 from the start of operation until the cabin temperature Ti reaches the air conditioning set temperature T2.

Since the power consumption Pc of the air conditioning device 40 is decreased from the power value W2 to the power value W4, the time point at which the cabin temperature Ti reaches the air conditioning set temperature T2 is delayed from the time point t4 to the time point t7. As a result, the time point at which the seat temperature control device formed by the seat heater 60 and the first air blowers 62 or the second air blowers 76 is turned off is delayed from time t5 to time t8 in a corresponding manner.

In the fifth embodiment, the time required for the cabin temperature Ti to reach the air conditioning set temperature T2 after the start of the air conditioning device 40 becomes longer, but the load on the battery 20 during this period is reduced, and the heat generation of the battery 20 is reduced. Even though the time required for the cabin temperature Ti to reach the air conditioning set temperature T2 after the start of the air conditioning device 40 is extended, owing to the operation of the seat heater 60 and the first air blowers 62 or the second air blowers 76, the comfort of the seat occupant regarding temperature is not impaired.

As a result, in the fifth embodiment, heat generation of the battery 20 is reduced, and a comfortable temperature environment for the seat occupant can be quickly achieved while the power consumption of the battery 20 is reduced.

Sixth Embodiment

Figure 12:
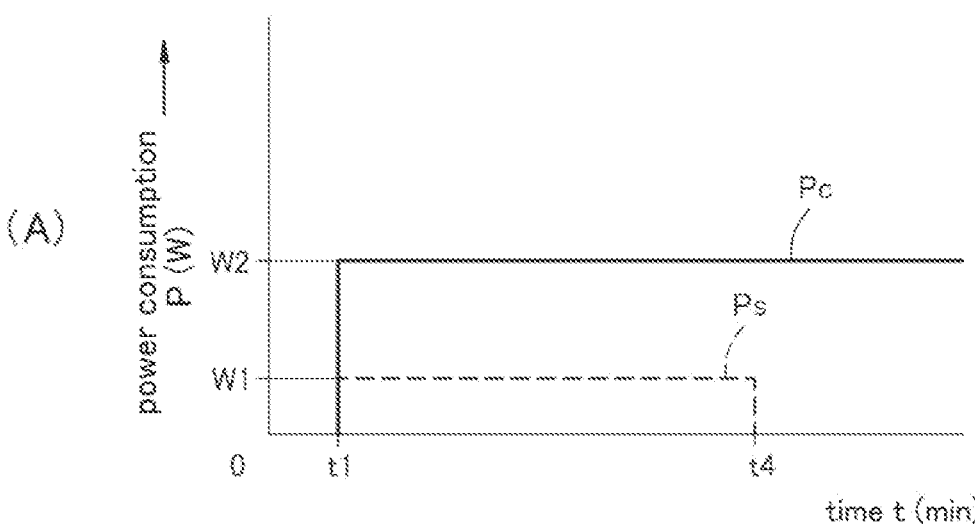
FIG. 12 is (A) a time chart of the power consumption and (B) a time chart of the temperature in the vehicle cabin temperature control device according to a sixth embodiment of the present invention.
Figure 12:
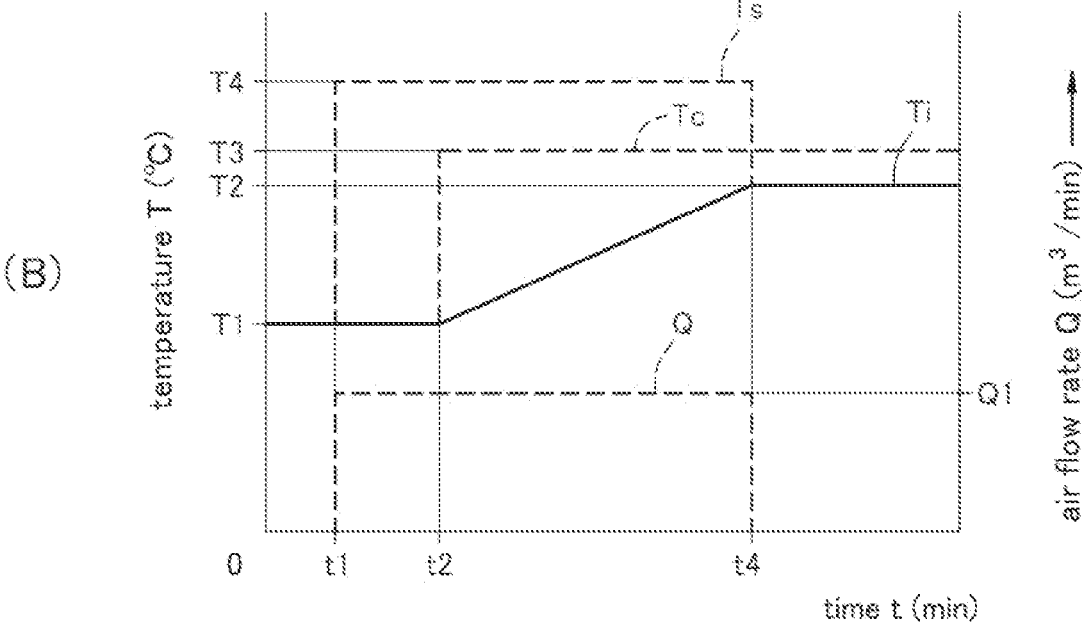

In the sixth embodiment shown in FIG. 12, the control unit 90 controls the seat temperature control device consist-ing of the seat heater 60 and the first air blowers 62 or the second air blowers 76 such that the seat temperature control device continues to operate from time t1 at which the air conditioning device 40 is activated at time t1 so long as the difference between the air conditioning set temperature T2 of the air conditioning device 40 and the cabin temperature Ti is equal to or greater than a prescribed value (which may be zero), or in other words from the time point t1 of activating the air conditioning device 40 to the time point t4 at which the cabin temperature Ti reaches the air conditioning set temperature T2 of the air conditioning device 40.

As a result, the seat temperature control device is prevented from being turned off before time point t4 at which the cabin temperature Ti reaches the air conditioning set temperature T2 of the air conditioning device 40, or from being turned on after the cabin temperature Ti has reached the air conditioning set temperature T2 of the air conditioning device 40.

As a result, in the sixth embodiment, the seat temperature control device is allowed to operate without becoming excessive or inadequate so that a comfortable temperature environment for the seat occupant can be achieved and the power consumption of the battery 20 can be reduced at the same time.

The mode of operation of the air conditioning device 40 in the heating mode has been described above. When the air conditioning device 40 is in the cooling mode, the control unit 90 operates the seat temperature control device for a prescribed time period after the activation of the air conditioning device 40 similarly as in the heating mode. In the cooling mode, Peltier devices 70, 84 provided in the first air blowers 62 or the second air blowers 76 are operated as a seat temperature control device, instead of the electric heaters 66, 80, so that cool air is blown out from the air blowing ports 74, 88 to the neck of the seat occupant.

As a result, in the cooling mode, as in the heating mode, a comfortable temperature environment for the occupant can be quickly achieved, and the power consumption of the battery 20 can be reduced.

Although the present invention has been described in terms of preferred embodiments thereof, it should be readily apparent to those skilled in the art that the present invention is not limited to such embodiments and can be modified without departing from the scope of the present invention. For example, the heat sources of the seat heater 60, the first air blowers 62, and the second air blowers 76 are not limited to electric heaters utilizing Joule heat but may be ceramic heaters or the like. The air conditioning device 40 may be based on a Stirling cycle powered by an electric motor. Moreover, all of the components shown in the above embodiments are not necessarily essential, and can be appropriately selected and substituted without departing from the gist of the present invention. For example, the seat heater 60 is not essential, and it suffices if the seat temperature control device is provided with either one of the first air blowers 62 and the second air blowers 76.

Seventh Embodiment

A vehicle seat and an air conditioning device according to the seventh embodiment of the present invention will be described in the following with reference to FIGS. 13 to 25.

Figure 13:
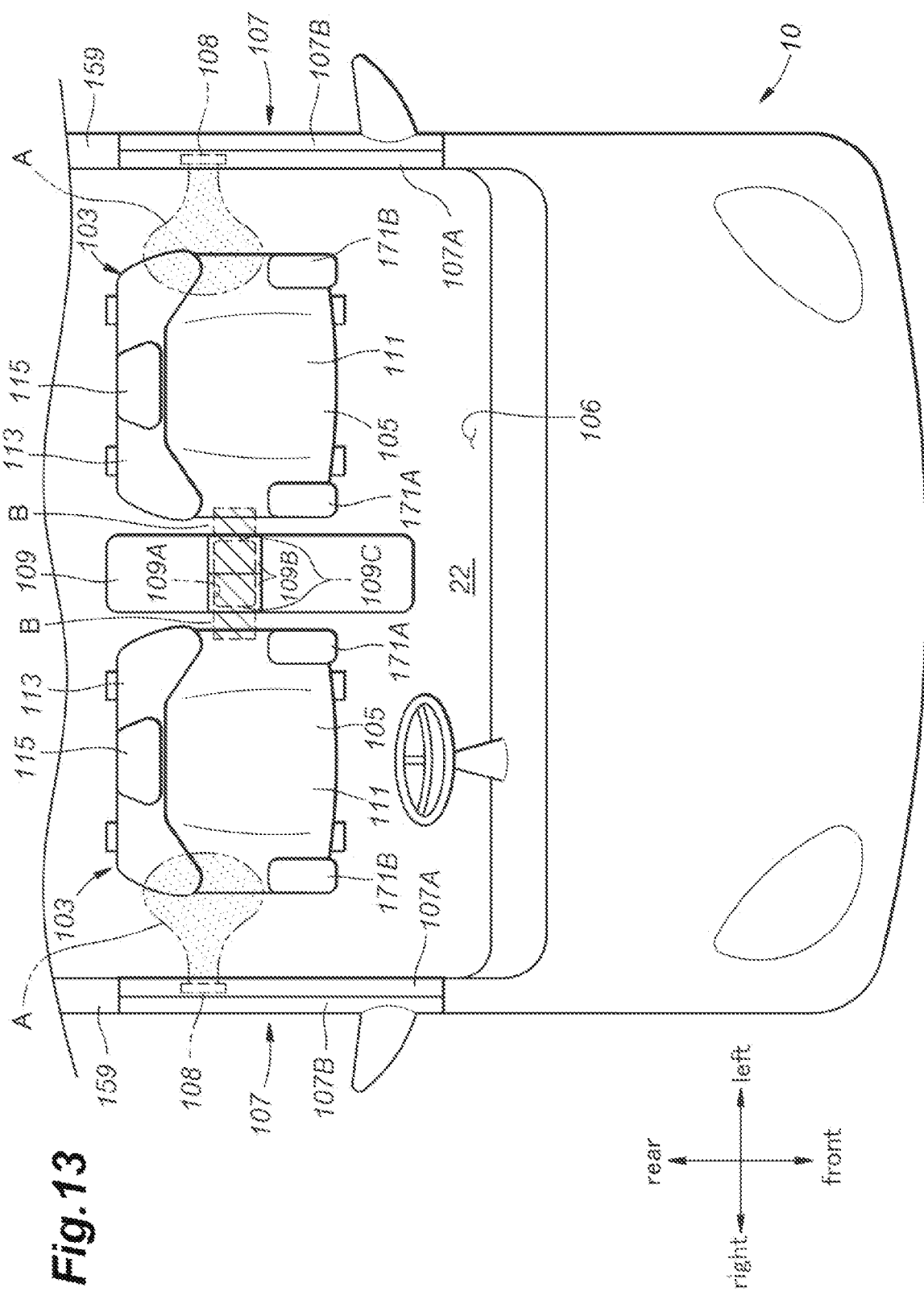
FIG. 13 is a schematic diagram of a vehicle fitted with vehicle seats and an air conditioning device according to a seventh embodiment of the present invention.

As shown in FIG. 13, the vehicle 10 consists of a four-wheeled vehicle. The vehicle 10 is provided with a cabin 22. The cabin 22 is provided with a pair of vehicle seats 103 consisting of a driver's seat and a front passenger's seat that are arranged laterally next to each other. Each vehicle seat 103 is provided with a seat body 105 on which a seat occupant can be seated. The seat body 105 is placed on a floor panel 24 defining the bottom of the vehicle cabin 22 so that the seated occupant faces the front of the vehicle 10. Hereinafter, the front/rear, left/right, and up/down directions are defined with reference to the vehicle 10, and are described as such. In this embodiment, the vehicle seat 103 on the right side of the front row constitutes the driver's seat.

A door 107 is provided on the outboard side of the seat body 105. A door trim 107A is provided on the side surface of the door 107 on the inboard side of the vehicle. The door trim 107A is a lining component of the door 107 and covers the door panel 107B from the inside of the vehicle. The door trim 107A is formed with an armrest and a door pocket.

In the seventh embodiment, the door 107 is provided with a door airbag 108 that inflates toward the interior of the vehicle (the inboard side of the vehicle cabin 22) and can be deployed on the outboard side of the seat occupant. The door airbag 108 is housed between the door trim 107A and the door panel 107B. In FIG. 1, the region through which the door airbag 108 passes when the door airbag 108 deploys (hereinafter referred to as a deployment range A) is indicated by a shaded area.

A center console box 109 is provided on the inboard side of the seat body 105. The center console box 109 includes a storage recess 109A that opens so as to store articles therein, and a lid 109B that opens and closes the storage recess 109A. The lid 109B is hinged to an opening edge 109C of the storage recess 109A. In this embodiment, the storage recess 109A is recessed downward and opens upward. The lid 109B is hinged to the opening edge of the storage recess 109A on the outboard side of the vehicle. In FIG. 13, the region through which the lid 109B is opened and closed, or the movable range B of the lid 109B is indicated by a hatched area.

Figure 14:
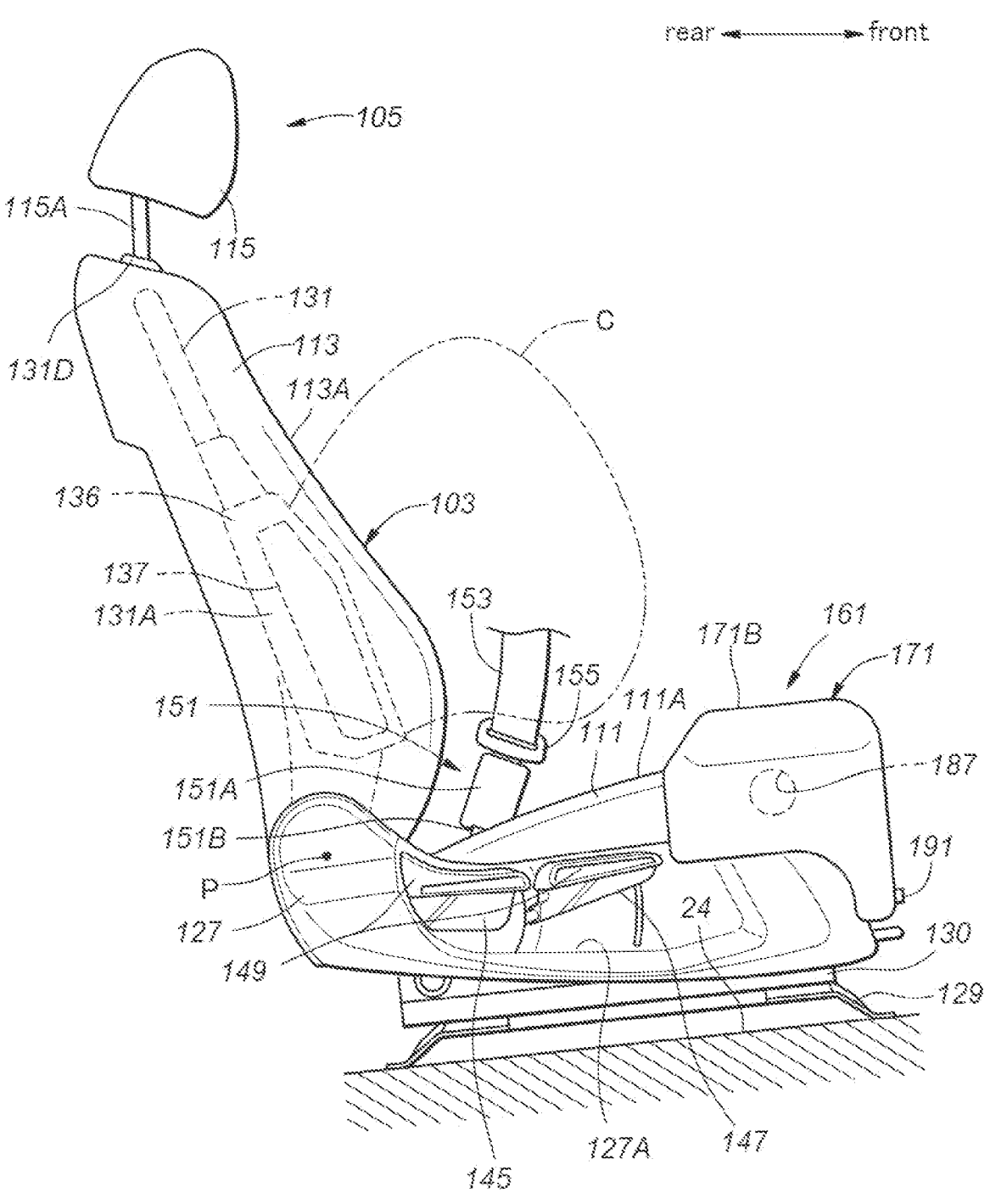
FIG. 14 is a side view of the vehicle seat and the air conditioning device of the seventh embodiment as viewed from the outboard side.

As shown in FIG. 14, the seat body 105 includes a seat cushion 111 that supports the buttocks of the seat occupant, a seat back 113 provided at the rear of the seat cushion 111 and functioning as a backrest, and a headrest 115 provided on the top seat back 113.

Figure 15:
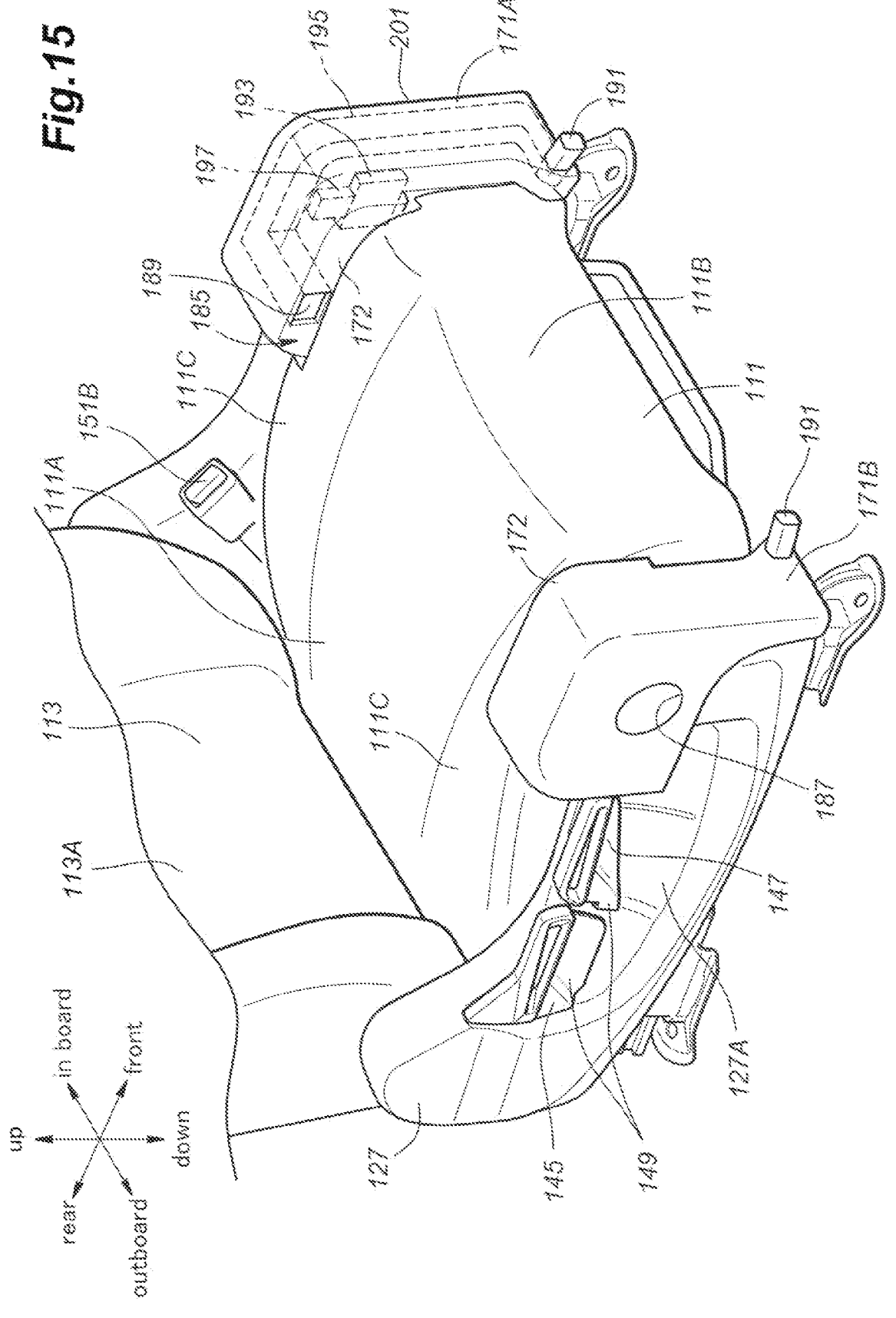
FIG. 15 is a perspective view of the vehicle seat and the air conditioning system of the seventh embodiment.

As shown in FIG. 15, the seat cushion 111 has a substantially rectangular parallelepiped shape with a surface facing in a substantially vertical direction. The upper surface of the seat cushion 111 defines a seating surface 111A for a passenger. The seating surface 111A is recessed downward substantially at the center in the lateral direction and is slightly downwardly inclined rearward. When the occupant is seated, the buttocks are placed on a rear part of the seating surface 111A, and the thighs are placed on a front part of the seating surface 111A.

Figure 16:
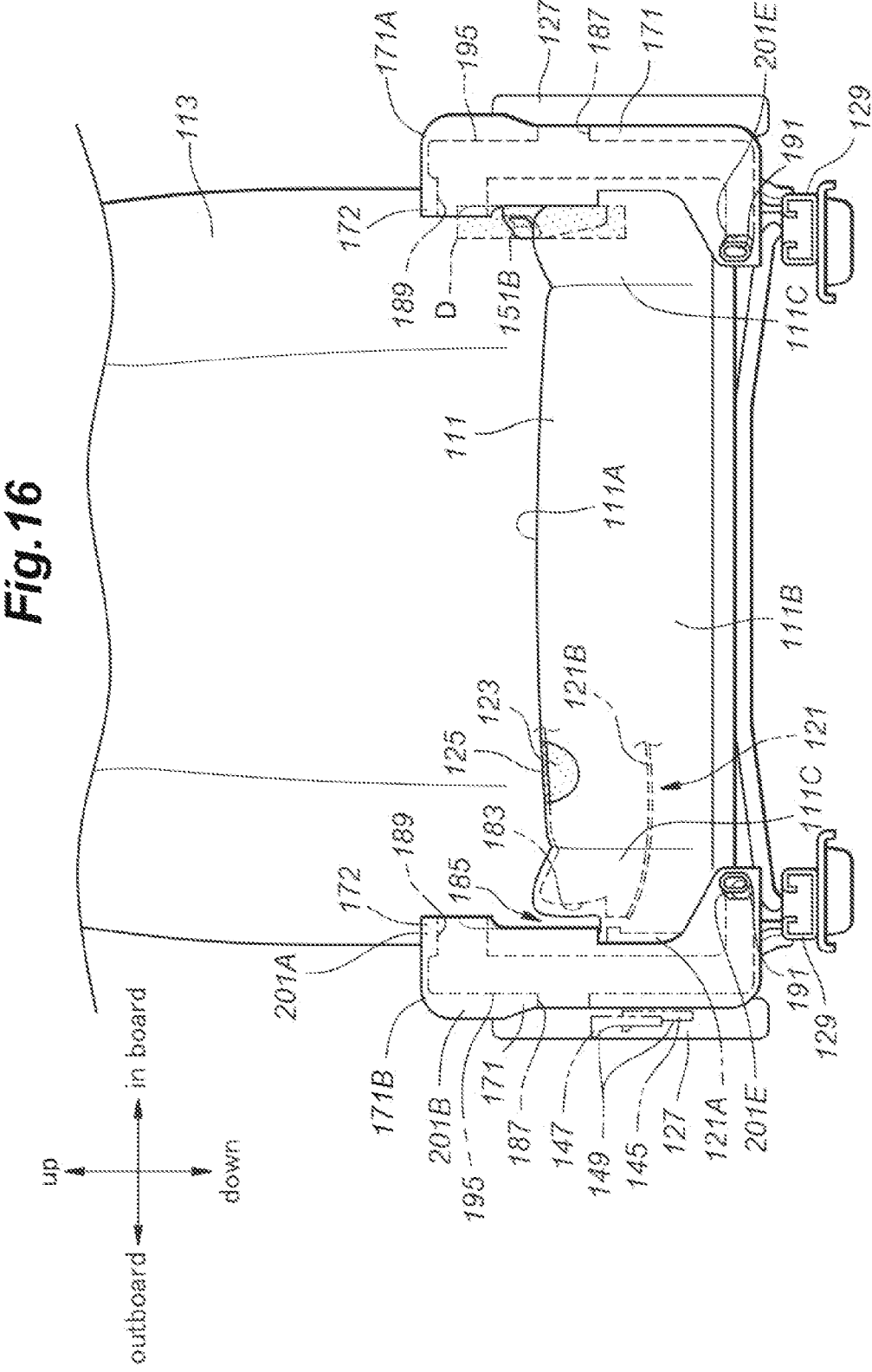
FIG. 16 is a front view of the vehicle seat and the air conditioning system of the seventh embodiment.

In the seventh embodiment, as shown in FIG. 16, the seat cushion 111 includes a base portion 111B positioned in a laterally central part thereof and having a substantially horizontal upper surface, and a pair of side bolsters 111C connected to either lateral side edge of the base portion 111B and protruding upward from the upper surface of the base portion 111B.

As shown in FIG. 14, the seat back 113 has a substantially rectangular parallelepiped shape extending vertically and having a surface facing substantially in the fore and aft direction. The front surface of the seat back 113 defines a support surface 113A opposing the back of the seat occupant. The support surface 113A is recessed rearward at a substantially laterally central part thereof, and is inclined slightly rearward toward the upper part thereof. The support surface 113A supports the back of the occupant who may lean against the seat back 113 toward the rear.

The headrest 115 is connected to the upper end of the seat back 113 via a pair of pillars 115A. The headrest 115 is positioned behind the head of the seat occupant.

The seat cushion 111 includes a metal frame 121 (also referred to as a seat cushion frame; see FIG. 16) forming a structural framework, a pad member 123 supported by the frame 121, and an outer skin member 125 covering at least a part of the surface of the pad member 123. The frame 121 of the seat cushion 111 includes a pair of side frames 121A extending in the fore and aft direction on either side, a front frame (not shown in the drawings) connecting the front ends of the side frames 121A, and a rear frame (not shown in the drawings) connecting the rear ends of the side members. The frame 121 further includes a plate-shaped pan frame 121B that is provided between the two side frames 121A and spans the front and rear members. The pad member 123 is placed on the upper surface of the pan frame 121B.

As shown in FIGS. 14 to 16, the side frames 121A of the seat cushion 111 are provided with side covers 127, respectively. Each side cover 127 is made of resin and extends in the fore and aft direction along the corresponding side frame 121A. The side cover 127 has a shape matching the side frame 121A and covers the side frame 121A from the outside of the seat. As shown in FIGS. 14 and 15, the side cover 127 on the outboard side of the vehicle is provided with a recess 127A which is recessed inward of the seat.

As shown in FIG. 14, a pair of lower rails 129 are provided under the seat cushion 111 and extend in the fore and aft direction. An upper rail 130 extending in the fore and aft direction is provided on each lower rail 129. The upper rail 130 is engaged by the lower rail 129 so as to be slidable relative to each other in the fore and aft direction. The upper rails 130 are fixed to the frame 121 forming the framework of the seat cushion 111. In the seventh embodiment, a link member (not shown in the drawings) is provided between the upper rails 130 and the seat cushion 111. By rotating the link member, the height and inclination of the seat cushion 111 with respect to the floor panel 24 can be changed.

Figure 18:
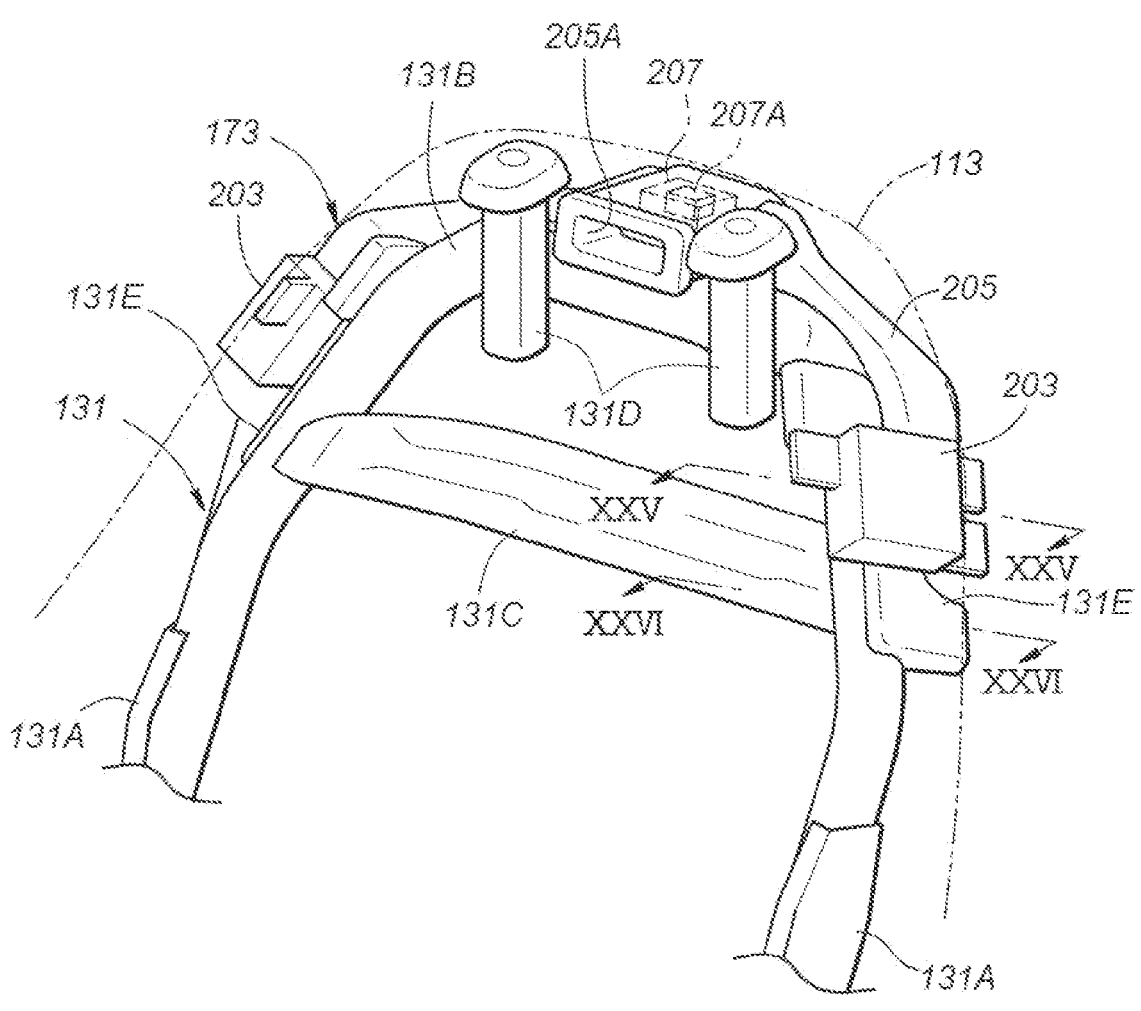
FIG. 18 is a perspective view of the frame of a seat back, and a back-side air conditioning device fitted to the seat back.

The seat back 113 includes a metal frame 131 that forms a structural framework similarly to the metal frame of the seat cushion 111, a pad member 133 supported by the frame 131, and a skin member 135 that covers at least part of the surface of the pad member 133. As shown in FIG. 18, the frame 131 of the seat back 113 includes a pair of side frames 131A extending vertically on either side, an upper frame 131B that spans between upper ends of the side frames 131A, and a lower frame (not shown in the drawings) that spans between the lower ends of the side frames 131A so that the frame 131 of the seat back 113 forms a substantially square frame shape. In this embodiment, a cross frame 131C is provided so as to connect the left and the right ends of the upper frame 131B. The left side frame 131A of the seat back 113 is supported at its lower end by the rear end of the left side frame 131A of the seat cushion 111 so as to be rotatable about the tilting axis P (see FIG. 2). Similarly, the right side frame 131A of the seat back 113 is supported at its lower end by the rear end of the right side frame 131A of the seat cushion 111 so as to be rotatable about the tilting axis P. Thereby, the frame 131 of the seat back 113 is connected to the frame 121 of the seat cushion 111 so as to be tiltable.

An airbag module 136 is provided on the side frame 131A of the seat back 113 on the outboard side of the vehicle. The airbag module 136 has a side airbag 137 that deploys to the outboard side of the seat occupant in the event of a side collision. A double-dot chain line indicates a region through which the side airbag 137 passes when deployed. Hereinafter, the area through which the side airbag 137 passes during deployment will be referred to as a deployment range C of the side airbag 137.

Figure 19:
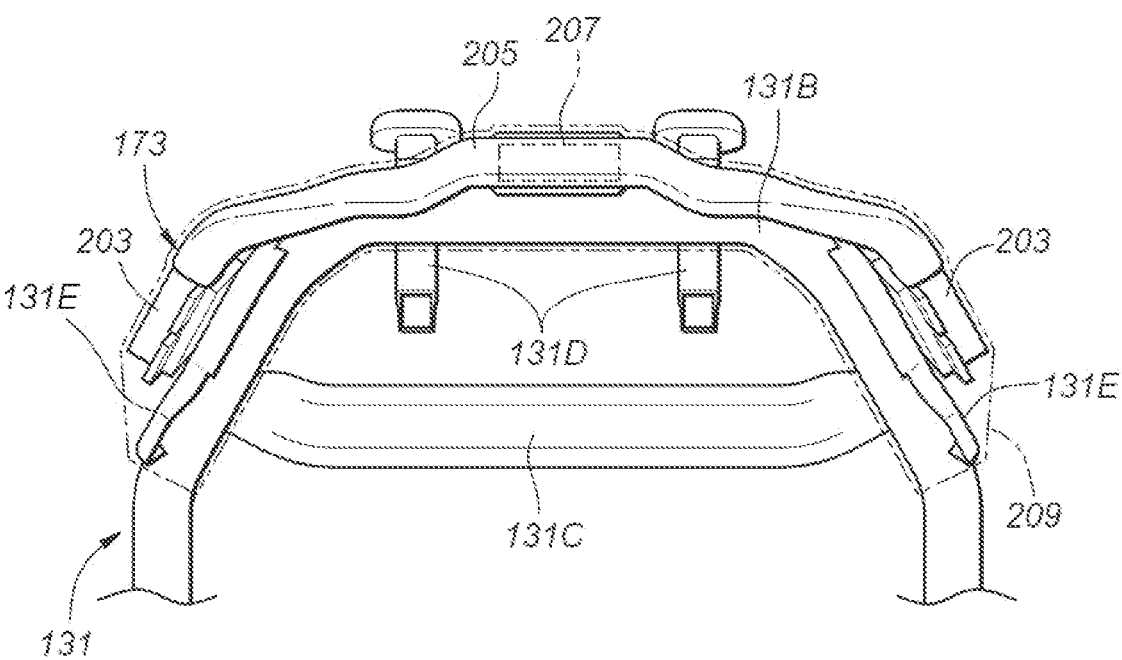
FIG. 19 is a rear view of the frame of the seat back, and the back-side air conditioning device.

As shown in FIGS. 18 and 19, the upper frame 131B of the seat back 113 is provided with two pillar guides 131D for receiving the pillars 115A of the headrest 115 (see FIG. 14). Each pillar guide 131D has a tubular shape extending substantially parallel to the extending direction of the side frames 131A of the seat back 113.

Figure 20:
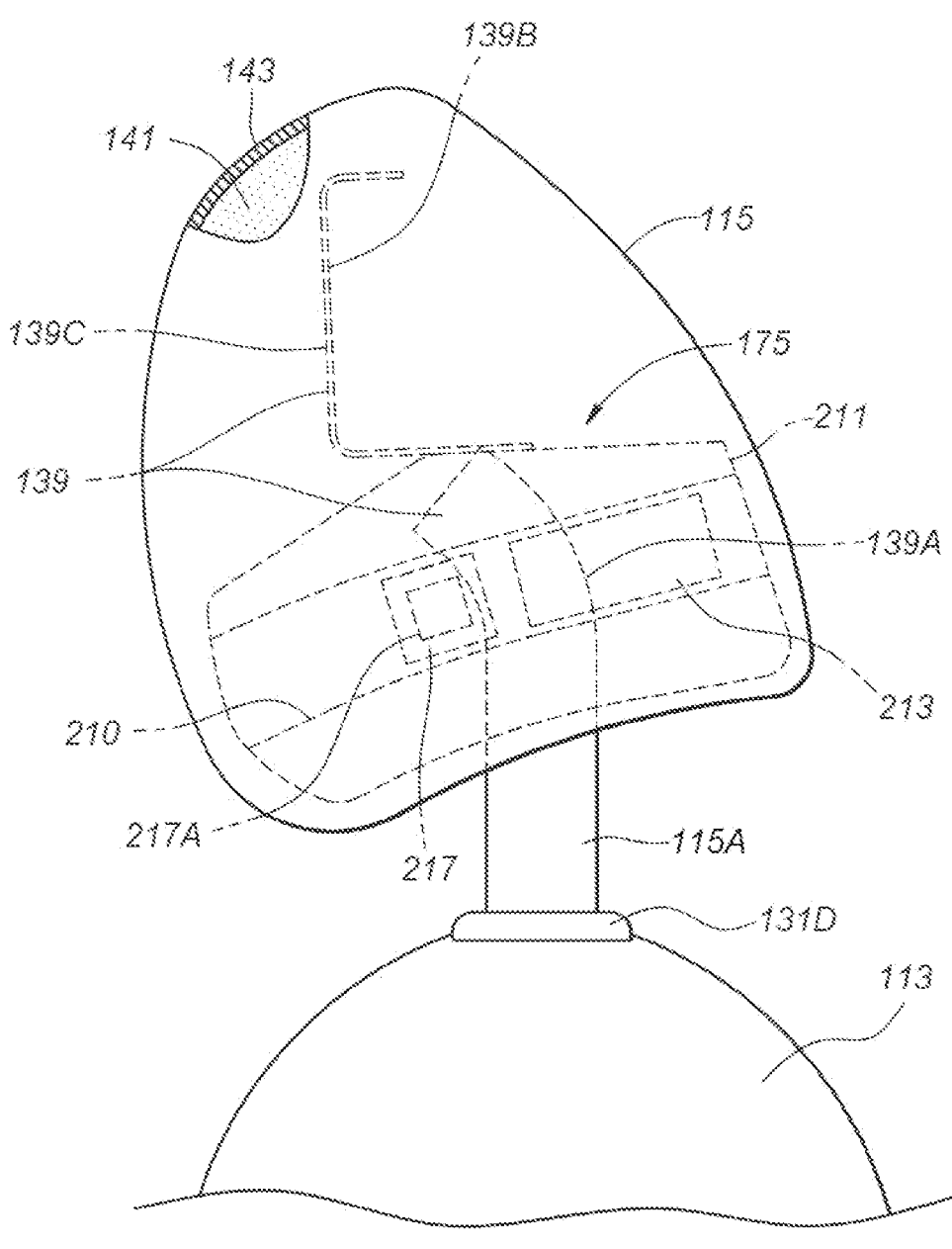
FIG. 20 is an explanatory diagram showing the frame of the seat back, and a head-side air conditioning device.

As shown in FIG. 20, the headrest 115 is provided with a metal frame 139 forming a structural framework, a pad member 141 supported by the frame 139, and a skin member 143 covering the surface of the pad member 141. The frame 139 includes a pair of vertical frames 139A each having a cylindrical shape, and an auxiliary frame 139B (also referred to as a bracket) that extends laterally between the two vertical frames 139A. The lower end parts of the vertical frames 139A respectively form pillars 115A. The headrest 115 is supported on the upper end of the seat back 113 by inserting the pillars 115A into the pillar guides 131D. In order to reliably support the head of the seat occupant from behind, the auxiliary frame 139B preferably has a substantially flat support surface 139C that faces forward and overlaps with the left and right vertical frames 139A in front view.

As shown in FIG. 14, the seat cushion 111 is provided with a reclining lever 145 for tilting the seat back 113 with respect to the seat cushion 111 and a height lever 147 for changing the height of the seat cushion 111. The reclining lever 145 and the height lever 147 are each supported at its rear end by the side frame 121A of the seat cushion 111 and extend forward along an outer side of the side frame 121A. The front ends of the reclining lever 145 and the height lever 147 are each provided with a grip portion 149 that receives an operation input from the seat occupant. In other words, each of the grip portions 149 functions as an operation input portion that receives an operation input related to deformation and displacement of the seat body 105 from the seat occupant. In this embodiment, the reclining lever 145 and the height lever 147 are provided on the outboard side of the seat cushion 111. The grip portions 149 are received in the recess 127A of the side cover 127.

Figure 17:
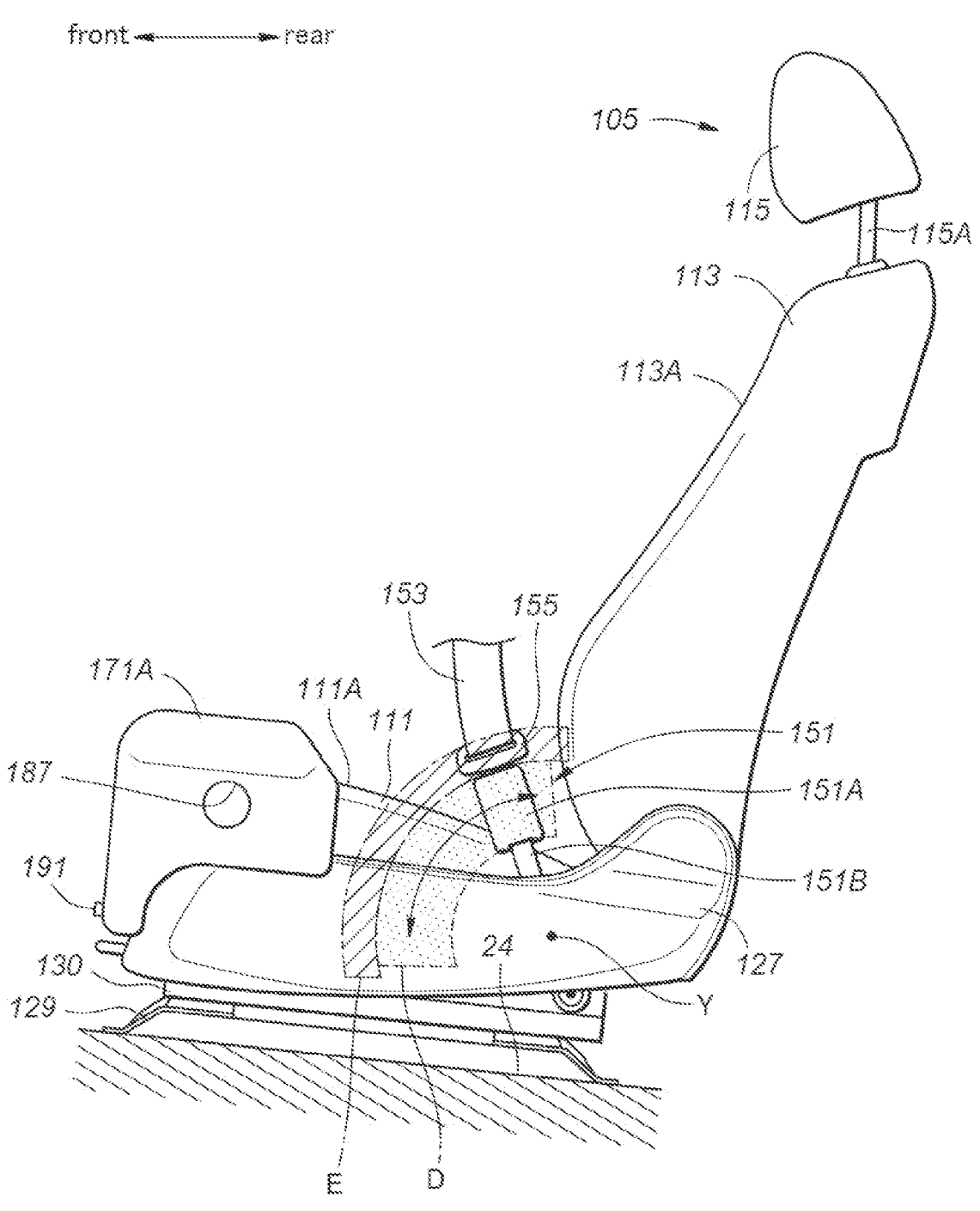
FIG. 17 is a side view of the vehicle seat and the air conditioning device of the seventh embodiment as viewed from the inboard side.

As shown in FIG. 17, the seat body 105 is provided with a buckle device 151 for a seat belt. The buckle device 151 engages a seat belt tongue 155 connected to the seat belt 153 to restrain the seat occupant to the seat body 105.

The buckle device 151 includes a buckle support arm 151A and a buckle 151B. The buckle support arm 151A has a rod shape extending in the fore and aft direction. The buckle support arm 151A is connected at its rear end to a rear part of the side frame 121A of the seat cushion 111 so as to be rotatable about a rotational axis X extending in the lateral direction. The buckle 151B is fixed to the front end of the buckle support arm 151A, and can detachably engage the seat belt tongue 155. When in use, the buckle support arm 151A extends obliquely forward and upward, and the buckle 151B engages the seat belt tongue 155 as shown in FIG. 14.

Thus, the buckle 151B is supported by the side frame 121A of the seat cushion 111 so as to be rotatable about the rotational axis X extending in the lateral direction. In FIGS. 16 and 17, the movable range of the buckle 151B when the buckle support arm 151A is rotated within the movable range about the rotational axis X, or the movable range D of the buckle 151B is indicated by a shaded area. The movable range D of the buckle 151B is shaped as a fan centering on the rotational axis X. Since the buckle 151B is pivotally supported in this way, the seat occupant can place the buckle

151B at a position where the occupant can easily operate it, and can easily engage the seat belt tongue 155 to the buckle 151B.

The seat belt 153 extends from a seat belt retractor device (not shown in the drawings) fixed to the vehicle body through the hollow interior of the center pillar 159, and introduced into the cabin 22 from an upper end part of the center pillar 159. By pulling out the seat belt 153 and engaging the seat belt tongue 155 with the buckle 151B, the seated occupant is restrained to the seat body 105. In FIG. 17, the movable range E of the seat belt tongue 155 when the buckle support arm 151A is rotated within the movable range about the rotational axis X is indicated by a hatched area.

Figure 21:
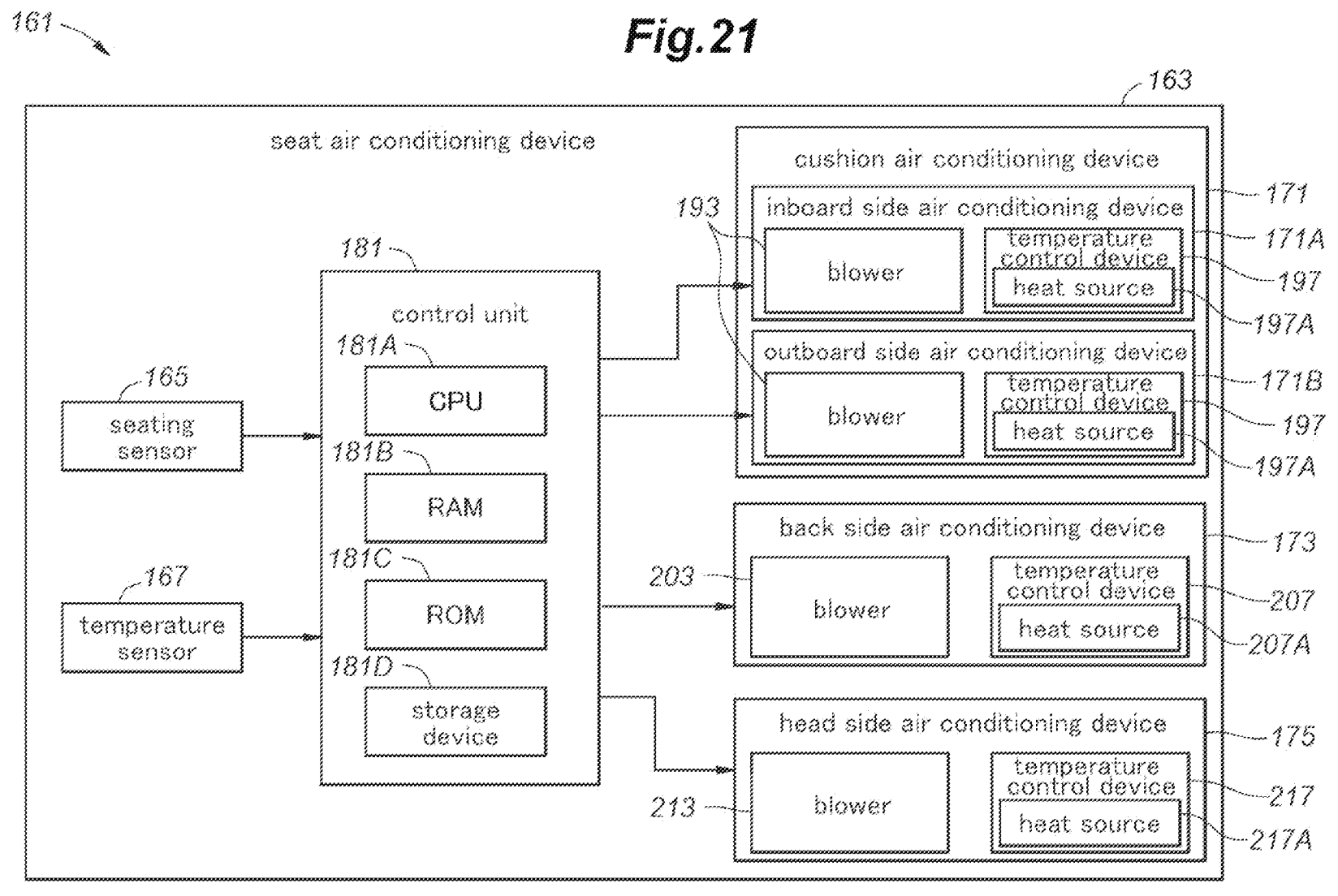

The vehicle seat 103 is provided with an air conditioning system 161. As shown in FIG. 21, the air conditioning system 161 is provided with a seat air conditioning device 163.

The seat air conditioning device 163 forwards cool air/warm air toward the seat occupant to adjust the temperature of the ambient air around the seat occupant. The seat air conditioning device 163 includes a seating sensor 165, a temperature sensor 167, a pair of cushion air conditioning devices 171 provided on the seat cushion 111, a back-side air conditioning device 173 provided on the seat back 113, a head-side air conditioning device 175 provided on the headrest 115, and a control unit 181.

The seating sensor 165 is provided on each vehicle seat 103 and detects if a person is seated on the vehicle seat 103. The seating sensor 165 may consist of a pressure sensor that detects pressure applied to the seating surface 111A, or may consist of one or more membrane switches that are turned on when the occupant sits on the seat.

The temperature sensor 167 is a sensor for acquiring the temperature inside the cabin 22 of the vehicle 10, and preferably consists of a thermistor that acquires the temperature based on a change in resistance value. The temperature sensor 167 may be provided on the vehicle seat 103, or may be provided on a wall or the like that defines the vehicle cabin 22.

As shown in FIG. 15, the cushion air conditioning devices 171 are provided on the outboard side and the inboard side of the seat cushion 111, respectively. The inboard and outboard side cushion air conditioning devices 171 provided on the inboard side and the outboard side of the seat cushion 111 each have a substantially rectangular parallelepiped shape and are symmetrical to each other. The cushion air conditioning devices 171 are provided on the left and right sides of the front end of the seat cushion 111, respectively. The cushion air conditioning devices 171 provided on the inboard side and the outboard side are positioned at symmetrical positions of the seat cushion 111. Hereinafter, the cushion air conditioning device 171 located on the inboard side will be referred to as an inboard side air conditioning device 171A, and the cushion air conditioning device 171 located on the outboard side will be referred to as an outboard side air conditioning device 171B. The inboard side air conditioning device 171A and the outboard side air conditioning device 171B each include a projection 172 projecting inwardly of the seat (toward the seat cushion 111) at an inner upper part thereof.

In the seventh embodiment, as shown in FIG. 16, the front end of the pad member 123 of the seat cushion 111 is provided with a cutout 183 cut inwardly of the seat at each laterally outer and upper part thereof. The projection 172 of each cushion air conditioning device 171 is received in the corresponding cutout 183, and fixed to the corresponding side frame 121A of the seat cushion 111. In the seventh embodiment, the wall surface of the pad member 123 defining each cutout 183 and the outer surface of the corresponding cushion air conditioning device 171 are sufficiently separated from each other, so that a gap 185 is defined between the outer surface of each cushion air conditioning device 171 and the opposing surface of the corresponding cutout 183 of the seat cushion 111.

As shown in FIG. 15, each cushion air conditioning device 171 includes an air inlet 187 provided on the outer side thereof, an inner air blowing port 189 provided on the inner side thereof, and a lower air blowing port 191 in a lower front end part thereof. The air inlet 187 opens on the laterally outer side. The inner air blowing port 189 is provided at an upper rear end part thereof (more specifically, the projection 172), and opens on the inner side of the seat. The lower air blowing port 191 opens forward and inward. The cushion air conditioning device 171 draws in air from the air inlet 187, cools or heats the drawn air, and blows the air out from the inner air blowing port 189 and the lower air blowing port 191. The air blown out from the inner air blowing port 189 reaches the thighs of the seat occupant and controls the ambient temperature of the thighs of the seat occupant. The air blown out from the lower air blowing port 191 controls the temperature around the back of the knees and calves of the seat occupant. In this way, the cushion air conditioning device 171 blows cool air or warm air onto the legs of the seat occupant, thereby controlling the temperature around the legs of the occupant.

Figure 22:
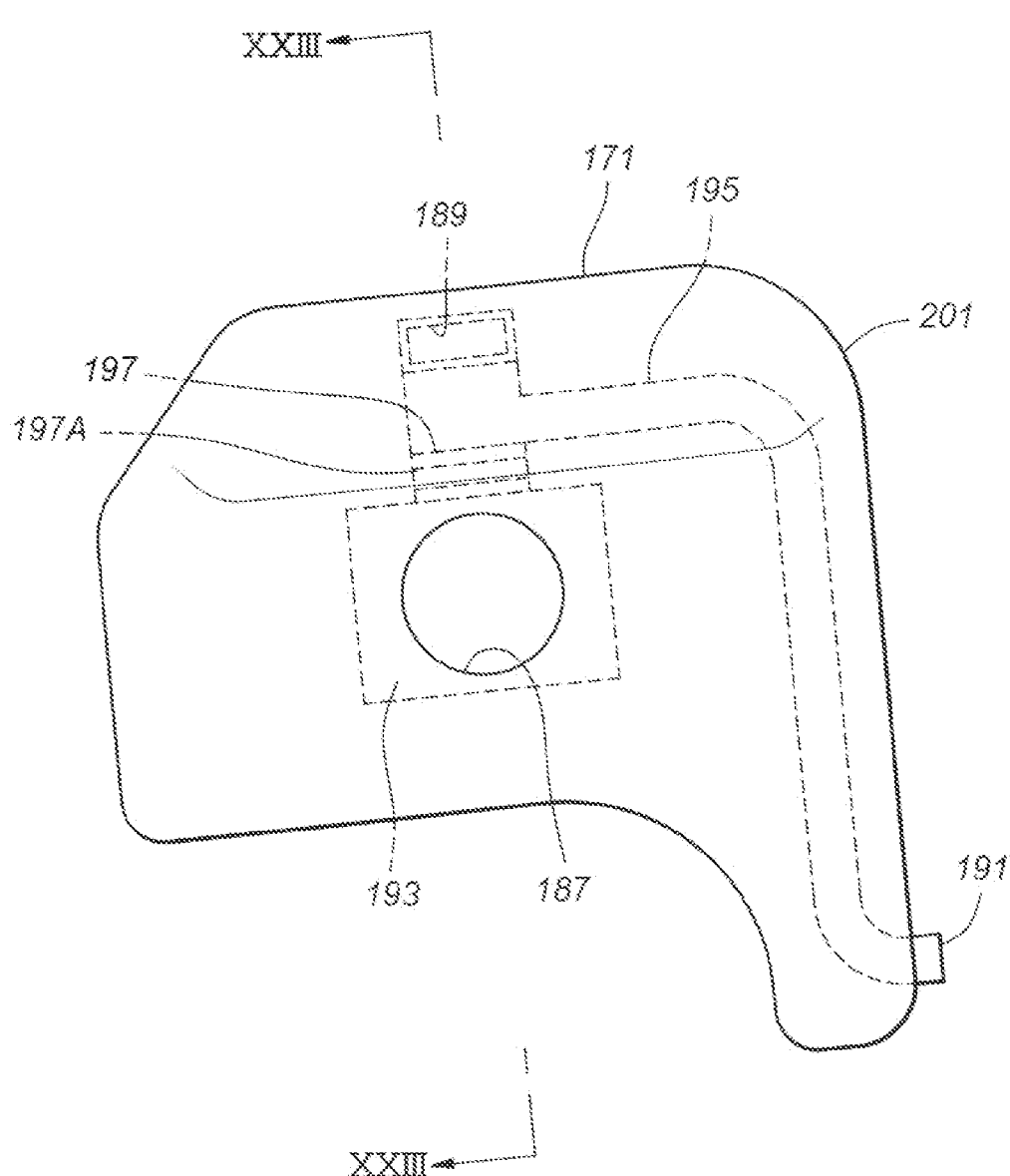
FIG. 22 is a side of a cushion air conditioning device.
Figure 23:
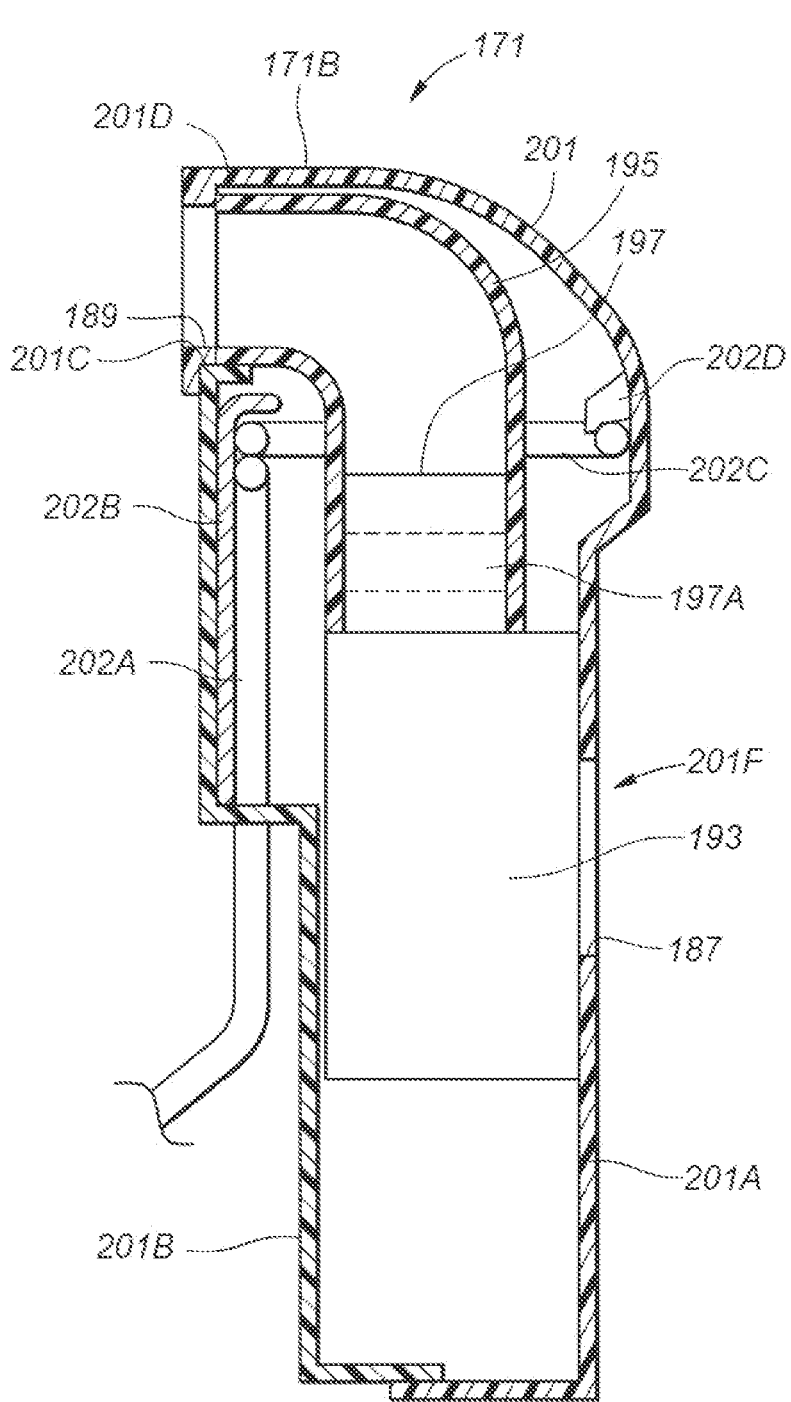
FIG. 23 is a sectional view taken along line XXIII-XXIII in FIG. 22.

Each cushion air conditioning device 171 includes a blower 193, a duct 195, a temperature control device 197 and a cover member 201, as shown in FIGS. 22 and 23 in detail As shown in FIG. 22, the blower 193 consists of an air mover that draws air from an inlet and blows the air out of an outlet. The blower 193 has an inlet connected to the air inlet 187 and an outlet connected to the duct 195. The blower 193 forwards the air drawn from the air inlet 187 into the duct 195.

The duct 195 has a tubular shape (a square tubular shape in the seventh embodiment). One end of duct 195 is connected to the blower 193. The other end of the duct 195 is bifurcated. One of the bifurcated ends of the duct 195 extends inwardly and upwardly with respect to the seat and is connected to the inner air blowing port 189. The other of the bifurcated ends of the duct 195 extends downward and toward the inner side, and is then bent so as to extend obliquely forward and inward. The end of the other bifurcated end of the duct 195 extends forward beyond the front end of the seat cushion 111. The end of the other bifurcated end of the duct 195 forms a lower air blowing port 191 which extends obliquely forward and inward below the upper surface of the corresponding side bolster 111C.

As shown in FIG. 16, the end of the other bifurcated end of the duct 195 is positioned more inward of the corresponding lateral end of the seat cushion 111 in front view. Further, as shown in FIG. 15, the end of the other bifurcated end of the duct 195, that is, the front end thereof, extends forward beyond the front end of the seat cushion 111. Thereby, the air forwarded from the blower 193 can be effectively guided to the feet of the seat occupant. Further, as shown in FIG. 16, since the front end of the duct 195 is positioned below the side bolster 111C, when the thigh of the seat occupant is placed on the side bolster 111C, the duct 195 is prevented from coming into contact with the duct 195. Therefore, seating comfort is prevented from being impaired by the presence of the cushion air conditioning device 171. Further, as shown in FIG. 16, each duct 195 is located more inward of the seat than the corresponding lateral end of the side cover 127. As a result, the side cover 127 can protect the duct 195 from an external impact on the lateral side of the seat cushion 111 since the side cover 127 resists the lateral impact before the impact is transmitted to the duct 195.

The temperature control device 197 is a device for heating and cooling air (controlling the temperature) to generate cold air or warm air, and includes a heat source 197A (also referred to as a temperature control device main body) that generates or absorbs heat. In the seventh embodiment, as shown in FIGS. 22 and 23, the temperature control device 197 is provided downstream of the blower 193 and at the bifurcated part of the duct 195. The air drawn by the blower 193 is cooled or heated by the heat source 197A of the temperature control device 197 and reaches the inner air blowing port 189 and the lower air blowing port 191. The heat source 197A preferably consists of a Peltier device that can be cooled and heated by electric current.

The cover member 201 is a substantially rectangular parallelepiped member covering the blower 193, the temperature control device 197 and the duct 195. In other words, the cover member 201 corresponds to a case that accommodates the blower 193, the temperature control device 197 and the duct 195 therein. As shown in FIG. 3, the cover member 201 is configured so as to have a surface facing the lateral direction.

As shown in FIG. 23, the cover member 201 includes an inner cover 201A facing the inner side of the seat, and an outer cover 201B facing the outer side and upper side of the seat.

The inner cover 201A forms the inner side wall, the front and rear walls, and the upper or inner half of the upper wall of the cover member 201. The inner cover 201A is connected to the outer side surface of the corresponding side frame 121A of the seat cushion 111.

More specifically, a plate-shaped metal bracket 202B is fixed to the outer surface of the side frame 121A of the seat cushion 111 via a metal wire 202A. The inner cover 201A is connected to and supported by the side frame 121A of the seat cushion 111 by being fixed to the bracket 202B.

The inner side wall of the inner cover 201A is provided with a notch 201C cut from above. The notch 201C is positioned at the upper end of the side wall. The notch 201C forms a lower part of the inner air blowing port 189.

The outer cover 201B forms the outer side wall, the front and rear walls, and the upper or outer half of the upper wall of the cover member 201. The outer cover 201B is connected to the inner cover 201A. More specifically, in the seventh embodiment, a bracket 202B is connected to the inner cover 201A, and is provided with a wire 202C extending in the outboard direction. The outer cover 201B is provided with an engagement piece 202D that can engage the wire 202C. Owing to the engagement between the engagement piece 202D and the wire 202C, the outer cover 201B is connected to the bracket 202B. As a result, the outer cover 201B is connected to the inner cover 201A via the bracket 102B.

Alternatively, the outer cover 201B may be provided with a locking claw (not shown in the drawings) which engages the inner cover 201A to connect the outer cover 201B to the inner cover 201A.

An upper end part of the outer cover 201B is provided with a plate-like extension 201D extending inwardly from the inner edge with respect to the seat so as to delimit the upper end of the notch 201C. The extension 201D closes the notch 201C from above. The extension 201D forms the upper edge of the inner air blowing port 189. In other words, the inner air blowing port 189 is jointly formed by the notch 201C and the extension 201D. One end of the duct 195 is connected to the outlet port of the blower 193, the other end thereof is bifurcated, and one of the bifurcated ends is fitted into and secured to the inner air blowing port 189.

As shown in FIG. 16, the lower half of the front wall of the outer cover 201B is provided with a through hole 201E. The other of the bifurcated ends of the duct 195 extends forward, passes through the through hole 201E, and further extends inwardly of the seat in an oblique direction.

As shown in FIG. 23, the side wall of the outer cover 201B on the outer side of the seat (the part forming the side wall of the cover member 201 on the outer side of the seat) is provided with a through hole 201F penetrating in the lateral direction. The through hole 201F forms the air inlet 187. A blower 193 is fixed to the side surface of the outer cover 201B on the inner side of the seat by tapping screws or regular screws at a position aligning with the through hole 201F. In the present embodiment, the temperature control device 197 is housed and fixed inside the duct, but the present invention is not limited to this mode. Further, in the seventh embodiment, the duct 195 is fixed to outer cover 201B by being fixed to the blower 193, but the duct 195 may also be directly connected to the outer cover 201B or may be connected to the inner cover 201A.

As shown in FIG. 18, the back-side air conditioning device 173 is provided with a pair of blowers 203 positioned on either side of the upper frame 131B of the seat back 113, a duct 205 that extends between the respective blowers 203, and is provided an air blowing port 206 that opens forward in a laterally central part of the duct 205, and a temperature control device 207 provided in the duct 205 at a position corresponding to the air blowing port 205A. The blowers 203 are positioned so as to correspond to the parts of the seat back 113 corresponding to the shoulders of the occupant. Each blower 203 draws air from an outer side of the seat back 113 and forwards the air into the duct 205. The temperature control device 207 is positioned at an upper end part of the seat back 113. The temperature control device 207 is a device for heating/cooling the air to generate cool air or warm air and includes a heat source 207A that generates or absorbs heat. Similarly to the heat source 197A, the heat source 207A preferably consists of a Peltier device that can be cooled and heated by electric current. The air forwarded into the duct 205 is cooled or heated by the heat source 207A of the temperature control device 207, and is blown out from the air blowing port 205A toward the neck of the seat occupant. This regulates the ambient temperature around the neck of the seat occupant. The heat source 207A is positioned behind the pillar guide 131D.

Figure 24:
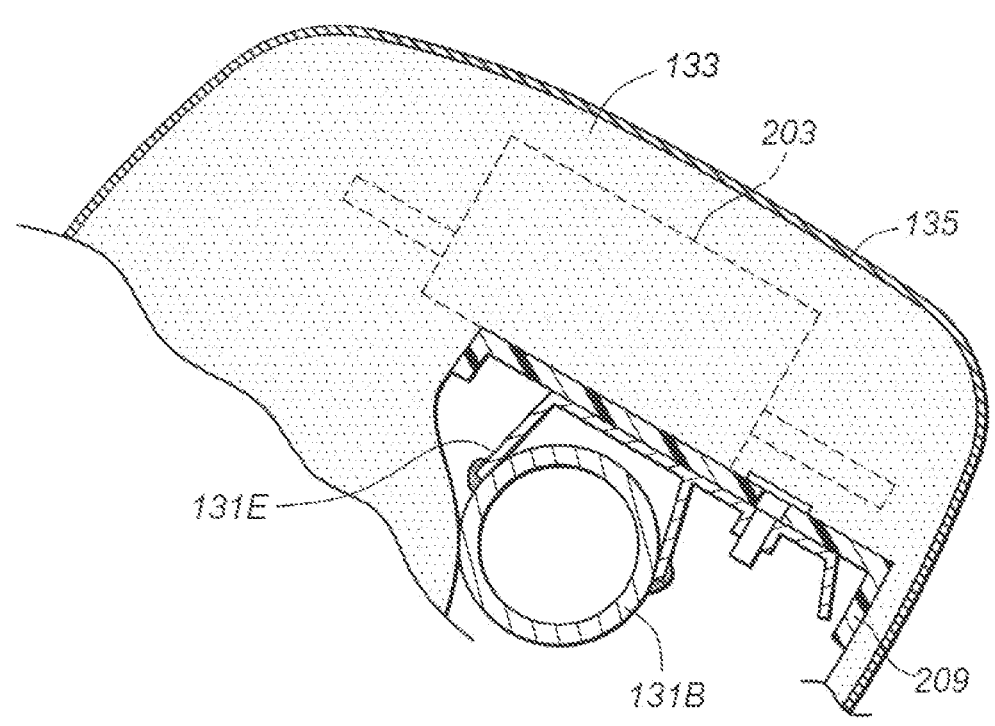
FIG. 24 is a sectional view of the seat back taken along line XXIV-XXIV in FIG. 18.
Figure 25:
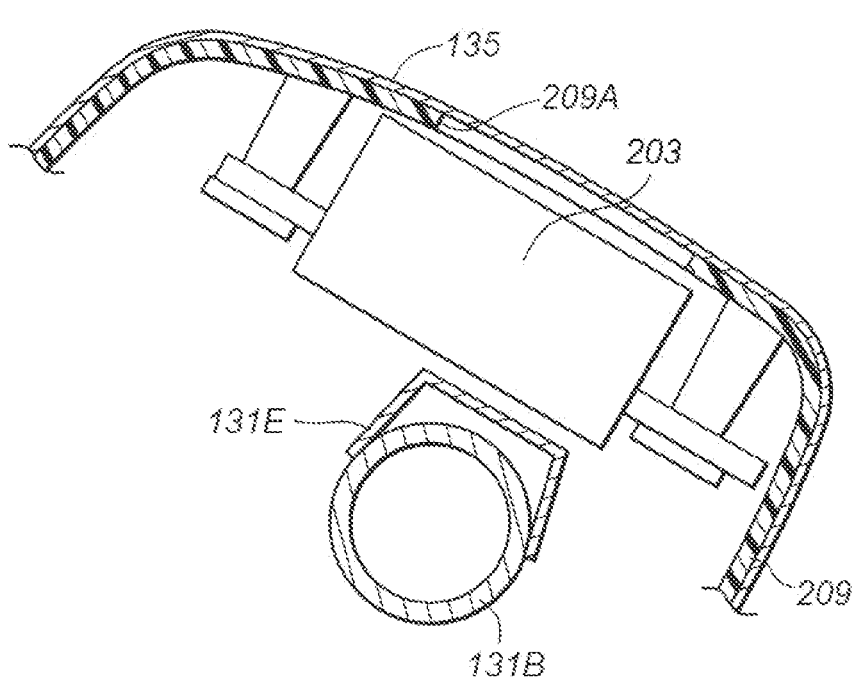
FIG. 25 is a sectional view of the seat back taken along line XXV-XXV in FIG. 18.

As shown in FIGS. 24 and 25, a fixing bracket 131E is fixed to the upper frame 131B by welding or the like. The blowers 203 and the duct 205 are positioned along the upper part of the rear surface of the upper frame 131B. As shown in FIG. 19, a resin garnish 209 (also called a cover member) is positioned behind the duct 205, the upper frame 131B and the blower 203. The duct 205, upper frame 131B and blower 203 are covered with a garnish 209 from behind.

As shown in FIG. 25, the blower 203 is fixed to the garnish 209 by using tapping screws. Thereby, the duct 205 connected to the blower 203 is also fixed to the garnish 209. The garnish 209 is attached to the fixing bracket 131E (see FIG. 24) by using screws. After fixing the blower 203 and the duct 205 to the garnish 209 in this way, the back-side air conditioning device 173 is attached to the upper frame 131B of the seat back 113 by fixing the garnish 209 to the fixing bracket 131E. As shown in FIG. 25, the garnish 209 is directly covered from the back by a skin member 135 at the upper left and right side parts of the seat back 113 so that the pad member 133 is not provided between the garnish 209 and the skin member 135 in these areas. On the other hand, as shown in FIG. 24, the fixing bracket 131E is covered with the pad member 133 and the skin member 135 from left and right sides in the area which is located below the part shown in FIG. 25. As shown in FIG. 25, a ventilation hole 209A is provided in the garnish 209 at a position corresponding to the blower 203. In order to improve ventilation, the part of the skin member 135 corresponding to the ventilation hole 209A and the part corresponding to the opening of the duct 205 may be formed as a mesh.

As shown in FIG. 20, the head-side air conditioning device 175 includes a passage forming member 211 defining an air passage 210 extending in the fore and aft direction, a blower 213 positioned in the air passage 210, a blower 213 positioned in the air passage 210, and a temperature control device 217 positioned in the air passage 210. The passage forming member 211 is connected to the frame 139 of the headrest 115. In this embodiment, the passage forming member 211 is connected to the auxiliary frame 139B from below and defines the air passage 210 so as to slope downward toward the front. The blower 213 draws air from the back-side of the headrest 115 and forwards the air into the air passage 210. Similarly to the back-side air conditioning device 173, the temperature control device 217 is a device that produces cold air and warm air by heating and cooling the air in cooperation with the blower 213, and includes a heat source 217A that generates or absorbs heat. Similarly to the heat source 197A, the heat source 217A preferably consists of a Peltier device that can be cooled and heated by electric current. The temperature control device 217 is positioned on the front side of the blower 213, or on the downstream side thereof. The air forwarded by the blower 213 is cooled or heated by the heat source 217A of the temperature control device 217 and reaches the head of the seat occupant. This regulates the ambient temperature of the seat occupant's head. To improve ventilation, the parts of the skin member 143 corresponding to the inlet and outlet of the air passage 210 may be formed as a mesh.

As shown in FIG. 21, the control unit 181 consists of a microcomputer including a central processing unit (CPU 181A), RAM 181B, ROM 181C, and a storage device 181D consisting of an SSD, HDD, or the like.

The control unit 181 controls the operation of the seat air conditioning device 163 based on the presence or absence of a seat occupant acquired by the seating sensor 165 and the temperature inside the vehicle cabin 22 acquired by the temperature sensor 167.

For example, when an occupant is seated on the vehicle seat 103 and the temperature acquired by the temperature sensor 167 is equal to or higher than an upper threshold value, the control unit 181 drives the cushion air conditioning device 171 to cool the seated occupant. More specifically, the control unit 181 drives the blowers 193 of the inboard side air conditioning device 171A and the outboard side air conditioning device 171B and controls the temperature control device 197 (heat source 197A) so as to cool the air blown by the blowers 193.

In this conjunction, the control unit 181 performs a control action such that the output of the outboard side air conditioning device 171B is greater than the output of the inboard side air conditioning device 171A. The output as referred to here means the amount of change in the temperature of the air blown out by the blower 193 owing to the heat source 197A, and indicates the amount of change in the temperature of the air as compared to the case where the heat source 197A is not operated. More specifically, the control unit 181 controls the heat source 197A of the outboard side air conditioning device 171B and the heat source 197A of the inboard side air conditioning device 171A such that the air blown from the blower 193 of the outboard side air conditioning device 171B is cooler (causes a larger temperature drop) than the air blown from the blower 193 of the inboard side air conditioning device 171A.

The control unit 181 may simultaneously operate the back-side air conditioning device 173 and the head-side air conditioning device 175. However, the control unit 181 causes the output of the outboard side air conditioning device 171B to be greater than either the output the back-side air conditioning device 173 or the head-side air conditioning device 175. In other words, the control unit 181 controls the heat source 197A of the outboard side air conditioning device 171B, the heat source 207A of the back-side air conditioning device 173 and the heat source 217A of the head-side air conditioning device 175 such that the air blown from the blower 193 of the outboard side air conditioning device 171B is cooler (causes a larger temperature drop) than the air blown from the blower 203 of the back-side air conditioning device 173 or the blower 213 of the head-side air conditioning device 175. At this time, the control unit 181 may perform the control action such that the output of the back-side air conditioning device 173 is greater than the output of the head-side air conditioning device 175.

When an occupant is seated on the vehicle seat 103 and the temperature acquired by the temperature sensor 167 is equal to or lower than a lower threshold value, the control unit 181 drives the cushion air conditioning device 171 to warm the seated occupant. More specifically, the control unit 181 drives the blowers 193 of the inboard side air conditioning device 171A and the outboard side air conditioning device 171B and drives the heat sources 197A to heat the air forwarded by the blowers 193, at the same time.

In this conjunction, the control unit 181 performs the control action such that the output of the outboard side air conditioning device 171B is greater than the output of the inboard side air conditioning device 171A. More specifically, the control unit 181 controls the heat source 197A of the outboard side air conditioning device 171B and the heat source 197A of the inboard side air conditioning device 171A such that the air blown from the blower 193 of the outboard side air conditioning device 171B is warmer (causes a larger temperature rise) than the air blown from the blower 193 of the inboard side air conditioning device 171A.

Further, the control unit 181 may simultaneously drive the back-side air conditioning device 173 and the head-side air conditioning device 175. However, the control unit 181 controls the outboard side air conditioning device 171B, the back-side air conditioning device 173 and the head-side air conditioning device 175 such that output of the outboard side air conditioning device 171B is greater than either the output of the back-side air conditioning device 173 or the output of the head-side air conditioning device 175. In other words, the control unit 181 controls the heat source 197A of the outboard side air conditioning device 171B, the heat source 207A of the back-side air conditioning device 173 and the heat source 217A of the head-side air conditioning device 175 such that the air blown from the blower 193 of the outboard side air conditioning device 171B is cooler (causes a larger temperature drop) than the air blown from the blower 203 of the back-side air conditioning device 173 or the blower 213 of the head-side air conditioning device 175. At this time, the control unit 181 may perform the control action such that the output of the back-side air conditioning device 173 is greater than the output of the head-side air conditioning device 175.

Next, the positional relationship of the cushion air conditioning device 171 relative to the buckle device 151 and other devices and members will be discussed in the following with reference to the drawings.

Figure 27:
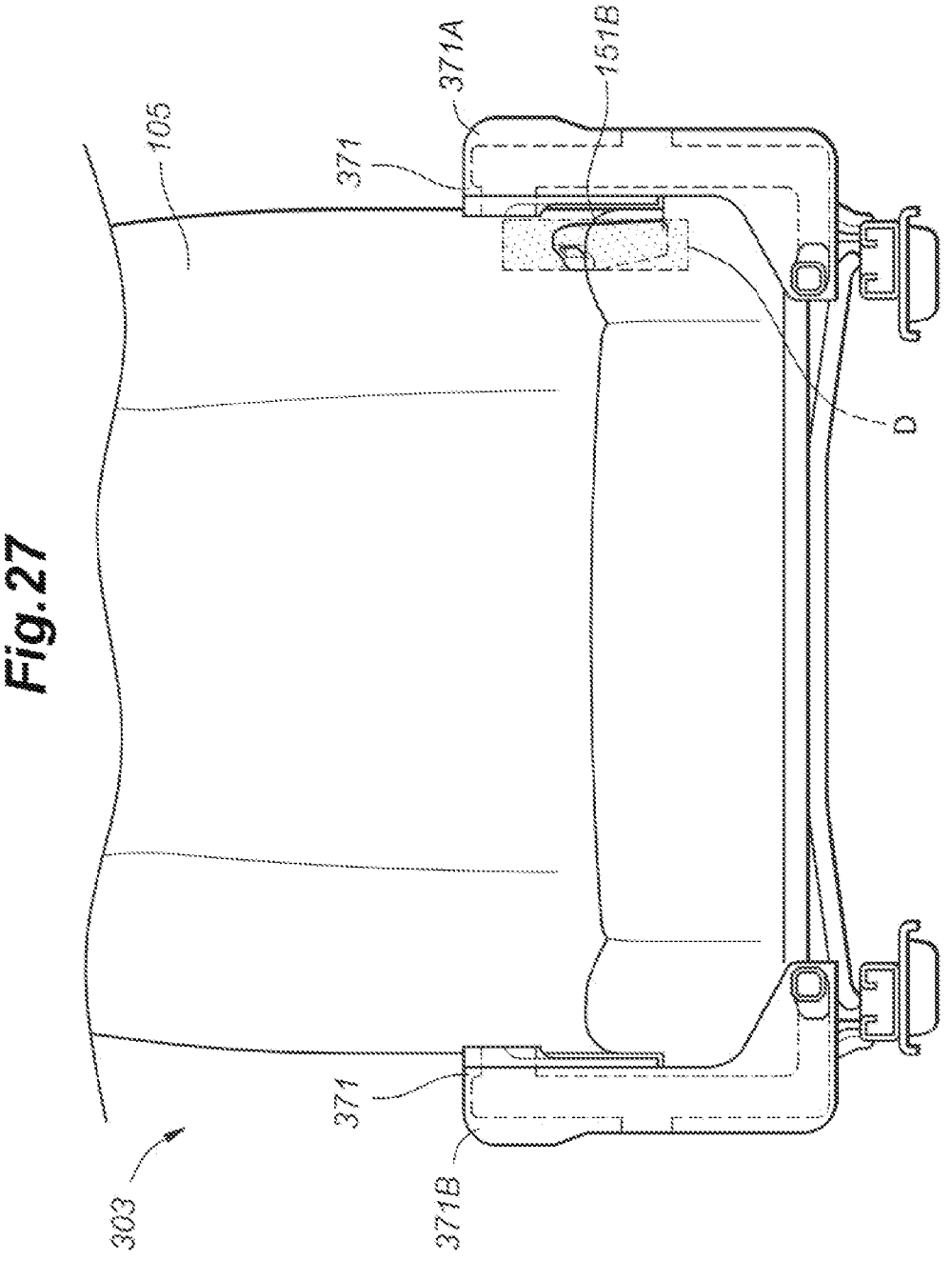
FIG. 27 is a front view of the vehicle seat and the air conditioning system of the eighth embodiment.

As shown in FIG. 27, the inboard side cushion air conditioning device 171 is connected to the seat cushion 111 so as to be outside the movable range D of the buckle 151B in side view. Further, in this embodiment, the inboard side cushion air conditioning device 171 is located outside of the movable range E of the seat belt tongue 155 engaged by the buckle 151B. In addition, as shown in FIG. 4, the inboard side cushion air conditioning device 171 (inboard side air cushion conditioning device 171A) is positioned so as to overlap with the movable range D of the buckle 151B in front view.

As shown in FIG. 14, the cushion air conditioning device 171 (outboard side air conditioning device 171B) is located ahead of the rear end of the grip portion 149 of the reclining lever 145 and ahead of the rear end of the grip portion 149 of the height lever 147. In this embodiment, the cushion air conditioning device 171 is positioned ahead of the front end of the grip portion 149 of the reclining lever 145 and ahead of the front end of the grip portion 149 of the height lever 147. Thus, the cushion air conditioning device 171 is preferably provided ahead of any of the grip portions 149 (operation input portions) for the seat occupant to perform an operation input to change the position and shape of the vehicle seat 103. Accordingly, the seat occupant can easily perform an operation input to the grip portion 149 without being obstructed by the cushion air conditioning device 171.

In FIG. 16, the position of the grip portion 149 is indicated by a double-chain chain line. From the standpoint of operability, the laterally outer end of the grip portion 149 (operation input portion) for the seat occupant to perform an operation input to change the position or shape of the vehicle seat 103 is positioned on the outboard side of the vehicle. As shown in FIG. 4, the outer end of the cushion air conditioning device 171 (outboard side air conditioning device 171B) is positioned on the inboard side of either the laterally outer end of the grip portion 149 of the reclining lever 145 or the laterally outer end of the grip portion 149 of the height lever 147. As a result, the laterally outer end of the grip portion 149 is positioned more laterally outward than the laterally outer end of the cushion air conditioning device 171. Therefore, the seat occupant can easily perform an operation input to the grip portion 149 without being obstructed by the cushion air conditioning device 171 on the inboard side of the vehicle.

As shown in FIG. 17, the cushion air conditioning device 171 (outboard side cushion air conditioning device 171B) is located ahead of the front end of the deployment range C of the side airbag 137. As a result, the outboard side cushion air conditioning device 171 is located outside the deployment range of the side airbag 137, and the outboard side cushion air conditioning device 171 is prevented from interfering with the deployment of the side airbag 137.

As shown in FIG. 13, the rear edge of the cushion air conditioning device 171 (outboard side air conditioning device 171B) is positioned ahead of the deployment range A of the door airbag 108. Accordingly, the cushion air conditioning device 171 is positioned outside of the deployment range A of the door airbag 108. Therefore, the outboard side cushion air conditioning device 171 is prevented from interfering with the deployment of the door airbag 108.

Further, the inboard side cushion air conditioning device 171 is positioned outside the movable range B of the lid 109B. Accordingly, the cushion air conditioning device 171 is prevented from interfering with the movement of the lid 109B.

Next, effects of the vehicle seat 103 and the air conditioning system 161 according to the seventh embodiment will be discussed in the following. The vehicle seat 103 is provided with the cushion air conditioning device 171 for adjusting the temperature of the legs of the seat occupant. As shown in FIG. 5, the cushion air conditioning device 171 is connected to the seat cushion 111 so as to be outside the movable range D of the buckle 151B. Accordingly, the inboard side cushion air conditioning device 171 is prevented from interfering with the movement of the buckle 151B.

As shown in FIG. 16, the inboard side air conditioning device 171A is positioned so as to overlap with the movable range D of the buckle 151B in front view. As a result, the lateral width of the vehicle seat 103 can be made smaller as compared to the case where the inboard side air conditioning device 171A does not overlap with the movable range D in front view. Therefore, the vehicle seat 103 can be downsized.

As shown in FIG. 17, the inboard side air conditioning device 171A is positioned outside of the movable range E of the seat belt tongue 155 engaged by the buckle 151B. This prevents the movement of the seat belt tongue 155 from being hindered.

As shown in FIG. 16, the cushion air conditioning devices 171 (inboard side air conditioning device 171A and outboard side air conditioning device 171B) are received in the cutouts 183 provided in the pad member 123 of the seat cushion 111, respectively. As a result, the lateral width of the vehicle seat 103 can be reduced and the size of the vehicle seat 103 can be reduced as compared to the case where the cutouts 183 are not provided in the pad member 123. In the seventh embodiment, a gap 185 is defined between the seat cushion 111 and the cushion air conditioning device 171 by providing the cutout 183 in the pad member 123. Therefore, the cushion air conditioning device 171 and the pad member 123 do not come into contact with each other, and heat can be prevented from being transferred from the cushion air conditioning device 171 to the pad member 123.

As shown in FIG. 18, the heat source 207A of the back-side air conditioning device 173 is located behind the pillar guides 131D. Therefore, when a rearward load is applied to the seat occupant, the pillar guides 131D and the pillars 115A restrict the rearward movement of the seat occupant's neck, thereby preventing the seat occupant's neck from coming close to the heat source 207A.

The control unit 181 controls the operation of the seat air conditioning device 163 based on the temperature inside the vehicle cabin 22 acquired by the temperature sensor 167. Accordingly, the vehicle seat 103 can be air-conditioned based on the temperature inside the vehicle cabin 22 where the person seated on the vehicle seat 103 is located. Therefore, the operation of the seat air conditioning device 163 can be controlled so as to match the ambient temperature perceived by the seat occupant.

When the temperature in the cabin 22 acquired by the temperature sensor 167 is equal to or higher than the upper limit threshold value, the control unit 181 drives the cushion air conditioning device 171 to apply cool air to the legs of the seat occupant, thereby cooling the legs of the seat occupant. At this time, the control unit 181 controls the heat source 197A of the outboard side air conditioning device 171B and the heat source 197A of the inboard side air conditioning device 171A so that the air blown from the blower 193 of the outboard side air conditioning device 171B is cooler than the air blown from the blower 193 of the inboard side air conditioning device 171A.

When the temperature in the cabin 22 acquired by the temperature sensor 167 is equal to or lower than the lower limit threshold value, the control unit 181 controls the cushion air conditioning devices 171 so as to apply warm air to the legs of the seat occupant to warm the legs of the seat occupant. At this time, the control unit 181 controls the heat source 197A of the outboard side air conditioning device 171B and the heat source 197A of the inboard side air conditioning device 171A so that the air from the blowers 193, 203, 213 of the outboard side air conditioning device 171B is warmer than the air blown from the blowers 193, 203, 213 of the inboard side air conditioning device 171A.

A seated occupant is likely to be affected by the outside temperature from the outboard side of the vehicle. When the temperature in the cabin 22 is higher than the upper limit threshold value and the seat occupant is likely to feel hot, the legs of the seat occupant are cooled more from the outboard side of the vehicle. Conversely, when the temperature in the cabin 22 is lower than the lower limit threshold value and the seat occupant is likely to feel cold, the legs of the seat occupant are warmed more from the outboard side of the vehicle. Thus, the outboard side of the legs of the seated occupant, which is comparatively susceptible to the outside air temperature, can be cooled or heated more than the inboard side of the legs, so that the influence of the outside air temperature can be reduced.

A seat occupant is particularly susceptible to the external temperature in the legs (i.e., in the lower part of the body of the occupant). The control unit 181 may set the output of the outboard side air conditioning device 171B to be greater than the output of the back-side air conditioning device 173 and the output of the head-side air conditioning device 175. As a result, when the temperature in the cabin 22 is higher than the upper limit threshold value and the seat occupant is likely to feel hot, the outboard side of the seat occupant's legs are cooled more than the seat occupant's neck and head. Further, when the temperature in the vehicle cabin 22 is lower than the lower limit threshold value and the seat occupant is likely to feel cold, the outboard side of the seat occupant's legs are warmed more than the seat occupant's neck and head. Therefore, the outboard side of the seat occupant's legs, which is comparatively more susceptible to the outside air temperature, can be cooled or heated more than the neck and head of the occupant, so that the influence of the outside air temperature can be reduced.

Eight Embodiment

Figure 26:
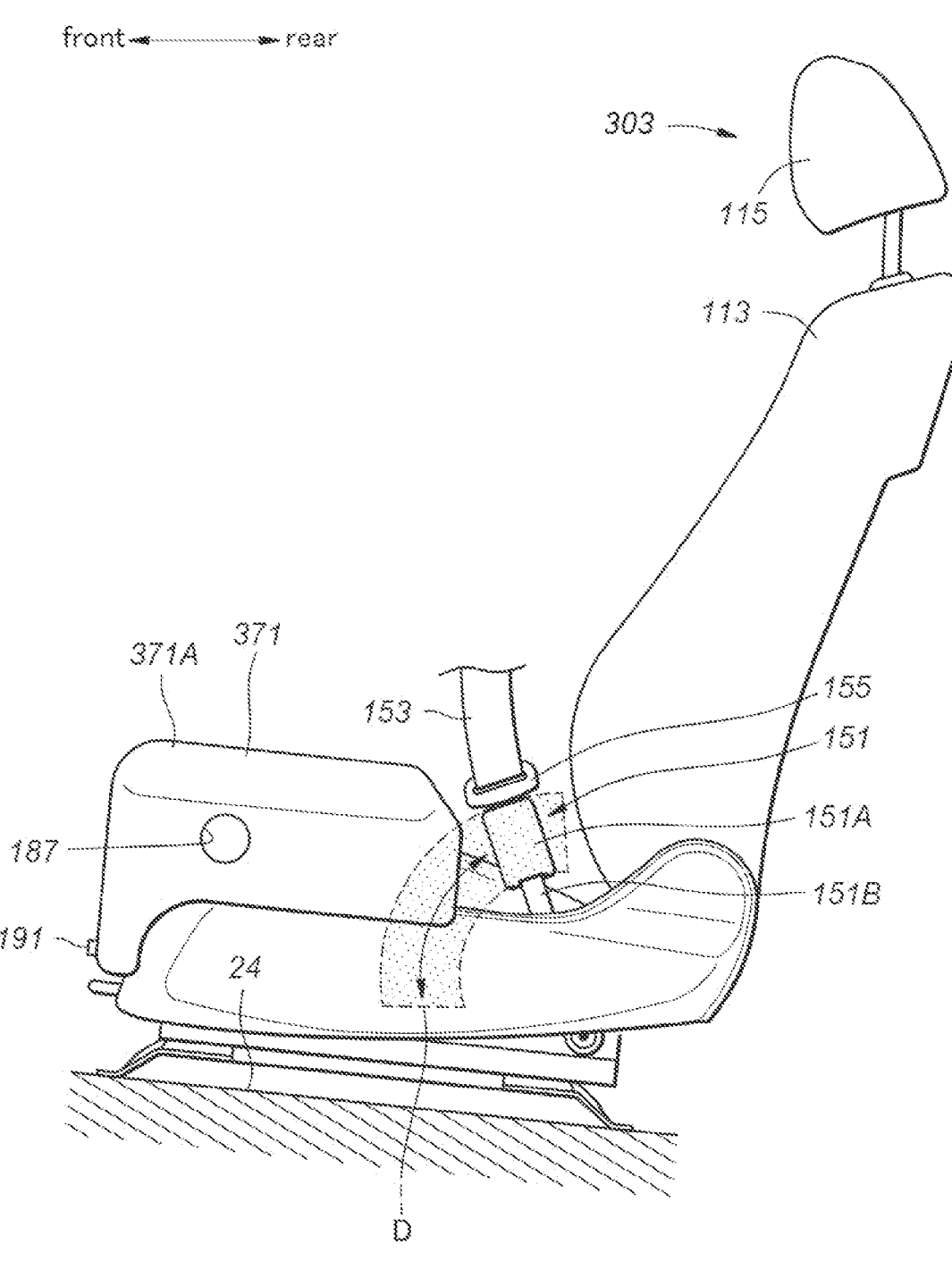
FIG. 26 is a side view of a vehicle seat and an air conditioning system according to an eighth embodiment of the present invention.

As shown in FIG. 26, the vehicle seat 303 and the air conditioning system 161 according to the eighth embodiment of the present invention differ from those of the seventh embodiment in size and position of the cushion air conditioning device 371 on the inboard side, but are otherwise similar to those of the seventh embodiment. Therefore, description of such similar configurations is omitted from the following disclosure.

As shown in FIG. 26, the inboard side air conditioning device 371A (the inboard side cushion air conditioning device 371) is positioned so as to overlap with the movable range D of the buckle 151B in side view. Meanwhile, as shown in FIG. 27, the inboard side air conditioning device 371A is located laterally outside the movable range D of the buckle 151B in front view.

Next, effects of the vehicle seat 303 and the air conditioning system 161 configured in this way will be discussed in the following. As shown in FIG. 27, the inboard side air conditioning device 271A is positioned outside the movable range of D of the buckle 151B in front view. As a result, the movement of the buckle 151B can be prevented from being hindered by the inboard side air conditioning device 271A, and the wearing of the seat belt 153 is facilitated.

In addition, as shown in FIG. 26, the inboard side air conditioning device 371A is positioned so as to partly overlap with the movable range D of the buckle 151B in side view. As a result, the inboard side air conditioning device 371A is less likely to protrude forward from the seat body 105 than when the inboard side air conditioning device 371A does not overlap with the movable range D in side view so that the fore and aft dimension of the seat can be minimized. In addition, the inboard side air conditioning device 371A can blow hot or cold air to the parts of the thighs of the seat occupant adjacent to the buttocks. In this way, by configuring the inboard side air conditioning device 371A so as to overlap with the movable range D of the buckle 151B in side view, the region over which the temperature can be controlled by the inboard side air conditioning device 371A can be maximized.

Ninth Embodiment

Figure 28:
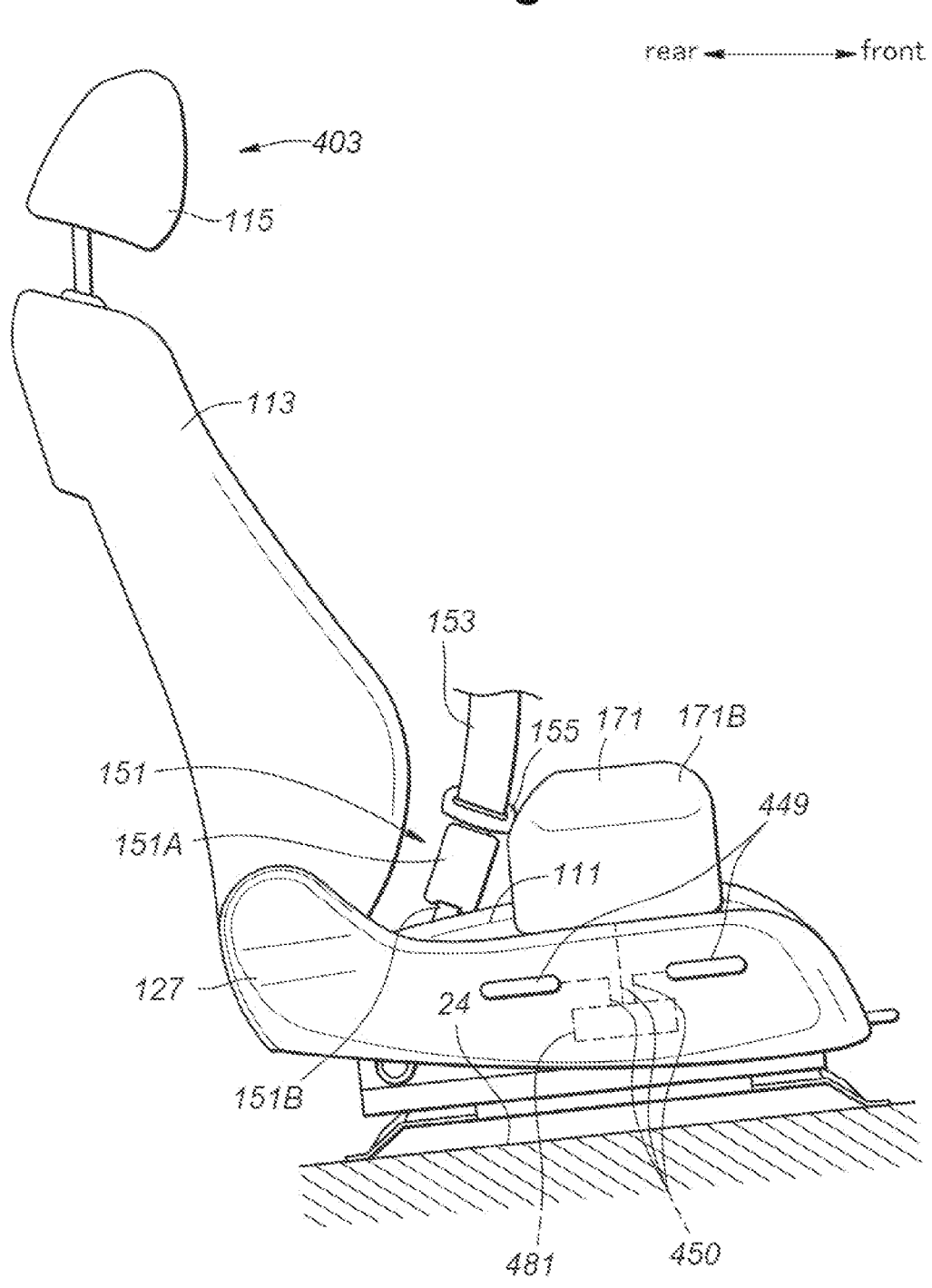
FIG. 28 is a side view of a vehicle seat and an air conditioning system according to a ninth embodiment of the present invention.

As shown in FIG. 28, a vehicle seat 403 and an air conditioning system 161 according to the ninth embodiment of the present invention differ from those of the seventh embodiment in the configuration of the vehicle seat 303 to which the seat air conditioning device 163 is applied. More specifically, instead of the reclining lever 145 and the height lever 147, a pair of buttons 449 are provided on the side surface of the side cover 127 on the laterally outer side of the seat. The buttons 449 each function as an operation input portion that receives an operation input from the seat occupant for changing the reclining angle or the height of the seat body 105. Also, the cushion air conditioning device 171 does not have the lower air blowing port 191 and is located between the front and rear ends of the two buttons 349 in side view. The control unit 481 is provided under the seat cushion 111. The control unit 481 is located longitudinally between the two buttons 349 and below the two buttons 449. The two buttons 449 are connected to the control unit 481 by a wire harness 450. Each of the cushion air conditioning devices 171 is also connected to the control unit 481 by the wire harness 450. As in the eighth embodiment, the outboard side air conditioning device 171B is positioned outside the movable range D of the buckle 151B in front view. Since other parts are similar to those of the seventh embodiment, description of such part is omitted in the following disclosure.

Next, effects of the vehicle seat 403 and the air conditioning system 161 configured in this manner will be discussed in the following. The outboard side cushion air conditioning device 171 (outboard air conditioning device 171B) is positioned between the front and rear ends of the two buttons 449 in the fore and aft direction. In other words, the outboard side air conditioning device 171B is positioned between the front end and the rear end of the side cover 127. As a result, the outboard side air conditioning device 171B does not protrude forward or rearward from the seat body 105 so that the vehicle seat 103 can be minimized in size.

Furthermore, the cushion air conditioning device 171 (outboard side air conditioning device 171B) and the control unit 481 are positioned between the front and rear ends of the two buttons 449. Therefore, the length of the wire harness 450 can be reduced compared to the case where the control unit 481 and the cushion air conditioning device 171 are arranged in front or behind of the two buttons 449.

Tenth Embodiment

Figure 29:
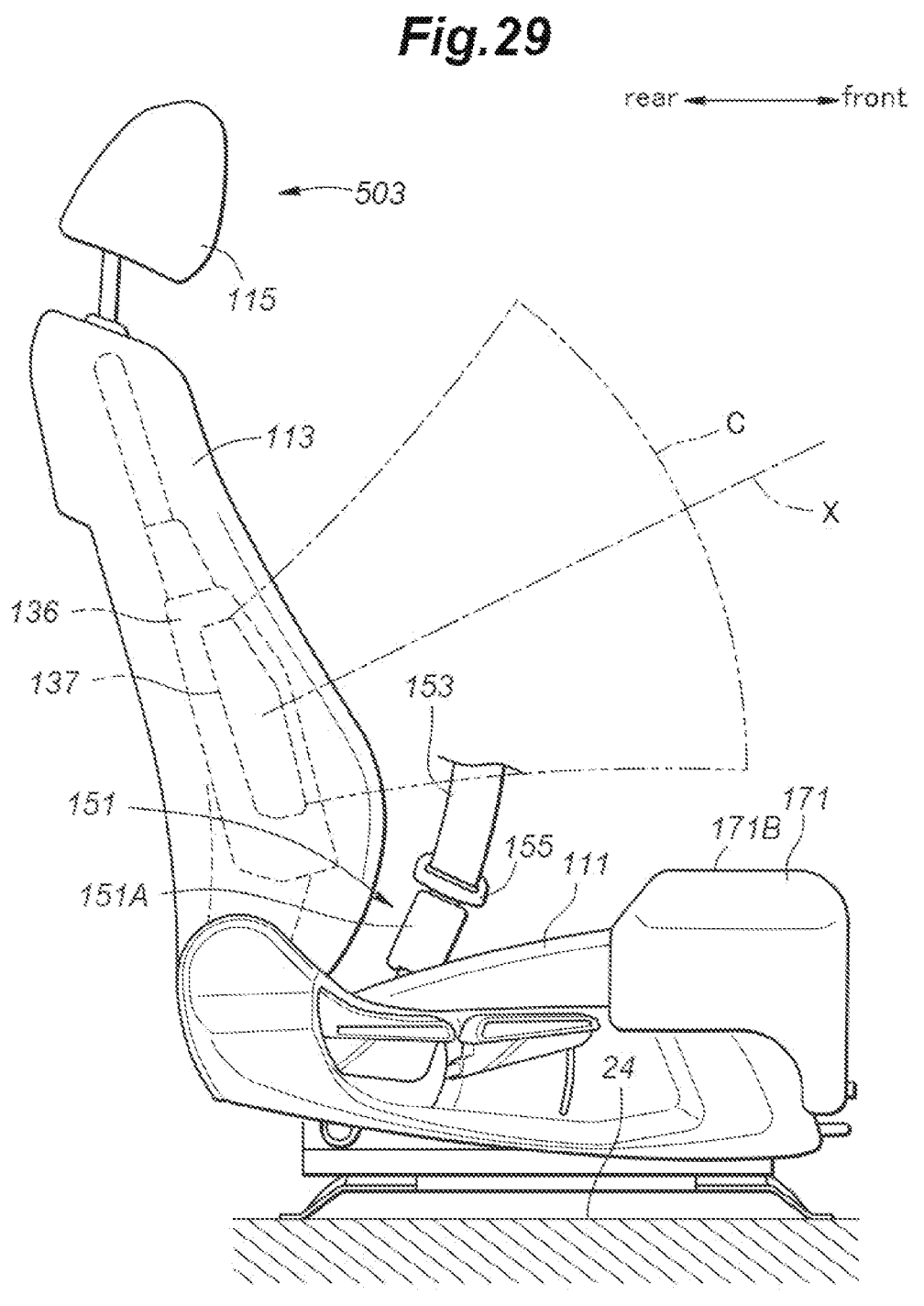

As shown in FIG. 29, the vehicle seat 503 and the air conditioning system 161 according to the tenth embodiment are different from those of the seventh embodiment in that the positional relationship between the cushion air conditioning device 171 (the outboard side air conditioning device 171B) and the deployment range C of the side airbag 137 in the longitudinal direction is different from that of the seventh embodiment, and the parts of the tenth embodiment are otherwise similar to those of the seventh embodiment. Therefore, description of such parts is omitted in the following disclosure.

As shown in FIG. 29, the deployment range C of the side airbag 137 is substantially fan-shaped on either side of an axis X extending obliquely upward. In the tenth embodiment, the front end of the deployment range C of the side airbag 137 is the lower end of the deployment range C. The outboard side air conditioning device 171B is attached to the seat cushion 111 so that the upper end thereof is horizontal. The rear end of the outboard side air conditioning device 171B is positioned below the front end of the deployment range C of the side airbag 137.

Next, effects of the vehicle seat 503 and the air conditioning system 161 configured in this manner will be discussed in the following. The outboard side air conditioning device 171B is attached to the seat cushion 111 so that the upper end thereof is horizontal. As a result, the upper end of the outboard side air conditioning device 171B is parallel to the floor panel 24 so that the vehicle occupant is able to get in and out of the vehicle seat 503 without being hindered by the outboard side air conditioning device 171B. Further, the rear end of the outboard side air conditioning device 171B is positioned below the front end of the deployment range C of the side airbag 137. Since the front end of the deployment range C of the side airbag 137 is the lower end of the deployment range C, the outboard side air conditioning device 171B is positioned outside the deployment range C of the side airbag 137. Therefore, the side airbag 137 is allowed to be deployed without being hindered by the outboard side air conditioning device 171B.

Eleventh Embodiment

A vehicle seat 103 and an air conditioning system 161 according to the eleventh embodiment of the present invention differ from those of the seventh embodiment in the way the seat air conditioning device 163 is controlled by the control unit 181, and the configurations thereof are otherwise similar to those of the seventh embodiment. Therefore, description of such configurations will be omitted in the following disclosure.

When an occupant is seated on the vehicle seat 103 and the temperature in the vehicle cabin 22 acquired by the temperature sensor 167 is equal to or higher than the upper threshold value, the control unit 181 causes the output of the back-side air conditioning device 173 to be greater than the output of the outboard side air conditioning device 171B. As a result, colder air is blown to the neck of the seat occupant than to the thighs of the seat occupant on the outboard side of the vehicle.

Further, when an occupant is seated on the vehicle seat 103 and the temperature in the vehicle cabin 22 acquired by the temperature sensor 167 is equal to or lower than the lower threshold value, the control unit 181 causes the output of the outboard side air conditioning device 171B to be greater than the output of the back-side air conditioning device 173. As a result, warmer air is blown to the thighs on the outboard side of the vehicle than to the neck of the seat occupant.

Next, effects of the vehicle seat 103 and the air conditioning system 161 configured as described above will be discussed in the following. When the seat occupant is likely to feel hot, the upper half of the body, especially the neck, of the seat occupant is cooled, and when the seat occupant is likely to feel cold, the lower half of the body, especially the feet, of the seat occupant is warmed so that the influence of the outside air temperature can be more effectively controlled, and the comfort of the vehicle seat 103 can be improved.

In the eleventh embodiment, when the temperature in the cabin 22 is equal to or higher than the upper limit threshold value, a cooler air is blown to the neck of the seat occupant than to the thighs on the outboard side of the vehicle, and when the temperature in the cabin 22 is equal to or lower than the lower limit threshold value, warmer air is blown to the thighs of the seat occupant on the outboard side than to the neck of the seat occupant. Thus, when the temperature in the cabin 22 is equal to or higher than the upper limit threshold value and the seat occupant is likely to feel hot, the neck is cooled, and when the temperature in the cabin 22 is equal to or lower than the lower limit threshold value and the seat occupant is likely to feel cold, the feet are warmed. Therefore, the influence of the outside air temperature can be more effectively suppressed, and the comfort of the vehicle seat 103 can be improved.

Twelfth Embodiment

A vehicle seat 103 and an air conditioning system 161 according to the twelfth embodiment differ from those of the seventh embodiment in the temperature acquired by the temperature sensor 167, but the configurations of this embodiment are otherwise similar to those in the seventh embodiment, and such configurations are omitted in the following disclosure.

The temperature sensor 167 acquires the surface temperature of the vehicle seat 103. The temperature sensor 167 preferably acquires the surface temperature of the part of the vehicle seat 103 that is in contact with the seated occupant. In this embodiment, the temperature sensor 167 acquires the surface temperature of a substantially central part of the upper surface of the seat cushion 111 of the vehicle seat 103 (the part with which the seat occupant's buttocks are in contact).

As in the seventh embodiment, the control unit 181 controls the seat air conditioning device 163 based on the presence or absence of a seat occupant acquired by the seating sensor 165 and the temperature acquired by the temperature sensor 167, in particular the surface temperature of the vehicle seat 103. More specifically, the control unit 181 operates the seat air conditioning device 163 so as to cool the seated occupant when the surface temperature acquired by the temperature sensor 167 is equal to or higher than the upper threshold value, and to warm the seated occupant when the surface temperature acquired by the temperature sensor 167 is equal to or lower than the lower threshold value.

Next, effects of the vehicle seat 103 and the air conditioning system 161 configured as described above will be discussed in the following. The control unit 181 operates the air conditioning system 161 based on the surface temperature of the vehicle seat 103. The control unit 181 can improve the comfort of the vehicle seat 103 by operating the air conditioning system 161 based on the surface temperature of the vehicle seat 103, which is closer to the temperature perceived by the occupant, compared to the case where the air conditioning system 161 is operated based on the temperature in the cabin 22.

Thirteenth Embodiment 13

Figure 30:
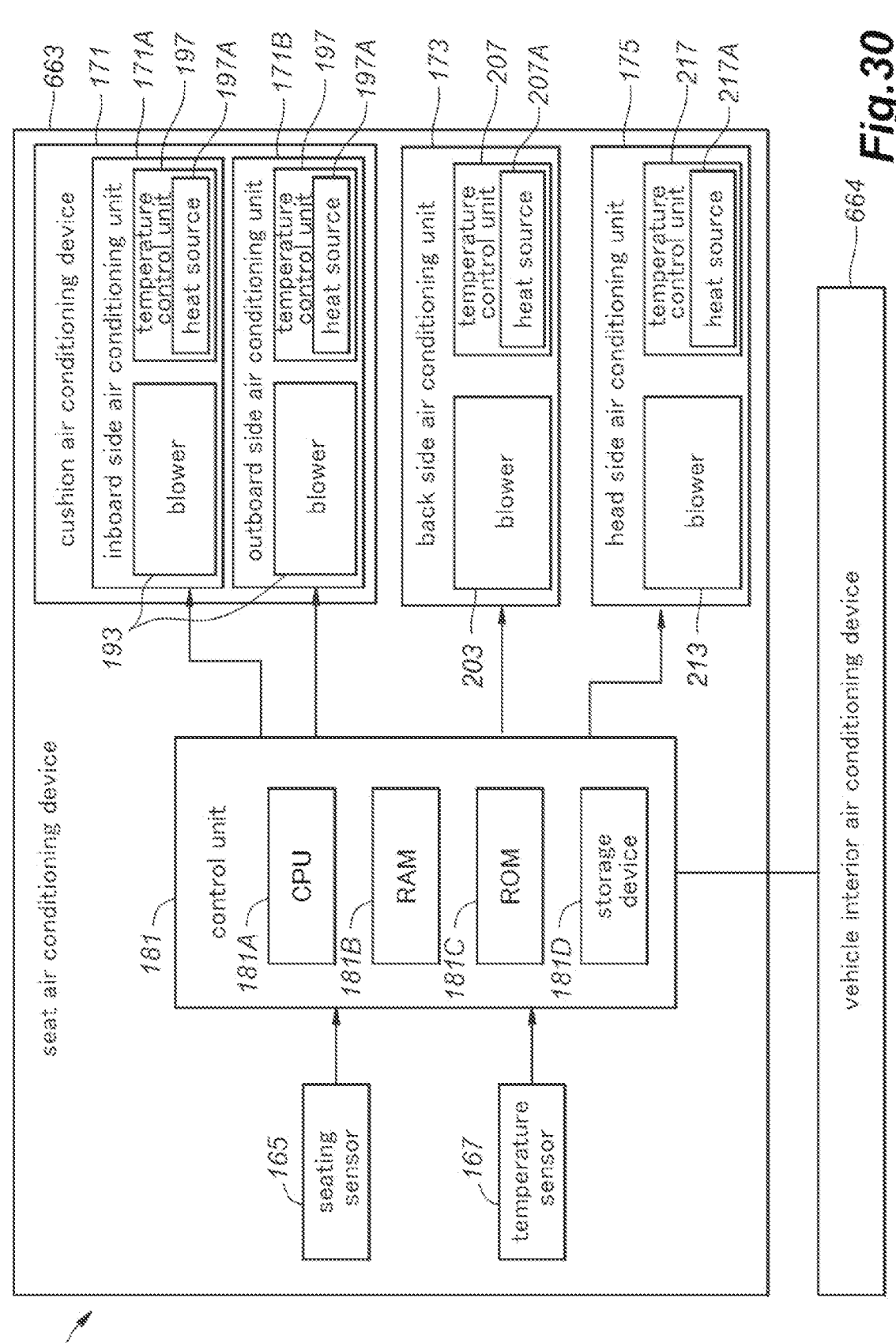
FIG. 30 is a block diagram of an air conditioning system according to a thirteenth embodiment of the present invention.

As shown in FIG. 30, the vehicle seat 103, the vehicle and the air conditioning system 161 according to the thirteenth embodiment differ from those of the twelfth embodiment in the way the seat air conditioning device 663 is controlled by the control unit 181. Another difference is that the air conditioning device 661 further includes a cabin air conditioning device 664 that air conditions the cabin 22 in which the vehicle seat 103 is located. The configurations of the thirteenth embodiment are otherwise similar to those of the twelfth embodiment, and the description of such configurations is omitted in the following disclosure.

The cabin air conditioning device 664 is connected to the control unit 181 of the seat air conditioning device 163. When an occupant is seated on the vehicle seat 103 and the surface temperature acquired by the temperature sensor 167 becomes equal to or higher than the upper threshold value or equal to or lower than the lower threshold value, the control unit 181 operates the cushion air conditioning devices 171, the back-side air conditioning device 173 and the head-side air conditioning device 175. Then, the control unit 181 forwards a drive notification signal indicating that the cushion air conditioning device 171, the back-side air conditioning device 173, and the head-side air conditioning device 175 are being driven, along with the surface temperature acquired by the temperature sensor 167, to the cabin air conditioning device. 664.

Upon receiving the drive notification signal and the surface temperature from the control unit 181, the cabin air conditioning device 664 is operated depending on if the surface temperature is equal to or higher than a predetermined drive threshold value. The drive threshold value is set to a value smaller than the lower threshold value. When the surface temperature is equal to or higher than the drive threshold value, the cabin air conditioning device 664 is operated to air-condition the cabin 22.

Next, effects of the vehicle seat 103 and the air conditioning system 161 configured in this manner will be discussed in the following. When the seat occupant is seated on the vehicle seat 103 and the surface temperature is equal to or lower than the drive threshold value, the cushion air conditioning device 171, the back-side air conditioning device 173, and the head-side air conditioning device 175 are driven. The surface of the vehicle seat 103 is warmed by the body temperature of the seat occupant as well as by the driving of the cushion air conditioning device 171, the back-side air conditioning device 173, and the head-side air conditioning device 175.

Thereafter, when the surface temperature rises and becomes equal to or higher than the drive threshold value, the cabin air conditioning device 664 is driven to air-condition the cabin 22. Since the air conditioning devices are thus operated in the order of closeness to the seat occupant, the seat occupant and the region surrounding the occupant can be warmed more quickly than when the seat air conditioning device 163 is operated after the cabin air conditioning device 664 is operated.

Fourteenth Embodiment

A vehicle seat 103 and an air conditioning system 161 according to the fourteenth embodiment differ from those of the thirteenth embodiment in the way the cabin air conditioning device 664 is operated. The configurations of the fourteenth embodiment are otherwise similar to those of the seventh embodiment. Therefore, the description of such configurations is omitted in the following disclosure.

Upon receiving the drive notification signal and the surface temperature from the control unit 181, the cabin air conditioning device 664 determines if the surface temperature has been maintained at or above the drive threshold value for a predetermined time period of time (for example, 1 minute). The drive threshold value is set to a value smaller than the lower threshold value. When the surface temperature is maintained to be equal to or higher than the drive threshold value for a predetermined time period of time, the cabin air conditioning device 664 is operated to air-condition the interior of the vehicle cabin 22.

Next, effects of the vehicle seat 103 and the air conditioning system 161 configured as described above will be discussed in the following. Following the activation of the seat air conditioning device 163, the cabin air conditioning device 664 is activated only after the state in which the temperature sensor 167 has continued to detect the surface temperature of the vehicle seat 103 to be equal to or higher than the drive threshold value. Therefore, even if the temperature sensor 167 detects that the surface temperature is instantaneously equal to or higher than the drive threshold value due to an erroneous detection, as long as the surface temperature is not maintained at or above the drive threshold value, the cabin air conditioning device 664 is not activated. In this manner, erroneous operation of the cabin air conditioning device 664 can be prevented even in the case of such an erroneous detection by the temperature sensor 167.

Further, even if the surface temperature of the vehicle seat 103 becomes equal to or higher than the drive threshold, it may take time for the seat occupant to feel warm. In the present embodiment, since the cabin air conditioning device 664 is activated after the surface temperature of the vehicle seat 103 is maintained at or above the drive threshold, the cabin air conditioning device 664 can be controlled according to the temperature perceived by the seat occupant.

Fifteenth Embodiment

A vehicle seat 103 and an air conditioning system 161 according to the fifteenth embodiment differ from the seventh embodiment in the configuration of the back-side air conditioning device 173, but are otherwise similar to those of the seventh embodiment. Therefore, description of such similar parts is omitted in the following disclosure.

As in the seventh embodiment, the back-side air conditioning device 173 includes a pair of blowers 203 (see FIG. 18) connected to either lateral end of the upper frame 131B of the seat back 113, a duct 205 (see FIG. 18) that extend laterally between the blowers 203 and having an opening facing forward, and a temperature control device 207 (see FIG. 18) provided at the opening of the duct.

As in the seventh embodiment, the blowers 203 are positioned at the end parts of the upper frame 131B via the fixing brackets 131E. The duct 205 is secured to the blowers 203 and extends along the upper rear surface of the upper frame 131B (see FIG. 18).

Figure 31:
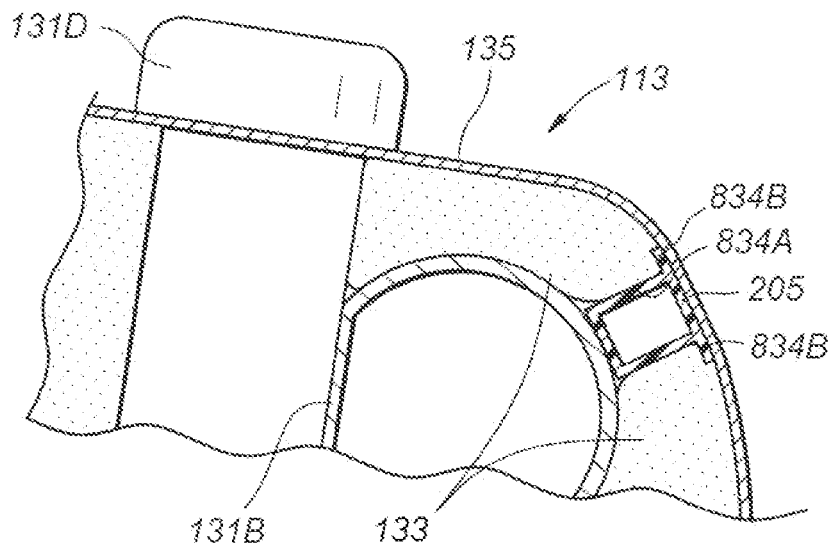
FIG. 31 is a sectional view of an upper rear end part of a seat back illustrating a back-side air conditioning device according to a fifteenth embodiment of the present invention.

Both the upper frame 131B and the blowers 203 are covered with the pad member 133 from behind. As shown in FIG. 31, the pad member 133 is provided with a through hole 834A penetrating in the fore and aft direction at a position overlapping with the duct 205 in the fore and aft direction. The duct 205 is received in the through hole 834A of the pad member 133. The duct 205 is provided with a pair of lips 834B extending away from the upper and lower end parts of the rear surface thereof. Each lip 834B has a plate-like shape extending along the rear surface of the pad member 133 and projecting in a direction away from the duct 205. The pad member 133, the duct 205 and the lips 834B are covered with the skin member 135 from behind.

Next, effects of the vehicle seat 103 and the air conditioning system 161 configured as described above will be discussed in the following. The blowers 203 and the duct 205 of the back-side air conditioning device 173 are covered with the pad member 133 from the back-side. Therefore, the upper end part of the back surface of the seat back 113 is provided with a cushioning property.

The duct 205 is accommodated in the through hole 834A provided in the pad member 133. Therefore, the thickness of the seat back 113 in the fore and aft direction can be reduced compared to the case where the pad member 133 does not have the through hole 834A and the duct 205 is covered with the pad member 133.

Also, the parts of the pad member 133 located above and below the duct 205 are pressed forward by the lips 834B. Therefore, the parts of the pad member 133 above and below the duct 205 are prevented from bulging rearward. As a result, the part of the seat back 113 where the duct 205 is provided presents a natural look, and the external appearance of the vehicle seat 103 is improved.

In the above-described embodiment, the seat air conditioning device 163 forwards cool air/warm air to the seat occupant to adjust the temperature around the seat occupant. However, the present invention is not limited by this example as long as the temperature perceived by the occupant is controlled. The cushion air conditioning devices 171, the back-side air conditioning device 173, and the head-side air conditioning device 175 included in the seat air conditioning device 163 may each include only one of the heat sources 197A, 207A, 217A for heating and cooling, and the blowers 193, 203, 213 for blowing air toward the seat occupant (either the heat source 197A, 207A, 217A for heating and cooling, or the blowers 193, 203, 213 for blowing air toward the seat occupant). Also, the heat sources 197A, 207A, 217A may be provided upstream or downstream of the corresponding blowers 193, 203, 213.

Sixteenth Embodiment

A vehicle seat to which the headrest according to the sixteenth embodiment of the present invention is applied will be described in the following with reference to FIGS. 32 to 36. In the following description, the front-back direction, the left-right direction, and the up-down direction are determined with respect to the vehicle.

Figure 32:
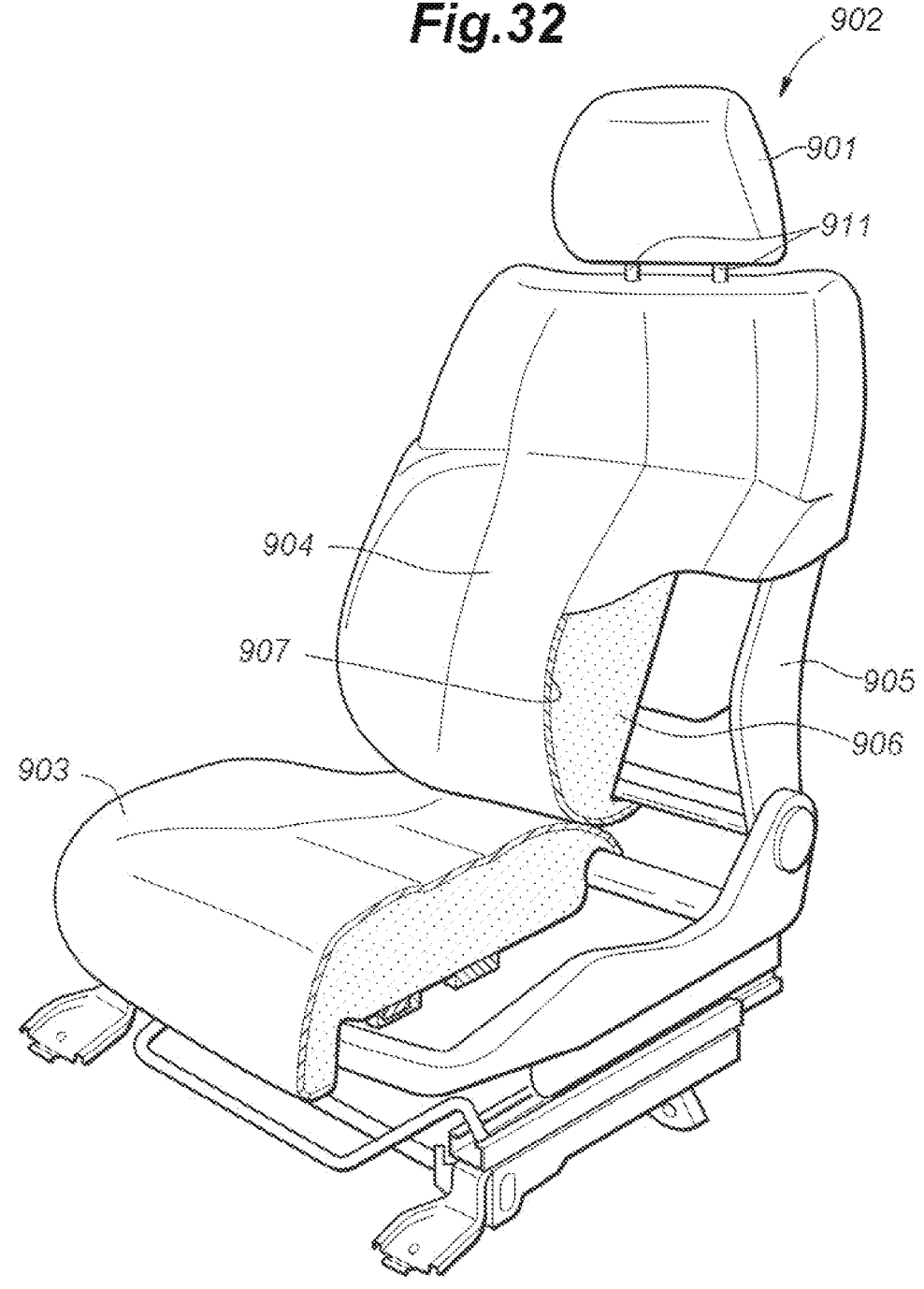
FIG. 32 is a front perspective view of a seat fitted with a headrest according to a sixteenth embodiment of the present invention.

The headrest 901 forms a part of vehicle seat 902. As shown in FIG. 32, the vehicle seat 902 includes a seat cushion 903 and a seat back 904 in addition to the headrest 901.

The seat cushion 903 has a seat surface that faces upward and supports the buttocks of the seat occupant. A seat back 904 extends upward from the rear part of the seat cushion 903. The seat back 904 has a forward facing support surface to support the back of the occupant resting against the support surface.

The seat cushion 903 and seat back 904 are each provided with a metal frame 905, a pad member 906 supported by the frame 905, and a skin member 907 covering the pad member 906.

The frame 905 of the seat back 904 includes a pair of side members 905A extending vertically on either side thereon, an upper member (not shown in the drawings) extending horizontally between the upper ends of the side members 905A, and a lower member (not shown in the drawings) extending horizontally between the lower ends of the side members 905A.

A pair of guide stays 908 (see FIG. 33) are connected to a laterally central part of the upper member of the frame 905. Each guide stay 908 is formed by a square pipe which is open at both ends. The guide stays 908 are laterally spaced from each other. Each guide stay 908 has a circular cross section and defines a through hole (not shown in the drawings) extending vertically therethrough.

Figure 33:
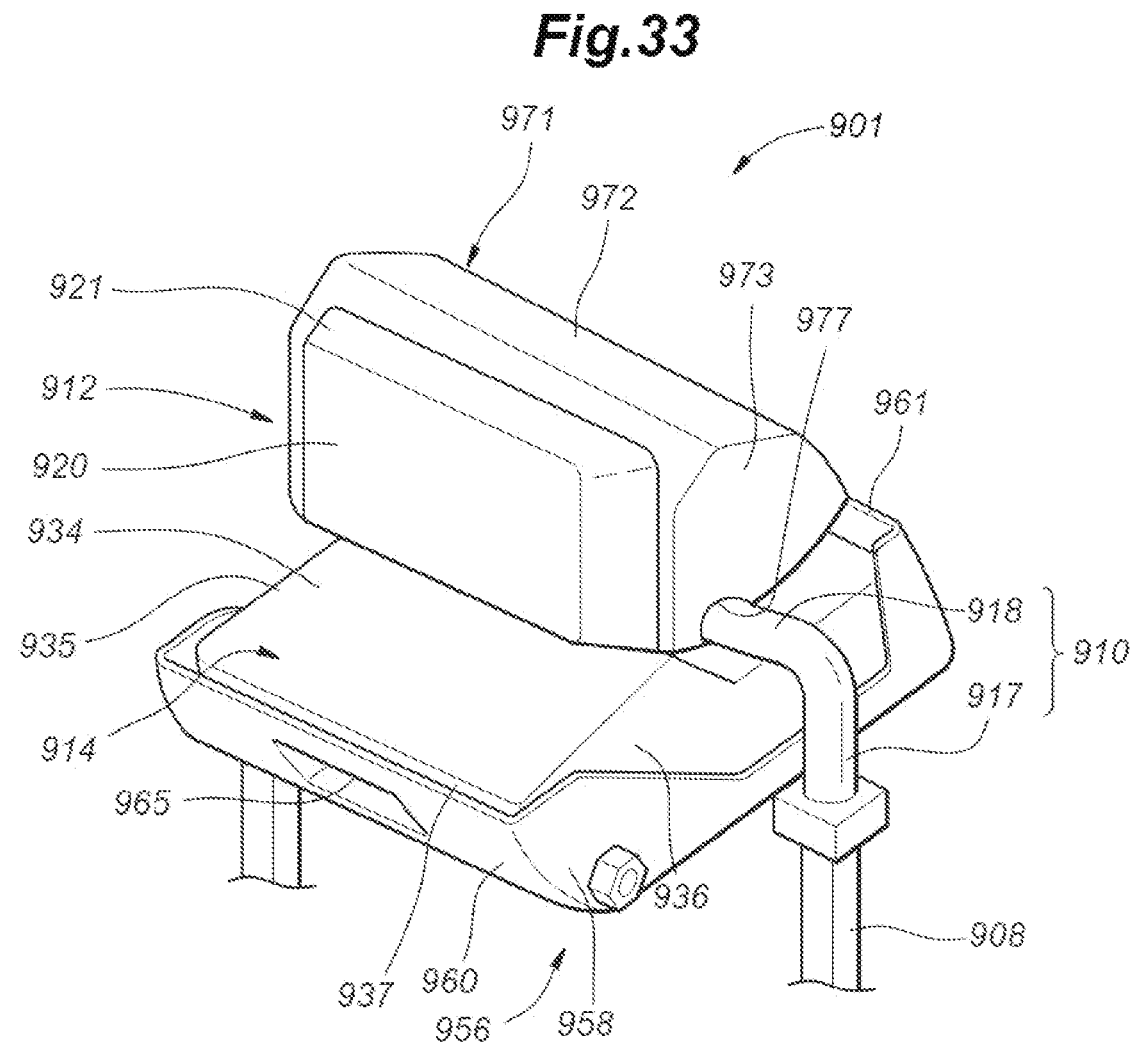
Figure 34:
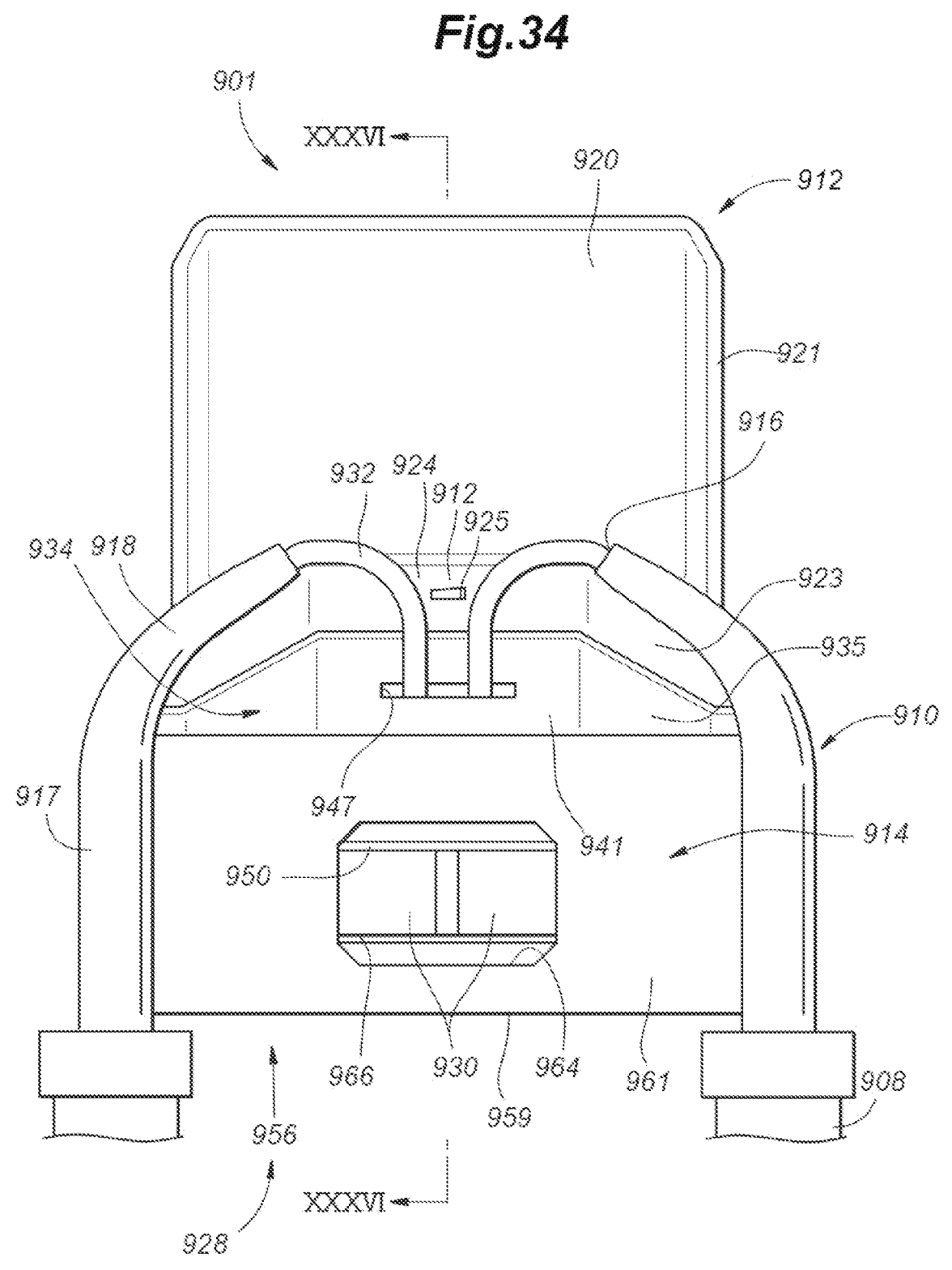

Details of the headrest 901 will be described in the following with reference to FIGS. 33-36. In FIGS. 33 and 34, the headrest 901 is shown with the skin member 981 and the pad member 980 removed. The skin member 981 and the pad member 980 will be described later in detail.

As shown in FIG. 33, the headrest 901 includes a pair of headrest pillars 910 having a substantially cylindrical shape on either side thereof, a plate 912 connected between the left and right headrest pillars 910, and a temperature control device 914 positioned under the plate 912. The headrest 901 is supported at the upper end of seat back 904 (see FIG. 32) by inserting the headrest pillars 910 into the through holes of guide stays 908, respectively.

Each headrest pillar 910 is open at both ends. Thus, a pillar hole 916 which is open at both ends is defined inside the headrest pillar 910. The headrest pillar 910 has an upright portion 917 that extends substantially vertically from the guide stay 908 and a curved portion 918 that curves laterally inward and forward from the upper end of the upright portion 917. The headrest pillars 910 are made of metal.

The plate 912 has a major plane portion 920 that faces substantially in the fore and aft direction and supports the back of the occupant's head, and an extension portion 921 that extends rearward from the upper edge and side edges of the major plane portion 920. The lateral width of the major plane portion 920 is smaller than the lateral distance between the two upright portions 917 and larger than the lateral distance between the tips of the curved portions 918. The plate 912 is made of metal.

Figure 35:
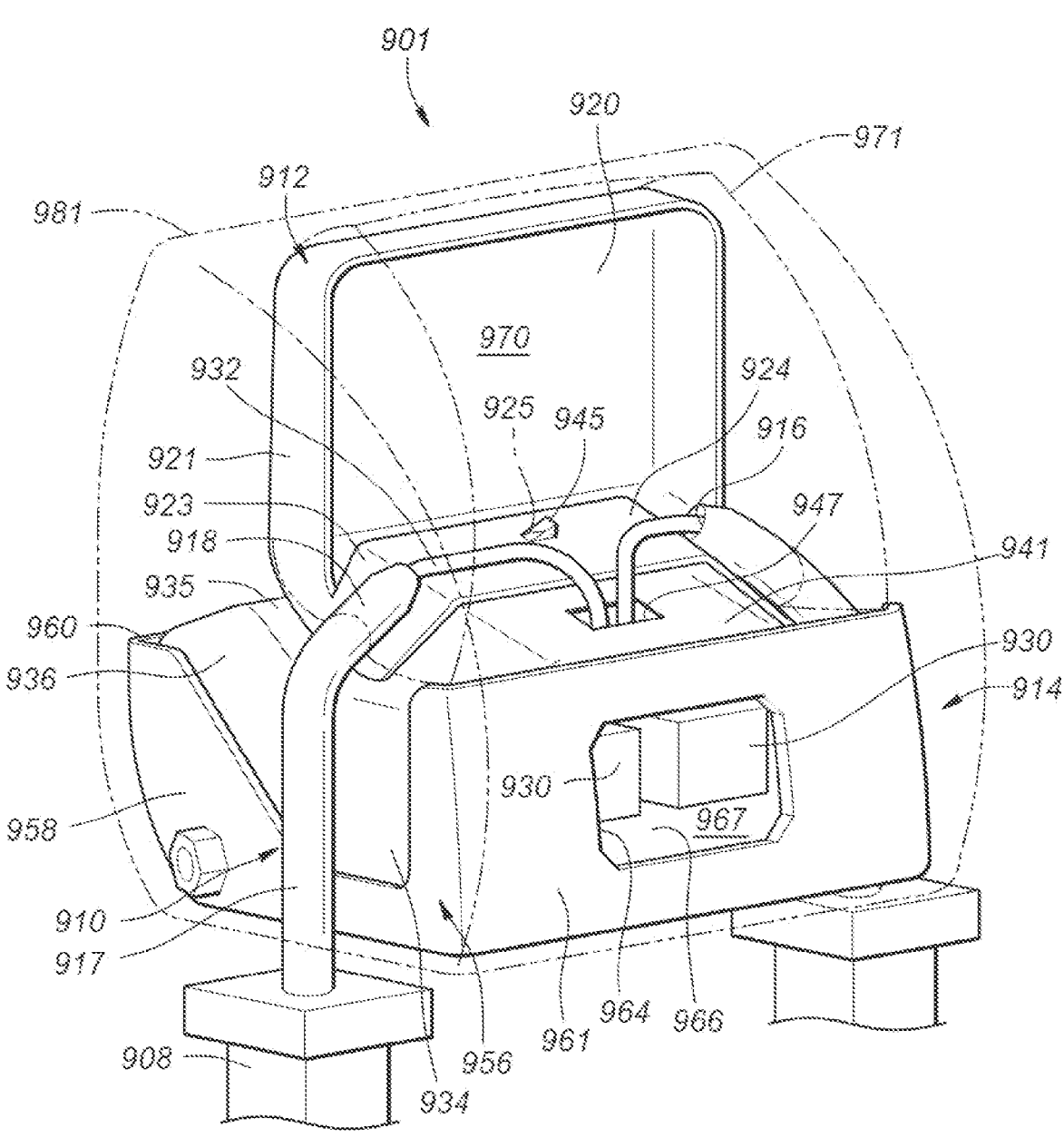
FIG. 35 is a rear perspective view of the headrest of the sixteenth embodiment.

As shown in FIG. 35, the lower part of the plate 912 is provided with a rearwardly extending connecting piece 924. The connecting piece 924 substantially has a plate shape extending perpendicularly to the major plane portion 920. An engagement hole 925 is provided at a substantially laterally central part of the connecting piece 924 so as to vertically penetrate the connecting piece 924. A pair of inclined pieces 923 extend from either side edge of the connecting piece 924, and are inclined downward toward the lateral outer ends thereof. The curved portion 918 of each headrest pillar 910 is welded to the upper surface of the corresponding inclined piece 923.

Figure 36:
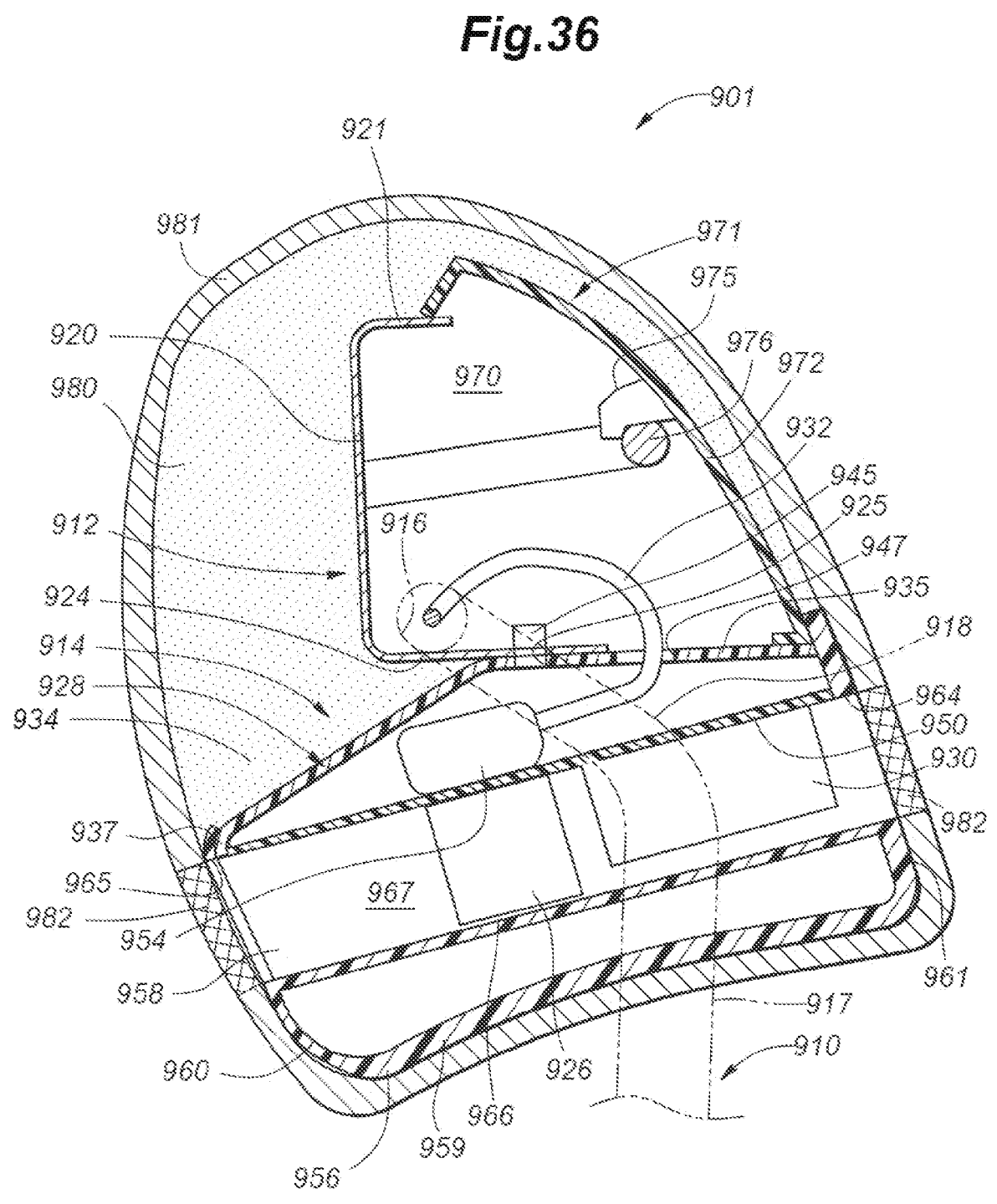

As shown in FIG. 36, the temperature control device 914 includes a casing 928 fixed to the plate 912, a temperature control portion 929 and a blower 930 fixed within the casing 928, and a wire harness 932 that supplies electric power to the temperature control portion 929 and the blower 930.

The casing 928 includes an upper casing part 934 positioned below and secured to the plate 912 and a lower casing part 956 positioned below and secured to upper casing part 934. The upper casing part 934 and the lower casing part 956 are made of resin.

As shown in FIGS. 33 to 37, the upper casing part 934 is connected to the connecting piece 924 of the plate 912 and has an upper wall 935 facing substantially vertically and a pair of side walls 936 extending downward from either lateral edge of the upper wall 935, and a front wall 937 extending downwardly from the front edge of the upper wall 935. The side walls 936 are each provided with fastening holes (not shown in the drawings) penetrating the side wall 936 in the lateral direction. The upper wall 935 is formed with a protrusion 941 that protrudes upward along the connecting piece 924 and the inclined pieces 923. The laterally outer edges of the upper wall 935 are positioned laterally outward of the laterally outer edges of the plate 912, respectively. The front edge of the upper wall 935 is located ahead of the front edge of the plate 912.

As shown in FIG. 4, the part of the upper casing part 934 (protrusion 941) vertically aligning with the engagement hole 925 of the connecting piece 924 is provided with an engagement claw 945 projecting upward. In the sixteenth embodiment, the plate 912 and the upper casing part 934 are connected to each other by engaging the engagement claw 945 with the engagement hole 925. Further, a wire harness hole 947 is passed through the protrusion 941 in the vertical direction at a position of the protrusion 941 located behind the engagement claw 945.

As shown in FIG. 36, a support plate 950 is placed under the upper casing part 934. The support plate 950 has a substantially thin plate shape extending both laterally and longitudinally. The support plate 950 is fixed to a lower part of the upper casing part 934 by threading screws into screw holes (not shown in the drawings).

A temperature control portion 929 is fixed to the lower surface of a front part of the support plate 950. The left and right blowers 930 are fixed to the lower surface of a rear part of the support plate 950. A connector 954 receiving the wire harness 932 therein, and electrically connecting the wire harness 932 to the temperature control portion 929 and the blowers 930 is fixed to a part of the upper surface of the support plate 950 vertically aligning with the temperature control portion 929.

The lower casing part 956 is secured to a lower part of the upper casing part 934. The lower casing part 956 includes a pair of side walls 958 each having a fastening hole at a position corresponding to the fastening hole of the corresponding side wall 936 of the upper casing part 934, a bottom wall 959 extending between the lower edges of the side walls 958, a front wall 960 extending upwardly from the front edge of the bottom wall 959, and a rear wall 961 extending upwardly from the rear edge of the bottom wall 959. The upper casing part 934 and lower casing part 956 are fastened together by bolts (not shown in the drawings) that are passed through the fastening holes (not shown in the drawings) of the upper casing part 934 and the lower casing part 956, and are threaded with nuts (not shown in the drawings). The front end of the front wall 960 is positioned behind the plate 912.

The rear wall 961 of the lower casing part 956 is formed with an air inlet 964 that penetrates the rear wall 961 in the fore and aft direction. The front wall 960 of the lower casing part 956 is formed with an air blowing port 965 passed through the front wall 960 in the fore and aft direction. The lower casing part 956 is provided with a partition wall 966 extending along a line connecting the lower end of the air inlet 964 and the lower end of the air blowing port 965. Thereby, the support plate 950, the partition wall 966 and the left and right side walls 958 jointly define an air passage 967 extending from the air inlet 964 to the air blowing port 965. The air passage 967 slopes downward toward the front.

The blower 930 is a device for forwarding air into the casing 928 (into the air passage 967). The temperature control portion 929 is a device for adjusting the temperature of the air flowing into the air passage 967 from the air inlet 964 to generate cool air or warm air. The temperature control portion 929 includes a heat source that generates or absorbs heat, such as a heating wire or a Peltier device. The blower 930 blows the air whose temperature is controlled by the temperature control portion 929 from the air blowing port 965 toward the front of the headrest 901. In other words, the air blown forward by the blower 930 is cooled or heated by the temperature control portion 929 and then blown toward the head of the seat occupant from the air blowing port 965. This regulates the temperature of the air around the head of the seat occupant.

The headrest 901 further comprises a protective cover 971 positioned behind the plate 912 and defines a hollow portion 970 in cooperation with the plate 912 and the temperature control device 914 as shown in FIG. 36. More specifically, the protective cover 971 cooperates with the plate 912 and the upper casing part 934 to define the hollow portion 970.

As shown in FIG. 33, the protective cover 971 includes a plate-shaped cover central part 972 that extends downward toward the rear, and a pair of cover side parts 973 that extend forward and downward from the lateral edges of the cover central part 972. The protective cover 971 contacts the plate 912 at the front edge of the cover central part 972 and the front edges of the left and right cover side parts 973. As shown in FIG. 36, a pair of wire locking portions 975 protrude forward from a laterally central of the cover central part 972 into the hollow portion 970 in a laterally spaced relationship. A wire 976 is provided on the rear surface of the plate 912. The wire 976 is engaged by the wire locking portions 975. Owing to this engagement structure, the protective cover 971 is fixedly secured to the plate 912.

As shown in FIG. 33, the lower end of each cover side part 973 is formed with a notch portion 977 that is notched upward. The curved portion 918 of each headrest pillar 910 extends into hollow portion 970 through the corresponding notch portion 977. As a result, the tip end of the headrest pillar 910 is positioned inside the hollow portion 970. Therefore, the wire harness 932 connected to the temperature control portion 929 and the blower 930 can extend from the temperature control portion 929 and the blower 930 through the harness hole 947, the hollow portion 970 and the pillar hole 916, and come out from the lower end of the headrest pillar 910.

As shown in FIG. 36, the headrest 901 further includes the pad member 980 which is supported by the headrest pillars 910, the plate 912, and the temperature control device 914. More specifically, the pad member 980 covers the headrest pillars 910, the plate 912 and the casing 928 from the front, and also covers the cover central part 972 of the protective cover 971 from above. The headrest 901 further includes the skin member 981 covering the pad member 980. The parts of the skin member 981 opposing the air inlet 964 and the air blowing port 965 from the front and rear, respectively, are formed by meshes 982. As a result, the air can be drawn from the outside of the headrest 901 via the air inlet 964 and blown out through the air blowing port 965.

Next, the process of manufacturing the headrest 901 according to the sixteenth embodiment will be described in the following. First, the worker fixes the headrest pillars 910 to the plate 912 by welding the lower surfaces of the tip ends of the left and right headrest pillars 910 to the upper surfaces of the inclined pieces 923 of the plate 912, respectively. Next, the upper casing part 934 is fixed to the plate 912 by engaging the engagement claws 945 of the upper casing part 934 with the engagement holes 925 of the connecting pieces 924.

Next, the worker places the protective cover 971 behind the plate 912 and locks the wire 976 to the wire locking portion 975 to fix the protective cover 971 to the plate 912. At this time, the tip ends of the headrest pillar 910 are located within the hollow portion 970 defined by the plate 912, the upper casing part 934 and the protective cover 971. Thereafter, the assembly prepared by the foregoing steps is placed in a mold for molding the pad member 980, and a molding material is supplied into this mold to perform foam molding. Thereby, the pad member 980 is attached to the headrest pillars 910, the plate 912 and the upper casing part 934.

Next, the worker connects the wire harness 932 extending through the pillar hole 916 of the headrest pillar 910, the hollow portion 970 and the wire harness hole 947 of the upper casing part 934 to the temperature control portion 929 and the blower 930 via the connector 954. Thereafter, the temperature control portion 929 and the blower 930 are attached to the support plate 950 from below. Next, the lower casing part 956 is fixed to the upper casing part 934 by fastening bolts (not shown in the drawings) that are passed through the fastening holes of the upper casing part 934 and the lower casing part 956 and are threaded with the nuts. As a result, an air passage 967 extending from the air inlet 964 to the air blowing port 965 is defined, and the blower 930 is positioned in front of the air inlet 964 while the temperature control portion 929 positioned in front of the blower 930 is positioned at the rear of the air blowing port 965. Finally, the headrest 901 according to the sixteenth embodiment is completed by covering the structure assembled by the above steps with the skin member 981.

In the headrest 901 of the sixteenth embodiment, the tip ends of the headrest pillars 910 are positioned in the hollow portion 970 so that the wire harness 932 can extend through the wire harness hole 947, the hollow portion 970 and the pillar hole 916, and come out from the bottom end of the headrest pillar 910. Since these spaces are separated from the pad member 980 by the plate 912, the protective cover 971 and the casing 928, the pad member 980 can be foam molded in such a manner that the pad member 980 of the headrest 901 of the vehicle seat 902 is prevented from interfering with the wire harness 932 extending inside the headrest pillar 910.

Seventeenth Embodiment

Next, the headrest 1000 according to the seventeenth embodiment of the present invention will be described in the following with reference to FIGS. 37 and 38. The headrest 1000 shown in FIG. 6 differs from the headrest 901 mainly in the air inlet 964 and the pad member 980. In the following disclosure, only the parts different from those of the previous embodiment will be described, and the description of other parts will be omitted.

Figure 37:
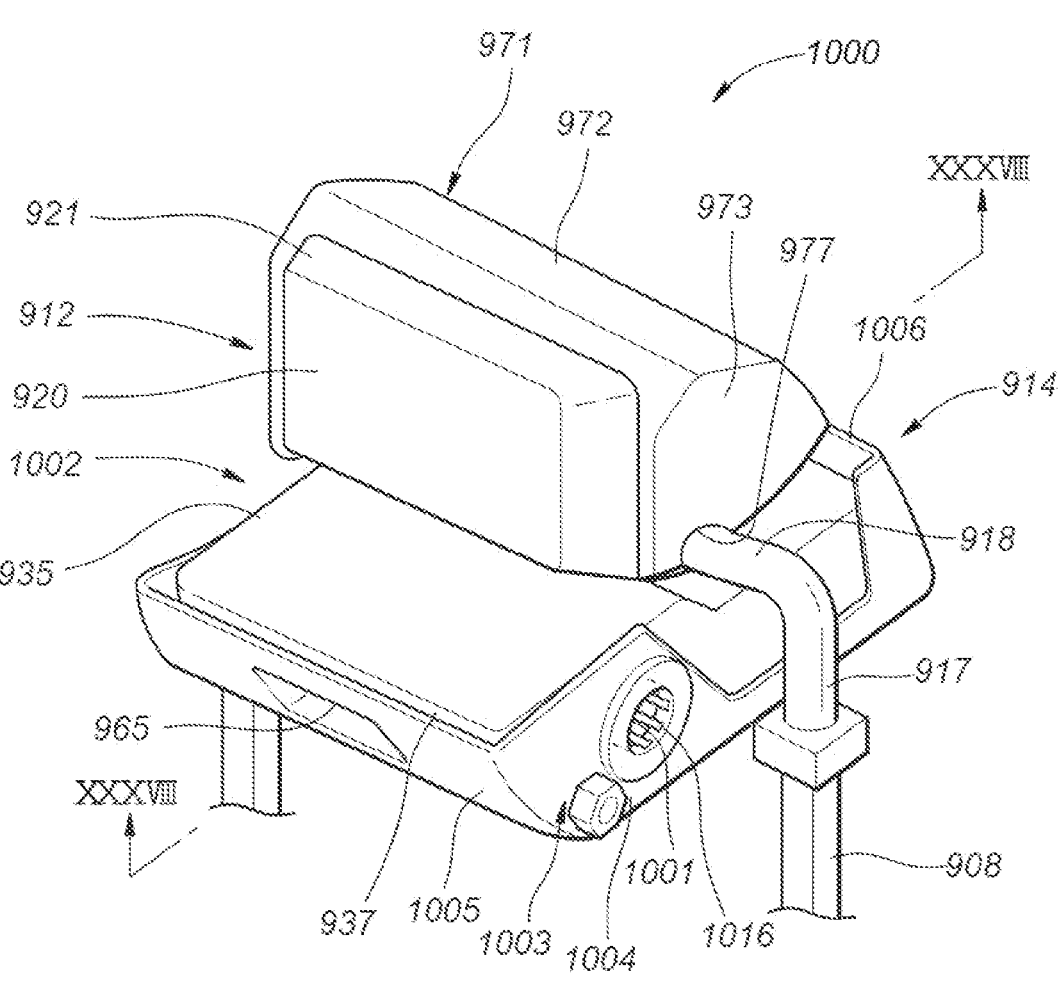
FIG. 37 is a front perspective view of a headrest according to a seventeenth embodiment of the present invention.
Figure 38:
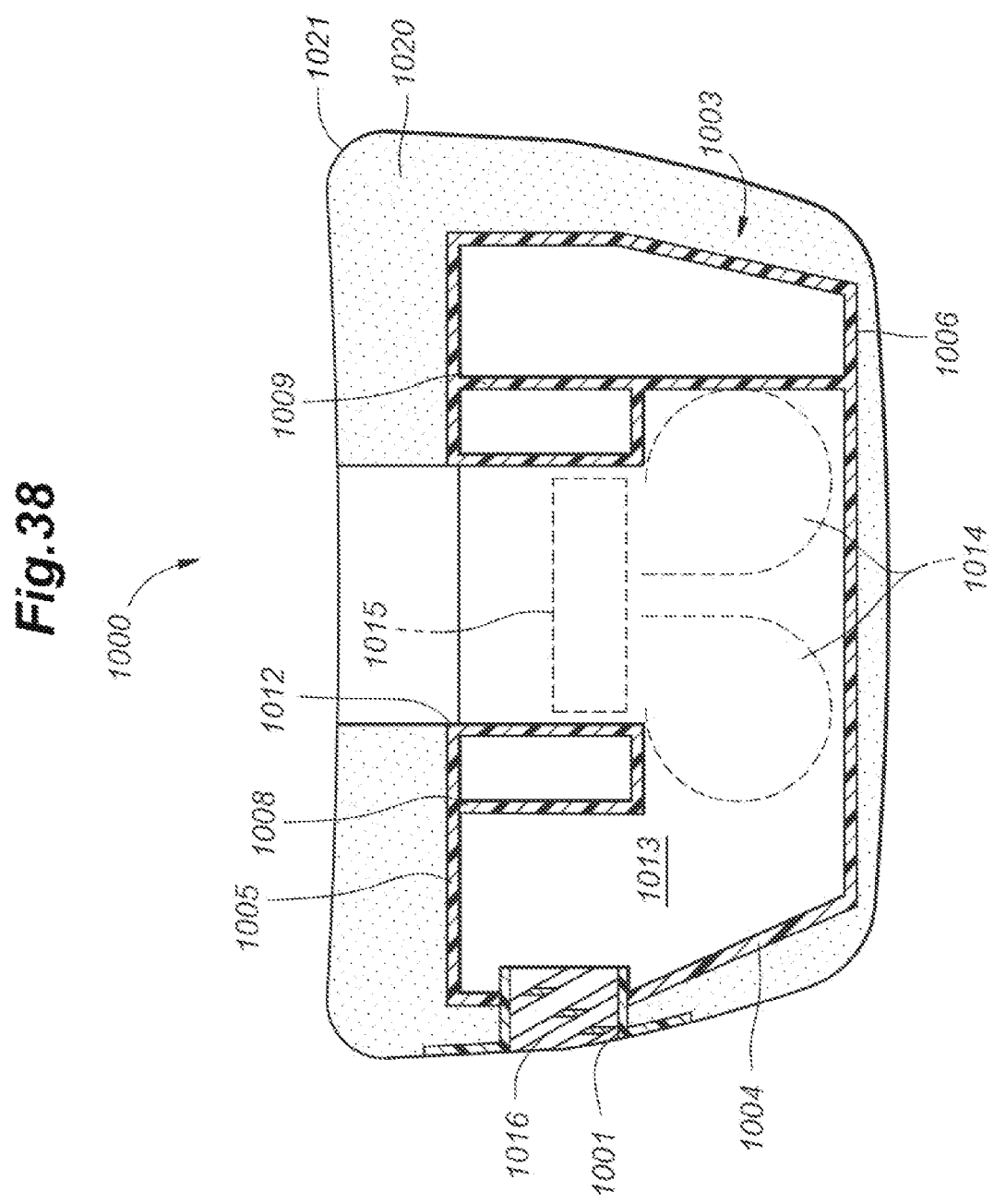
FIG. 38 is a cross sectional view of the headrest of the seventeenth embodiment taken along line XXXVIII-XXXVIII in FIG. 37.

As shown in FIGS. 37 and 38, the air inlet 1001 of the headrest 1000 is provided on one of the two sides of the casing 1002. More specifically, the air inlet 1001 is provided in the left side wall 1004 of the lower casing part 1003. In the seventeenth embodiment, the vehicle seat 902 provided with the headrest 1000 is applied to the assistant's seat or the leftmost rear seat of a vehicle. As a result, the air inlet 1001 is positioned so as to face the side window next to the vehicle seat 902.

As shown in FIG. 38, a left wall 1008 extends rearward from a laterally left hand side part of the front wall 1005 of the lower casing part 1003. Similarly, a right wall 1009 extends rearward from a laterally right hand side part of the front wall 1005 of the lower casing part 1003. The right wall 1009 connects the front wall 1005 and the rear wall 106 to each other in the fore and aft direction. The left wall 1008 and the right wall 1009 vertically connect the partition wall 966 (see FIG. 36) of the lower casing part 1003 and the support plate 950 (see FIG. 36) to each other. As a result, the support plate 950, the front wall 1005, the rear wall 1006, the left wall 1008, the right wall 1009 and the partition wall 966 jointly define an air passage 1013 extending from the air inlet 1001 to the air blowing port 1012. The air passage 1013 slopes downward toward the front.

The left and right blowers 1014 and the temperature control portion 1015 are positioned in the air passage 1013. As a result, the air guided from the air inlet 1001 to the air passage 1013 proceeds rightward and rearward from the air inlet 1001, is sent forward by the blowers 1014, is cooled or heated by the temperature control portion 1015, and is expelled from the air blowing port 1012. The expelled air reaches the head of the seat occupant.

A plurality of louver plates 1016 are provided in the air inlet 1001 and slope downward toward the laterally outer ends parts thereof. As a result, even if rainwater or the like enters the interior of the vehicle through the side window of the vehicle, the rainwater or the like is prevented from entering the headrest 1000 through the air inlet 1001. Also, the louver plates 1016 slope rearward toward the laterally outer ends thereof. As a result, the air whose temperature has been adjusted by the temperature control portion 1015 can be easily introduced into the headrest 1000 through the air inlet 1001, so that the temperature control portion 1015 can efficiently adjust the temperature around the head of the seat occupant.

The headrest 901 is also provided with a pad member 1020 covering the headrest pillars 910, the plate 912, and the lower casing part 1003 from the front. The pad member 1020 further covers the cover central part 972 of the protective cover 971 from above, and also covers the lower casing part 1003 from the laterally outer sides thereof as shown in FIG. 38. The part of the pad member 1020 opposing the air blowing port 1012 in the fore and aft direction is provided with an opening. The pad member 1020 is covered with the skin member 1021.

Although the present invention has been described in terms of specific embodiments, the present invention is not limited to the above embodiments and can be modified in various ways. For example, the air inlet 964 according to the present invention may be integrally formed with the lower casing part 956, and the air inlet 964 may be formed in a member separate from the lower casing part 956. The connecting piece 924 of the plate 912 may be provided with a downwardly extending engagement claw 945 so that the engagement claw 945 may be engaged by the engagement hole 925 formed in the protrusion 941 of the upper casing part 934.

| | |
|---|---|
| 10: electric vehicle (vehicle) | 12: body |
| 14: front wheels | 16: rear wheels |
| 18: electric motor | 20: battery |
| 22: cabin | 24: floor panel |
| 26: front seat | 28: rear seat |
| 30: seat cushion | 32: seat back |
| 34: headrest | 36: instrument panel |
| 40: air conditioning device | 42: compressor |
| 44: condenser | 46: expansion valve |
| 48: evaporator | 50: duct |
| 52: air blowing port | 54: air conditioning device electric motor |
| 60: seat heater (seat temperature adjustment device) | |
| 62: first air blower (seat temperature control device) | |
| 64: air duct | 66: electric heater |
| 68: electric fan | 70: Peltier device |
| 72: air inlet | 74: air blowing port |
| 76: second air blower (seat temperature control device) | |
| 78: air duct | 80: electric heater |
| 82: electric fan | 84: Peltier device |
| 86: air inlet | 88: air blowing port |
| 90: control unit | 91: microcomputer |
| 92: free-run timer | 94: cabin temperature setting unit |
| 96: cabin temperature sensor | 98: external temperature sensor |
| 99: air blowing port temperature sensor | 102B: bracket |
| 103: vehicle seat | 105: seat body |
| 107: door | 107A: door trim |
| 107B: door panel | 108: door airbag |
| 109: center console box | 109A: recess |
| 109B: lid | 109C: opening edge |
| 111: seat cushion | 111A: seating surface |
| 111B: base | 111C: bank |
| 113: seat back | 113A: support surface |
| 115: headrest | 115A: pillar |
| 121: frame | 121A: side frame |
| 121B: pan frame | 123: pad member |
| 125: skin member | 127: side cover |
| 127A: recess | 129: lower rail |
| 130: upper rail | 131: frame |
| 131A: side frame | 131B: upper frame |
| 131C: cross frame | 131D: pillar guide |
| 131E: fixing bracket | 133: pad member |
| 135: skin member | 136: airbag module |
| 137: side airbag | 139: frame |
| 139A: vertical frame | 139B: auxiliary frame |
| 139C: support surface | 141: pad member |
| 143: skin member | 145: reclining lever |
| 147: height lever | 149: grip portion |
| 151: buckle device | 151A: buckle support arm |
| 151B: buckle | 153: seat belt |
| 155: seat belt tongue | 159: center pillar |
| 161: air conditioning device | 163: seat air conditioning device |
| 165: seating sensor | 167: temperature sensor |
| 171: cushion air conditioning device | 171A: inboard side air conditioning device |
| 171B: outboard side air conditioning device | 172: protruding portion |
| 173: back-side air conditioning device | 175: head-side air conditioning device |
| 181: control unit | 181A: CPU |
| 181B: RAM | 181C: ROM |
| 181D: storage device | 183: cutout |
| 185: gap | 187: inlet |
| 189: inner blower | 191: lower blower |
| 193: blower | 195: duct |
| 197: temperature control device | 197A: heat source |
| 201: cover member | 201A: inner cover |
| 201B: outer cover | 201C: notch |
| 201d: extension | 201e: through hole |
| 201f: through hole | 202A: wire |
| 202B: bracket | 202C: wire |

-continued

| | |
|---|---|
| 202d: locking claw | 203: blower |
| 205: duct | 205A: air blowing port |
| 206: air blowing port | 207: temperature control device |
| 207A: heat source | 209: garnish |
| 209A: ventilation hole | 210: ventilation path |
| 211: passage forming member | 213: blower |
| 217: temperature control device | 217A: heat source |
| 271: cushion air conditioning device | |
| 271A: inboard side air conditioning device | |
| 303: vehicle seat | 349: button |
| 371A: inboard side air conditioning device | |
| 403: vehicle seat | 449: button |
| 450: wire harness | 481: control unit |
| 503: vehicle seat | 661: air conditioning device |
| 663: seat air conditioning device | |
| 664: vehicle cabin air conditioning device | |
| 834A: through hole | |
| 834B: lip | |
| 902: vehicle seat | 901: headrest |
| 904: seat back | 903: seat cushion |
| 905A: side member | 905: frame |
| 907: skin member | 906: pad member |
| 910: headrest pillar | 908: guide stay |
| 914: temperature adjustment unit | 912: plate |
| 917: upright portion | 916: pillar hole |
| 920: major plane portion | 918: curved portion |
| 923: inclined piece | 921: extension portion |
| 925: engagement hole | 924: connecting piece |
| 929: temperature control portion | 928: casing |
| 932: harness | 930: blower |
| 935: upper wall | 934: upper casing |
| 937: front wall | 936: side wall |
| 945: locking claw | 941: projection |
| 950: support plate | 947: harness hole |
| 956: lower casing | 954: connector |
| 959: bottom wall | 958: side wall |
| 961: rear wall | 960: front wall |
| 965: air blowing port | 964: air inlet |
| 967: air passage | 966: partition wall |
| 971: protective cover | 970: hollow portion |
| 973: cover side part | 972: cover central part |
| 976: wire | 975: wire locking portion |
| 980: pad member | 977: notch portion |
| 982: mesh | 981: skin member |
| 1001: air inlet | 1000: headrest |
| 1003: lower casing | 1002: casing |
| 1005: front wall | 1004: side wall |
| 1008: left wall | 1006: rear wall |
| 1012: air blowing port | 1009: right wall |
| 1014: blower | 1013: air passage |
| | 1015: temperature control portion |
| 1016: louver plate | 1020: pad member |
| 1021: skin member | |

The invention claimed is:

1. A vehicle cabin temperature control device, comprising:

an air conditioning device including an air blowing port for blowing air-conditioned air into a cabin of a vehicle, the air blowing port being provided in an instrument panel of a vehicle;

a seat temperature control device including at least one of an air blowing device for blowing air-conditioned air by at least one of a heater and a semiconductor device toward an occupant of a seat and a seat heater, the seat temperature control device consuming less power than the air conditioning device; and a control unit that activates the seat temperature control device for a predetermined time period upon startup of the air conditioning device, wherein the control unit sets a set temperature of the seat temperature control device so as to be lower in an earlier part of the predetermined time period as compared to a latter part of the predetermined time period, and wherein the control unit changes the set temperature of the seat temperature control device from a first temperature to a second temperature that is higher than the first temperature after the air conditioning device starts blowing air-conditioned air into the cabin and a temperature in the cabin starts to increase.

2. A vehicle cabin temperature control device according to claim 1, wherein the air conditioning device is based on a refrigeration cycle including a compressor driven by an electric motor.

3. A vehicle cabin temperature control device according to claim 1, wherein the predetermined time period is a time period lasting for a predetermined time from a start of the air conditioning device.

4. A vehicle cabin temperature control device according to claim 1, wherein the predetermined time period is a time period that starts from a start of the air conditioning device and lasts for so long as a difference between a set temperature of the air conditioning device and a temperature in the cabin is equal to or greater than a predetermined value.

5. A vehicle cabin temperature control device according to claim 1, wherein the seat temperature control device includes the air blowing device, and the control unit sets an amount of air blown from the air blowing device to be smaller in an earlier part of the predetermined time period as compared to a latter part of the predetermined time period.

6. A vehicle cabin temperature control device according to claim 1, wherein the seat temperature control device includes the air blowing device, and the control unit intermittently operates the air blowing device.

7. A vehicle cabin temperature control device according to claim 1, wherein the control unit operates the air conditioning device with a power value lower than a power value for steady operation while the seat temperature control device is in operation.

8. A vehicle cabin temperature control device according to claim 1, wherein the air blowing device is provided in a seat back or headrest of the seat and includes an air blowing port for blowing air toward a neck of a seat occupant.

9. An electric vehicle which is provided with driven wheels driven by an electric motor, the electric vehicle including the vehicle cabin temperature control device according to claim 2, wherein the electric motor driving the driven wheels, the electric motor driving the compressor, and the seat temperature control device share a common battery as a power source.

10. A vehicle cabin temperature control device, comprising:

an air conditioning device including an air blowing port for blowing air-conditioned air into a cabin of a vehicle, the air blowing port being provided in an instrument panel of a vehicle;

a seat temperature control device including at least one of an air blowing device for blowing air-conditioned air by at least one of a heater and a semiconductor device toward an occupant of a seat and a seat heater, the seat temperature control device consuming less power than the air conditioning device; and a control unit that activates the seat temperature control device for a predetermined time period upon startup of the air conditioning device, wherein the seat temperature control device includes the air blowing device, and the control unit sets an amount of air blown from the air blowing device to be smaller in an earlier part of the predetermined time period as compared to a latter part of the predetermined time period, and wherein the control unit changes a flow rate of the air blown from the air blowing device from a first flow rate to a second flow rate that is greater than the first flow rate after the air conditioning device starts blowing air-conditioned air into the cabin and a temperature in the cabin starts to increase.

11. A vehicle cabin temperature control device according to claim 1, wherein at the startup of air conditioning device, the control unit operates the seat temperature control device with a power consumption smaller than a power consumption of the air conditioning device.

\* \* \* \* \*